United States Patent
Yamasaki

(10) Patent No.: US 6,307,928 B1
(45) Date of Patent: Oct. 23, 2001

(54) CALL-BACK CONTROLLABLE EXCHANGE AND CALL-BACK CONTROL METHOD IN EXCHANGE

(75) Inventor: Yasukiyo Yamasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/052,440

(22) Filed: Mar. 31, 1998

(30) Foreign Application Priority Data

Oct. 9, 1997 (JP) .................................................. 9-277818

(51) Int. Cl.$^7$ ...................................................... H04M 3/42
(52) U.S. Cl. .................... 379/210.01; 379/219; 379/229; 379/114.21; 379/115.01
(58) Field of Search ........................ 379/209.01, 210.01, 379/211.02, 212.01, 215.01, 219, 225, 201.01, 111, 114.01, 127.01, 133, 142.01, 211.01

(56) References Cited

U.S. PATENT DOCUMENTS

| | | | |
|---|---|---|---|
| 5,027,387 | * 6/1991 | Moll | 379/112 |
| 5,309,505 | * 5/1994 | Szlam et al. | 379/88 |
| 5,436,967 | 7/1995 | Hanson | 379/266 |
| 5,511,112 | * 4/1996 | Szlam | 379/88 |
| 5,661,790 | * 8/1997 | Hsu | 379/209 |
| 5,822,411 | * 10/1998 | Swale et al. | 379/111 |
| 5,825,858 | * 10/1998 | Shaffer et al. | 379/120 |
| 5,987,112 | * 11/1999 | Chakravarti et al. | 379/209 |
| 6,009,155 | * 12/1999 | Adachi | 379/142 |

FOREIGN PATENT DOCUMENTS 61159855 7/1986 (JP) .
3080751 4/1991 (JP) .

* cited by examiner

Primary Examiner—Jack Chiang
Assistant Examiner—Benny Q. Tieu
(74) Attorney, Agent, or Firm—Helfgott & Karas, P C

(57) ABSTRACT

The present invention relates to a call-back controllable exchange and a call-back control method in the exchange. The call-back controllable exchange, containing a plurality of subscriber terminals of the invention, is basically comprised of a call controller and a call-back controller. Receiving a call setting request signal transmitted from a calling terminal to a called terminal, the call controller controls to set a call from the calling terminal to the called terminal on the basis of an identifier of the calling terminal and an identifier of the called terminal that are contained in the call setting request signal. On the other hand, the call-back controller transmits a release request signal to the calling terminal to disconnect the call set by the call controller, and then on the basis of the foregoing identifiers, transmits to the calling terminal a reverse call setting request signal to set a reverse direction call to the foregoing call. Thereby, the exchange of the invention is able to execute the call-back control that automatically sets the called party as the sender so as to charge the called party for the communication rate, without positioning an operator in a switched network or organizing a special system as an intelligent network.

26 Claims, 57 Drawing Sheets

FIG. 15

| | 0 | 7 | 15 | 23 | 31 |
|---|---|---|---|---|---|
| 0 | STATE | CNCLS | VIP | INTFTYP | |
| 1 | INBCOB | EGBCOB | | FECN | |
| 2 | | | PICF | PIC | |
| 3 | MAXIBAND ||||
| 4 | MAXEBAND ||||
| 5 | | | MAXVPI | MAXVCI | |
| 6 | MAXVPC || MAXVCC ||
| 7 | SAO1 | | SCRID0 ||
| 8 | NAC0 | NOC0 | SNO ||
| 37 | SA15I | | SCRID15 ||
| 38 | NAC15 | NOC15 | SN15 ||
| 39 | DFLTNPA ||||
| 40 | DFLTOFC ||||
| 41 | DFLTSN ||||
| 42 | BILNPA ||||
| 43 | BILOFC ||||
| 44 | BILSN ||||
| 45 | | BSGCID | BSGCELN ||
| 46 | | | BPORT ||
| 47 | LOOPLOC ||||
| 48 | ||||
| 49 | ||||
| 50 | ||||
| 51 | CLND | CLINGNSAT | CLDNSAT | AALT |
| 52 | HLIT | LLIT | LLIS | SVCLASS |
| 53 | AMASLSTD | AMACMPO | AMANETC | AMAVBR |
| 54 | AMACBR | AMAUSSAT | AMASIGF | SIGTYP |
| 55 | SUBSTATE | TSTTER | SVCTYP | NTCIND |
| 56 | AMADIS | AOEG | SIGOEGN ||
| 57 | SCB | SCBF | | |

| | | | |
|---|---|---|---|
| STATE | (0,8) : State | 0 : | Out of Service |
| | | 1 : | Under-construction |
| | | 2 : | In-service |

CNCLS (8,8) : Connection Class PVC/SVC Service
- 0 : PVC Service
- 1 : SVC Service
- 2 : PVC/SVC Service VIP (16,8) : VIP Subscriber Indication
- 0 : Not VIP
- 1 : VIP INTFTYP(24,8) : Interface Type
- 0 : UNI
- 1 : Inter NNI
- 2 : Intra NNI

⎫ INDICATING TYPE OF INTERFACE

INBCOB (0,8) : Ingress Bearer Class
- 1 : BCOB=A Reserved
- 3 : BCOB=C Reserved
- 16 : BCOB=X EGBCOB (8,8) : Egress Bearer Class
- 1 : BCOB=A Reserved
- 3 : BCOB=C Reserved
- 16 : BCOB=X FECN (24,8) : Far End Carrier ID (0-127)

PICF (16,8) : Prefered Intercarrier Install Flag
- 0 : Not Installed
- 1 : Installed

FIG. 17

PIC (24,8) : Prefered Intercarrier Code (0-127)   ) DEFAULT CARRIER NUMBER

MAXIBAND(0,32) : Ingress Allow Max Bandwidths [Cell/Sec]
- OC12c       : max 1412831 [Cell/Sec]
- OC3c        : max  353207 [Cell/Sec]
- DS3(PLCP)   : max   96000 [Cell/Sec]
- DS3(PLCP)   : max  104268 [Cell/Sec]
- STM1        : max  353207 [Cell/Sec]
- J2          : max   14490 [Cell/Sec]
- DS1         : max    3622 [Cell/Sec]

MAXEBAND(0,32) : Egress Allow Max Bandwidths [Cell/Sec]
- OC12c       : max 1412831 [Cell/Sec]
- OC3c        : max  353207 [Cell/Sec]
- DS3(PLCP)   : max   96000 [Cell/Sec]
- DS3(PLCP)   : max  104268 [Cell/Sec]
- STM1        : max  353207 [Cell/Sec]
- J2          : max   14490 [Cell/Sec]
- DS1         : max    3622 [Cell/Sec]

MAXVPI (16,8) : Allow VPI Max Bit Length [Bit]
- UNI : (1-8)
- NNI : (1-12)

MAXVCI (24,8) : Allow VCI Max Bit Length [Bit] (1-12)

MAXVPC (0,16) : Allow VP Connection Number
- DS1, J2            : max  254
- DS3, OC3c, STM1    : max 1022
- OC12c              : max 4094

FIG. 18

MAXIMUM VC CONNECTION NUMBER
- MAXVCC (16,16): Allow VC Connection number
  - DS1, J2 : max 254
  - DS3,OC3c,STM1 : max 1022
  - OC12c : max 4094

SUBSCRIBER NUMBER (0)
- SA0I (0,8): SA 0 Installation Flag  0: Not Installed  1: Install
- SCRID0 (16,16): Screening ID 0 (0-2047)
- NAC0 (0,8): NAC 0 (0-3)
- NOC0 (0,8): NOC 0 (0-15)
- SN0 (16,16): SN 0 (4 Digits)

⋮

SUBSCRIBER NUMBER (15)
- SA15I (0,8): SA 15 Installation Flag  0: Not Installed  1: Install
- SCRID15 (16,16): Screening ID 15 (0-2047)
- NAC15 (0,8): NAC 15 (0-3)
- NOC15 (8,8): NOC 15 (0-15)
- SN15 (16,16): SN 15 (4 Digits)

DEFAULT SUBSCRIBER NUMBER
- DFLTNPA (0,32): Default NPA
- DFLTOFC (0,32): Default OFC
- DFLTSN (0,32): Default SN SUBSCRIBER NUMBER FOR CHARGING
- BILNPA (0,32): Billing NPA
- BILOFC (0,32): Billing OFC
- BILSN (0,32): Billing SN NUMBER OF DEVICE FOR CONTROLLING THE INTERFACE
- BSGCID (8,8): BSGC EQID (BSGC:38)
- BSGCELN (16,16): BSGC ELM (0-127)
- BPORT (16,16): BSGC port (0-1023)

LOOPLOC (0,128): Loopback Location Indication
max 16 char

FIG. 19

FLAG FOR CONTROLLING MESSAGE CONTENT (DSS2, B-ISUP)

- CLND (0,8): Calling Number delivery — 0: Disallow / 1: Allow
- CLINGNSAT(8,8): Calling Party Subaddress Transfer — 0: Disallow / 1: Allow
- CLDNSAT(16,8): Called Party Subaddress Transfer — 0: Disallow / 1: Allow
- AALT (24,8): AAL Parameter Transfer — 0: Disallow / 1: Allow
- HLIT (0,8): High Layer Information Transfer — 0: Disallow / 1: Allow
- LLIT (8,8): Low Layer Information Transfer — 0: Disallow / 1: Allow
- LLIS (16,8): Low Layer Information Selection — 0: Disallow / 1: Allow SVCLASS (24,8): Service Class — 0: Point to Point / 1: Point to Multi-Point

FLAG FOR CONTROLLING INFORMATION TO COLLECT FOR BILLING

- AMASLSTD (0,8): AMA Subscriber Line Study — 0: Disallow / 1: Allow
- AMACMPO(8,8): AMA Complaint Observe — 0: Disallow / 1: Allow
- AMANETC(16,8): AMA Network Completion — 0: Disallow / 1: Allow
- AMAVBR(24,8): AMA VBR Indication — 0: Disallow / 1: Allow
- AMACBR (0,8): AMA CBR Indication — 0: Disallow / 1: Allow
- AMAUSSAT(8,8): AMA Unsuccessful SVC Attempt — 0: Disallow / 1: Allow
- AMASIGF(16,8): AMA Signaling Feature — 0: Disallow / 1: Allow SIGTYP (24,8): Signaling Type — 0: Association / 1: Non-Association

FIG. 20

SUBSTATE (0,8): Subscriber Service Permission Status

0: In-service
1: Originating Only
2: Terminating Only
3: Originating and Terminating Denied
4: Under changed Number Interception

FLAGS FOR SERVICES:

TSTTER (8,8): Test Terminal

0: Not Test Mode
1: Test Subscriber Mode

SVCTYP (16,8): CRS-SVC Type

0: General Subscriber
1: Proxy Signaling Agent
2: TPCC Subscriber

NTCIND (24,8): Indication Connection ID.

0: Indication
1: No Indication

AMADIS (0,8): AMA Data Collection Control

0: Collect
1: Discard

AOEG (8,8): Assignment to OE Group

0: Not Assigned
1: Assigned

SIGOEGN (16,16): OE Group Number

CALL-BACK CONTROLLABLE EXCHANGE AND CALL-BACK CONTROL METHOD IN EXCHANGE

BACKGROUND OF THE INVENTION

1. Field of the Invention

The present invention relates to a call-back controllable exchange whereby the communication rate is automatically charged not to the calling party but to the called party, and a call-back control method in the exchange.

2. Description of the Related Art

In the communication between a subscriber terminal X and a subscriber terminal Y in a switched network, when, for example, the subscriber terminal X calls the subscriber terminal Y, generally, the communication rate is controlled to be charged to the subscriber terminal X being the calling terminal (hereunder, referred to also as a sender) by the exchange containing the subscriber terminal X.

As typically shown in FIG. 58($a$), in an ATM (Asynchronous Transfer Mode) exchange 100 that handles a fixed length data called an ATM cell, when, for example, the ATM exchange 100 receives a call setup request message (Setup signal) from a calling terminal X, first, the exchange 100 makes a charge data area 200 on the basis of a calling party number of the calling terminal X and a called party number of a called terminal Y contained in that message.

This charge data area 200, as shown in FIG. 58($a$) is provided with a field 201 for recording the foregoing calling and called party numbers, and in addition a field 202 for recording the forward and backward passing cell numbers (initial value: 0). As shown in FIG. 58($b$), when a path (call) between the terminal X and Y is established to start the communication, the forward and backward cell numbers passing through the ATM exchange 100 are each counted, and the counted result is written in the foregoing field 202 at any time.

Incidentally, the actual counting is made by an interface unit (not illustrated) such as a concentrator that contains the terminal X and Y, and the writing in the field 202 is made by a central controller (CC: not illustrated) of the ATM exchange 100 that receives an information on the forward and backward passing cell numbers periodically from the interface unit.

And, when receiving a disconnection request (Release) signal from the terminal X or Y, the ATM exchange 100 disconnects the foregoing path, and makes the charge request information for the calling terminal X on the basis of the forward and backward cell numbers that are recorded at that time in the field 202.

In this manner, the charge request is usually made to the calling party, however in some circumstances, the charge request is wanted to be made to the called party (called terminal Y). Services such as the so-called collect call and free dial are the ones that have realized the foregoing.

Here, the former collect call service is such that the calling party informs an operator of the exchange to use the service, the operator informs the called party of the collect call being requested, and sets up the call to the called party on the confirmation with the called party, and the charge is made to the called party. The latter free dial service is such that, when a user transmits a call number starting from a specific number such as "0120" as a destination, the communication rate is charged to the destination (called party). This service has been carried out by an exclusive intelligent network (IN) organized in a switched network.

However, the foregoing collect call service requires an operator (or, any alternative equipment) in the switched network, and in addition, even when the called party is known to invariably accept the collect call, the operator will have to confirm the called party of the collect call each time, which is a wasteful work, wasting a rather long time before starting the communication, which is a problem.

On the other hand, the free dial service does not contain the foregoing delay time before starting the communication, due to the operator intervening in the switched network. However, it is necessary to organize the exclusive intelligent network in the switched network, and therefore, a huge cost has been spent so far for that.

SUMMARY OF THE INVENTION

The present invention has been made in view of the foregoing problems, and an object of the present invention is to provide a call-back controllable exchange and a call-back control method in the exchange that automatically sets the called party as the calling party so as to be able to charge the called party for the communication rate, without positioning an operator in the switched network or without organizing a special system such as the foregoing intelligent network in the switched network.

In order to accomplish the foregoing object, the call-back controllable exchange of the invention, containing a plurality of subscriber terminals, is characterized by comprising a call controller for controlling, upon receiving a call setting request signal transmitted from a calling terminal to a called terminal, to set a call from the calling terminal to the called terminal on the basis of an identifier of the calling terminal and an identifier of the called terminal that are contained in the call setting request signal, and a call-back controller for executing a call-back control, wherein the call-back controller transmits a release request signal to the calling terminal to disconnect the call set by the call controller, and thereafter, the call-back controller transmits to the calling terminal a reverse call setting request signal transmitted from the called terminal to the calling terminal to set a reverse call to the foregoing call on the basis of the foregoing identifiers.

Further, the method for executing the call-back control in the exchange containing a plurality of subscriber terminals, according to the invention, is characterized by the following processes:

upon receiving a call setting request signal transmitted from a calling terminal to a called terminal, setting a call from the calling terminal to the called terminal on the basis of an identifier of the calling terminal and an identifier of the called terminal that are contained in the call setting request signal; and transmitting a release request signal to the calling terminal to automatically disconnect the call, and thereafter, on the basis of the foregoing identifiers, transmitting to the calling terminal a reverse call setting request signal transmitted from the called terminal to the calling terminal to set a reverse call from the called terminal to the calling terminal.

Thus, according to the invention, it is automatically arranged that the sender becomes the called terminal and the destination becomes the calling terminal. Therefore, the service to charge the destination (called party) can be carried out very easily in a low cost, without positioning an operator in the switched network or without arranging a special system such as an intelligent network.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 15 is a chart illustrating a detailed subscriber data used in the ATM exchange in the embodiment;

FIG. 16 through FIG. 20 are charts each illustrating examples of subscriber data used in the ATM exchange in the embodiment;

DESCRIPTION OF THE PREFERRED EMBODIMENTS (a) Description of the Aspect of the Invention First, the aspect of the invention will be described with reference to the accompanying drawing.

Figure 1:
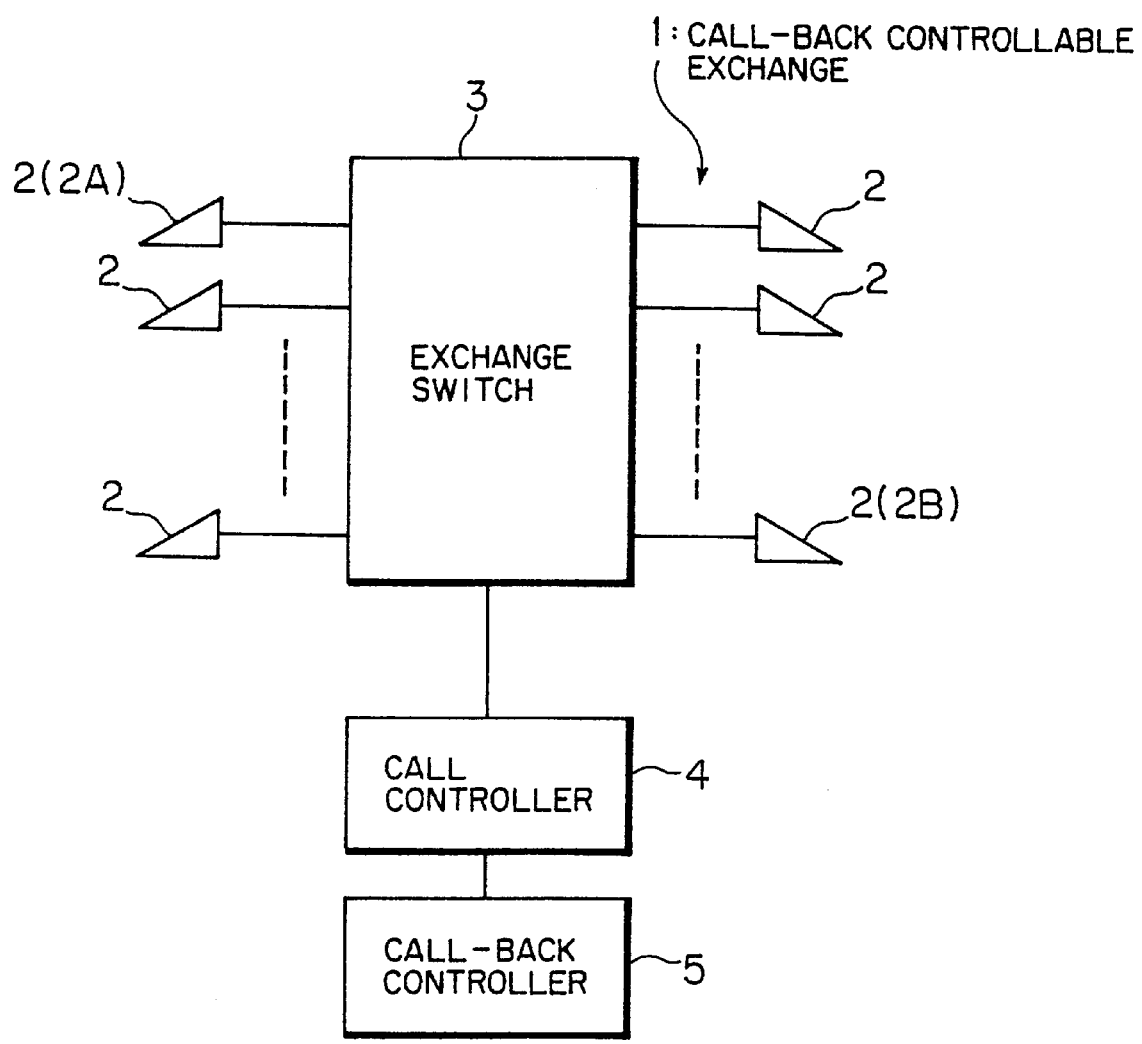
FIG. 1 is a block diagram illustrating an aspect of the present invention.

FIG. 1 is a block diagram illustrating the aspect of the invention. A call-back controllable exchange 1 according to the invention, as shown in FIG. 1, contains a switch 3, a plurality of subscriber terminals 2 connected thorough the switch 3, a call controller 4, and a call-back controller 5. However, a sending terminal (originator) of the subscriber terminals 2 will be represented as a calling terminal 2A, and a destination terminal will be represented as a called terminal 2B.

First, receiving a call setting request signal transmitted from a calling terminal 2A to a called terminal 2B, the call controller 4 controls to set a call from the calling terminal 2A to the called terminal 2B on the basis of the identifier of the calling terminal 2A and the identifier of the called terminal 2B that are contained in the call setting request signal. The call-back controller 5 transmits a release request signal to the calling terminal 2A and disconnects the call set by the call controller 4; and thereafter, on the basis of the foregoing identifiers, the call-back controller 5 transmits to the calling terminal 2A a reverse call setting request signal transmitted from the called terminal 2B to the calling terminal 2A, and thereby carries out the call-back control to set a reverse call to the foregoing call.

In the call-back controllable exchange 1 thus constructed, when the call controller 4 receives the call setting signal that requests to set a call from the calling terminal 2A to the called terminal 2B, first, the call controller 4 sets a call toward the terminal 2B from the terminal 2A on the basis of the identifiers of the terminals 2A and 2B contained in the received call setting request signal.

Next in this state, the call-back controller 5 transmits the release request signal to the calling terminal 2A to disconnect the call set as in the foregoing, and then transmits to the calling terminal 2A the reverse call setting request signal heading to the calling terminal 2A from the called terminal 2B on the basis of the foregoing identifiers. Thereby, a reversely directional call to the initially set call (a call heading to the calling terminal 2A from the called terminal 2B) is set between the terminal 2A and 2B. In consequence, the sender automatically becomes the called terminal 2B, and the destination becomes the calling terminal 2A.

Further, the foregoing call-back controller 5 may be arranged to contain the components shown in the following (1) through (4).

(1) a release request signal generator that generates a release request signal for disconnecting the foregoing call set by the call controller 4.

(2) a release request signal transmitter that transmits the release request signal generated by the foregoing release request signal generator to the calling terminal 2A.

(3) a reverse call setting request signal generator that generates a reverse call setting request signal transmitted from the called terminal 2B to the calling terminal 2A on the basis of the foregoing identifiers.

(4) a reverse call setting request signal transmitter that, after the foregoing release request signal transmitter transmits the release request signal, transmits the reverse call setting request signal generated by the foregoing reverse call setting request signal generator to the calling terminal 2A.

In the call-back controller 5 thus arranged, the components shown in the foregoing items (1) through (4) secure to disconnect the call set by the call controller 4 by transmitting the release request signal to the calling terminal 2A, and thereafter to set the foregoing reverse call by transmitting to the calling terminal 2A the reverse call setting request signal transmitted from the called terminal 2B to the calling terminal 2A; thus strongly favoring to achieve the invention.

Further, the call-back controllable exchange 1 of the invention may be arranged as follows.

The call-back controllable exchange 1 contains an attribute information table that stores, for each subscriber terminal 2, an attribute information as to whether a subscriber terminal 2 is a teminal allowed the call-back control; and the call-back controller 5 contains a called terminal determining section to determine whether or not the called terminal 2B is a teminal allowed the call-back control on the basis of the attribute information of the attribute information table, and carries out the call-back control, when the called terminal determining section determines that the called terminal 2B is a teminal allowed the call-back control.

In the exchange 1 thus arranged, when the called terminal determining section determines that the called terminal 2B is a teminal allowed the call-back control on the basis of the attribute information on the foregoing attribute information table, the call-back controller 5 carries out the foregoing call-back control; and therefore, it can be avoided that the call-back control is executed unconditionally against the intention of a subscriber to automatically set the called terminal 2B as the sender. Therefore, the foregoing exchange 1 significantly serves to enhance the reliability and serviceability of the call-back service.

Further, the call-back controllable exchange 1 of the invention may be arranged as follows.

The call-back controllable exchange 1 contains a band information table that stores a band value used in setting a call between subscriber terminals 2; and the call-back controller 5 contains a band information determining section to determine whether or not a specific band value is set in a call setting request signal transmitted from the calling terminal 2A, and carries out the call-back control by applying the band value stored on the foregoing band information table as a band value used between the calling terminal 2A and the called terminal 2B, when the foregoing called terminal determining section determines that the called terminal 2B is a teminal allowed the call-back control and the foregoing band information determining section determines that the foregoing specific band value is set in the call setting request signal.

In the exchange 1 thus arranged, when the called terminal 2B is determined to be a teminal allowed the call-back control and the foregoing specific band value is determined to be set in the call setting request signal transmitted from the calling terminal 2A, the reverse call is set using the band value stored on the band information table; and therefore, it can be avoided that the called terminal 2B is automatically set as the sender against the intention of a subscriber, as mentioned above. In addition, even if the calling terminal 2A cannot set a band value, the exchange 1 can automatically secure a necessary band value to execute a communication between the terminal 2A and 2B. Therefore, the calling party is able to communicate with the called party without knowing a necessary band value for the communication with the called party, which further enhances the serviceability.

Further, the call-back controller 5 may be arranged to contain the band information determining section to determine whether or not a specific band value is set in a call setting request signal transmitted from the calling terminal 2A and a band value receiver for receiving a band value to be used between the calling terminal 2A and the called terminal 2B from the called terminal 2B, and to carry out the call-back control by using a band value received by the foregoing band value receiver as the band value between the calling terminal 2A and the called terminal 2B, when the foregoing called terminal determining section determines that the called terminal 2B is a teminal allowed the call-back control and the foregoing band information determining section determines that the specific band value is set in the call setting request signal.

In the call-back controller 5 thus arranged, when the called terminal 2B is a teminal allowed the call-back control and the specific band value is set in the call setting request signal, the reverse call is set using the band value received from the called terminal 2B; and therefore, in the same manner as above, the exchange 1 can automatically secure a necessary band value without storing a band value in advance therein, and can execute a communication between the terminal 2A and 2B. Therefore in this case, the exchange 1 can reduce the necessary storage capacity, and at the same time achieve the same effect.

Further, the call-back controller 5 may be arranged to contain a call-back control request determining section to determine whether or not a call-back control request information is set in a call setting request signal transmitted from the calling terminal 2A, and to carry out the call-back control, when the foregoing called terminal determining section determines that the called terminal 2B is a teminal allowed the call-back control and the foregoing call-back control request determining section determines that the call-back control request information is set in the call setting request signal.

In the call-back controller 5 thus arranged, when the called terminal 2B is a teminal allowed the call-back control and an exclusive information (call-back control request information) for requesting to execute the call-back control is set in the call setting request signal, the reverse call is set; and as long as the called terminal 2B is a teminal allowed the call-back control, the foregoing reverse call wherein the called terminal 2B becomes the sender can be set securely at any time from the sending terminal 2A. Therefore, the foregoing arrangement in the call-back controller 5 significantly serves to improve the serviceability of the call-back control.

Further, the call-back controllable exchange 1 of the invention may be arranged as follows.

The call-back controllable exchange 1 contains a path information table that stores an information on a path to allow the call-back control of a plurality of paths that the exchange 1 handles; and the call-back controller 5 contains a path determining section to determine whether or not the path of the call setting request signal is a path to allow the call-back control, and carries out the call-back control, when the foregoing called terminal determining section determines that the called terminal 2B is a teminal allowed the call-back control and the foregoing path determining section determines that the path of the call setting request signal is a path to allow the call-back control.

In the exchange 1 thus arranged, when the called terminal 2B is a teminal allowed the call-back control and the path of the call setting request signal is a path to allow the call-back control, the reverse call is set; and the exchange 1 allows the call-back control collectively to be executed as to the calling terminal 2A that transmits the call setting request signal, by using the path to allow the call-back control. Therefore, compared to the case wherein the execution and/or nonexecution of the call-back control is set for each subscriber terminal 2, the setting operation can remarkably be reduced.

Further, the call-back controllable exchange 1 of the invention may be arranged as follows.

The call-back controllable exchange 1 contains the foregoing attribute information table, and in addition, a calling terminal information table that stores an identifier of the calling teminal allowed the call-back control for each subscriber terminal; and the call-back controller 5 contains the called terminal determining section to determine whether or not the called terminal 2B is a teminal allowed the call-back control on the basis of an attribute information of the foregoing attribute information table and a calling terminal determining section to determine whether or not the calling terminal 2A is a teminal allowed the call-back control on the basis of the identifier of the calling terminal information table, and carries out the call-back control, when the foregoing called terminal determining section determines that the called terminal 2B is a teminal allowed the call-back control and the foregoing calling terminal determining section determines that the calling terminal 2A is a teminal allowed the call-back control.

In the exchange 1 thus arranged, when not only the called terminal 2B but also the calling terminal 2A are terminals to allow the call-back control, the call-back control is carried out and the reverse call is set; and therefore, it can be avoided that the reverse call wherein a called party becomes a sender and a calling party becomes a destination is automatically forced to be set against the intentions of the calling and called party. Therefore, the foregoing arrangement serves to improve the reliability and the serviceability of the call-back control.

Further, the call-back controllable exchange 1 of the invention may be arranged as follows.

The call-back controllable exchange 1 contains a band information table that stores a band value used in setting a call between subscriber terminals; and the call-back controller 5 contains the band information determining section to determine whether or not a specific band value is set in a call setting request signal transmitted from the calling terminal 2A, and carries out the call-back control by using a band value stored on the foregoing band information table as the band value between the calling terminal 2A and the called terminal 2B, when the foregoing called terminal determining section determines that the called terminal 2B is a teminal allowed the call-back control, the foregoing calling terminal determining section determines that the calling terminal 2A is a teminal allowed the call-back control, and the foregoing band information determining section determines that the specific band value is set in the foregoing call setting request signal.

In the exchange 1 thus arranged, when both the calling terminal 2A and the called terminal 2B are terminals to allow the call-back control and the specific band value is set in the call setting request signal transmitted from the calling terminal 2A, the reverse directional call is set by using the band value stored on the band information table; and as mentioned above, it can be avoided that the foregoing reverse call is set against the intentions of the subscribers. In addition, even though the calling terminal 2A cannot set a band value, the exchange 1 can automatically secure a necessary band value to execute a communication between the terminals 2A and 2B. Therefore, the calling party is able to communicate with the called party without knowing a band value necessary for the communication therewith, which further serves to enhance the serviceability.

Further, the call-back controller 5 may be arranged to contain the band information determining section to determine whether or not a specific band value is set in a call setting request signal transmitted from the calling terminal 2A and a band value receiver for receiving a band value to be used between the calling terminal 2A and the called terminal 2B from the called terminal 2B, and to carry out the call-back control by using a band value received by the foregoing band value receiver as the band value between the calling terminal 2A and the called terminal 2B, when the foregoing called terminal determining section determines that the called terminal 2B is a teminal allowed the call-back control, the foregoing calling terminal determining section determines that the calling terminal 2A is a teminal allowed the call-back control, and the foregoing band information determining section determines that the specific band value is set in the call setting request signal.

In the call-back controller 5 thus arranged, when both the calling terminal 2A and the called terminal 2B are terminals to allow the call-back control and the specific band value is set in the call setting request signal, the foregoing reverse call is set by using the band value received from the called terminal 2B; and therefore, in the same manner as above, the exchange 1 can automatically secure a necessary band value to execute a communication between the terminals 2A and 2B, without storing a band value in advance in the exchange 1. Therefore, the exchange 1 can reduce the necessary storage capacity, and at the same time, achieve the same effect as above.

Further, the call-back controller 5 may be arranged to contain a call-back control request determining section to determine whether or not a call-back control request information is set in a call setting request signal transmitted from the calling terminal 2A, and to carry out the call-back control, when the foregoing called terminal determining section determines that the called terminal 2B is a teminal allowed the call-back control, the foregoing calling terminal determining section determines that the calling terminal 2A is a teminal allowed the call-back control, and the foregoing call-back control request determining section determines that the call-back control request information is set in the call setting request signal.

In the call-back controller 5 thus arranged, when both the calling terminal 2A and the called terminal 2B are terminals to allow the call-back control and the exclusive information (call-back control request information) for requesting to execute the call-back control is set in the call setting request signal, the reverse call is set; and as long as both the calling terminal 2A and the called terminal 2B are terminals to allow the call-back control, the foregoing reverse call wherein the called terminal 2B becomes the sender can be set securely at any time by the calling terminal 2A. Therefore, also in this case, the foregoing arrangement significantly serves to enhance the serviceability of the call-back control.

Further, the call-back controllable exchange 1 of the invention may be arranged as follows.

The call-back controllable exchange 1 contains a path information table that stores an information on a path to allow the call-back control of a plurality of paths that the exchange 1 handles; and the call-back controller 5 contains a path determining section to determine whether or not the path of the call setting request signal is a path to allow the call-back control, and carries out the call-back control, when the foregoing called terminal determining section determines that the called terminal 2B is a teminal allowed the call-back control, the foregoing calling terminal determining section determines that the calling terminal 2A is a teminal allowed the call-back control, and the foregoing path determining section determines that the path of the call setting request signal is a path to allow the call-back control.

In the exchange 1 thus arranged, when both the calling terminal 2A and the called terminal 2B are terminals to allow the call-back control and the path of the call setting request signal is a path to allow the call-back control, the reverse call is set; and also in this case, the exchange 1 collectively allows the call-back control to be executed as to the calling terminal 2A that transmits the call setting request signal, by using the path to allow the call-back control. Therefore, compared to the case wherein the execution/nonexecution of the call-back control is set for each subscriber terminal 2, the setting operation can remarkably be reduced.

Further, the foregoing exchange 1 may contain an attribute information setting unit of a maintenance terminal input type that sets an attribute information of the attribute information table on the basis of an information inputted from the maintenance terminal for the exchange 1. Thereby, a maintenance operator for the exchange 1 is able to appropriately set and/or modify the attribute information of the attribute information table from the foregoing maintenance terminal.

Further, the foregoing exchange 1 may contain an attribute information setting unit of a subscriber terminal input type that sets an attribute information of the attribute information table on the basis of an information inputted from a subscriber terminal 2. Thereby, a subscriber of the exchange 1 is able to appropriately set and/or modify the attribute information of the attribute information table from the own subscriber terminal 2.

Further, the foregoing exchange 1 may contain a band value setting unit of the maintenance terminal input type that sets a band value of the band value information table on the basis of an information inputted from the maintenance terminal for the exchange 1. Thereby, a maintenance operator for the exchange 1 is able to appropriately set and/or modify the band value of the band information table from the maintenance terminal.

Further, the foregoing exchange 1 may contain a band value setting unit of the subscriber terminal input type that sets a band value of the band value information table on the basis of an information inputted from the subscriber terminal 2. Thereby, a subscriber of the exchange 1 is able to appropriately set and/or modify the band value of the band value information table from the own subscriber terminal 2.

Further, the foregoing exchange 1 may contain a path information setting unit of the maintenance terminal input type that sets a path information of the path information table on the basis of an information inputted from the maintenance terminal for the exchange 1. Thereby, a maintenance operator for the exchange 1 is able to appropriately set and/or modify the path information of the path information table from the foregoing maintenance terminal.

Further, the foregoing exchange 1 may contain a path information setting unit of the subscriber terminal input type that sets a path of the path information table on the basis of an information inputted from the subscriber terminal 2. Thereby, a subscriber of the exchange 1 is able to appropriately set and/or modify the path information of the path information table from the own subscriber terminal 2.

Further, the foregoing exchange 1 may contain an identifier setting unit of the maintenance terminal input type that sets an identifier of the calling terminal information table on the basis of an information inputted from the maintenance terminal for the exchange 1. Thereby, a maintenance operator for the exchange 1 is able to appropriately set and/or modify the identifier of the calling terminal information table from the maintenance terminal.

Further, the foregoing exchange 1 may contain an identifier setting unit of the subscriber terminal input type that sets an identifier of the calling terminal information table on the basis of an information inputted from the subscriber terminal 2. Thereby, a subscriber of the exchange 1 is able to appropriately set and/or modify the identifier of the sending terminal information table from the own subscriber terminal 2.

Thus, the invention allows the attribute information of the subscriber terminal and the band value, the path information, and the identifier of the calling terminal necessary for the communication to appropriately be set and/or modified on the basis of an information inputted from the maintenance terminal for the exchange 1; and therefore, it is possible to modify the setting of the exchange 1 as needed, even after the service is finished, whereby a switched network capable of executing the call-back control can be organized very flexibly.

Further, the invention allows the attribute information of the subscriber terminal and the band value, the path information, and the identifier of the calling terminal necessary for the communication to appropriately be set and/or modified on the basis of an information inputted from the subscriber terminal; and therefore, the user (subscriber) is able to set and/or modify the execution/nonexecution of the call-back control at any time as needed, which greatly serves to enhance the serviceability for the user.

Further, in the exchange 1, to set the specific band value to 0 will simply complete the foregoing band setting. For example, even if the sender sets the band value to 0 while not knowing the exact value, the exchange 1 is able to securely set the reverse call and execute the communication between the terminals 2A and 2B.

Therefore, the reliability of the call-back control is further enhanced.

Further, in the exchange 1, adding a band value received by the foregoing band value receiver on a connection signal that the called terminal 2B transmits when the called terminal 2B responds to the call setting request signal will acquire a necessary band value for setting the reverse call without requiring a special sequence for receiving the band value. Therefore, it is possible to secure a necessary band value very easily and quickly and achieve the communication between the calling terminal 2A and the called terminal 2B

(b) Description of the Embodiment According to the Invention

The embodiment according to the invention will be described with reference to the drawings.

(b-1) Description of the Basic Embodiment

Figure 2:
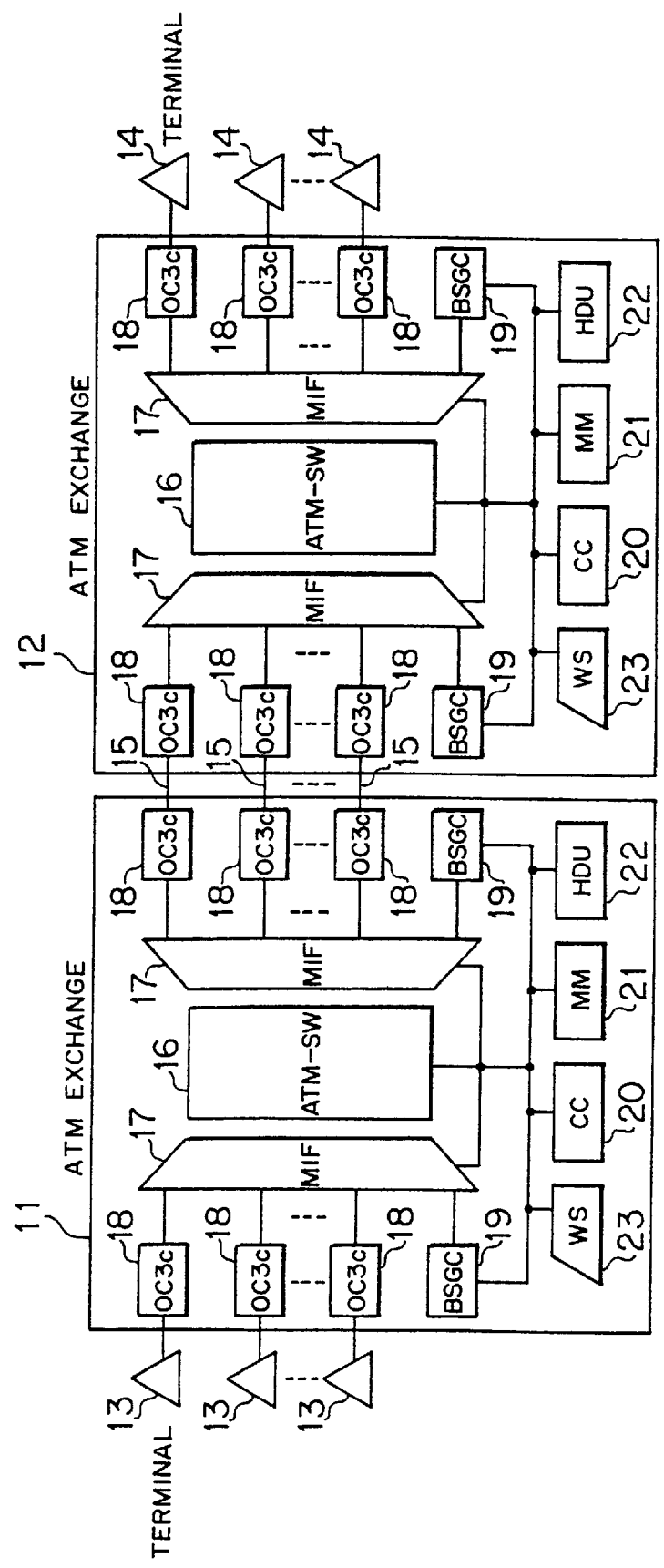
FIG. 2 is a block diagram illustrating one example of a switched network to which a call-back controllable exchange is applied as the basic embodiment of the invention.

FIG. 2 is a block diagram illustrating one example of a switched network that applies a call-back controllable exchange as the basic embodiment of the invention. The switched network shown in FIG. 2 comprises an ATM (Asynchronous Transfer Mode) exchange 11 containing a plurality of (three, in this case) subscriber terminals 13 and an ATM exchange (call-back controllable exchange) 12 containing a plurality of (three, in this case) subscriber terminals 14, wherein the ATM exchange 11 and the ATM exchange 12 are connected through specific trunk lines 15.

Generally, the foregoing ATM exchange 11/12 handles a fixed length cell data called as the ATM cell (53 byte data including a header of 5 bytes and a data area of 48 bytes) which is transmitted and received between the subscriber terminals 13 and 14 (or, other exchanges). The ATM exchange 11/12 is able to asynchronously distribute (exchange) the ATM cell to a transfer destination in accordance with the header assigned to each ATM cell.

In order to achieve the foregoing, the ATM exchange 11/12 comprises, as shown in FIG. 2, an ATM switch 16, shared interface shelf (MIF: medium speed interface shelf) 17, interface unit (OC3c Optical Carrier 3-concatenated) 18, communication control section (BSGC: Broadband Signaling Control section) 19, central controller (CC) 20, main memory (MM) 21, hard disk unit (HDU: external memory) 22, and work station (WS: maintenance terminal) 23.

In accordance with the rooting information [VPI (Virtual Path Identifier) and/or VCI (Virtual Channel Identifier)] set in the header of an incoming ATM cell, the foregoing ATM switch 16 automatically selects a transfer path of the ATM cell. This embodiment employs the ATM switch 16 capable of handling the data bit rate of about 2.4 Gbps.

The shared interface shelf 17 and interface unit 18 each unify the data bit rates [line (channel) speed] of the lines leading to the ATM switch 16 into a data bit rate of about 2.4 Gbps, since the data bit rate that the ATM switch 16 can handle is about 2.4 Gbps in this case as above.

For example, the shared interface shelf (MIF) 17 can contain the line of about 2.4 Gbps, and the interface unit 18 can contain the line of about 155 Mbps, and in this embodiment, the shared interface shelf 17 contains 16 units of the interface unit 18 (155 Mbps×16), whereby the speed of each line leading to the ATM switch 16 is designed to be unified into about 2.4 Gbps.

That is, in the shared interface shelf 17 and the interface unit 18 of the foregoing ATM exchanges 11 and 12, multiplexing a specific number of the ATM cells from the subscriber terminals 13, 14 or the other ATM exchanges will uniformly convert the data bit rates of the ATM cells inputted to the ATM switch 16 into a high speed bit rate of 2.4 Gbps, which enables a high speed exchange processing for a low speed ATM cell.

Further, each of the foregoing shared interface shelves 17 contains a counter that counts the number (or, time) of the forward/backward passing cells, which is not illustrated. The central controller 20 collects a counted result by the counter as an information whereby a charge data is prepared, each time a call between a terminal 13 and a terminal 14 is released (a communication is finished). Further, the foregoing ATM exchanges 11 and 12 each differ, depending on the bit rate of the ATM cell to be handled (the bit rate of the line to be contained), in the number or the configuration of the shared interface shelves 17 and the interface units 18, whereby the bit rates that can be handled are different.

Next, in FIG. 2, the protocol (DSS2 or B-ISUP, described later) of the signal handled by the hardwares of the ATM switch 16 and the shared interface shelf 17 differs in the protocol of the signal handled by the central controller 20; and accordingly, the communication control section 19 converts the protocols of the signals (hard order signal to the hardware and signaling message from the hardware) exchanged between these hardwares and the central controller 20 into a protocol which is suitable for both the hardwares and the control section 20.

Further, each of the central controllers 20 administratively controls the exchange processing and the charge processing in the exchanges 11 and 12. The central controller 20 on the exchange 12 is able to carry out the call-back control (hereunder, also referred to as stealth call-back service) that, for example, when a subscriber terminal 13 transmits a call to be received by a subscriber terminal 14, automatically transposes the subscriber terminal 13 on the sending side (hereunder, also referred to as calling terminal) into the destination and the subscriber terminal 14 on the receiving side (hereunder, also referred to as called terminal) into the sender. Usually, the central controller 20 is comprised of a CPU.

Figure 3:
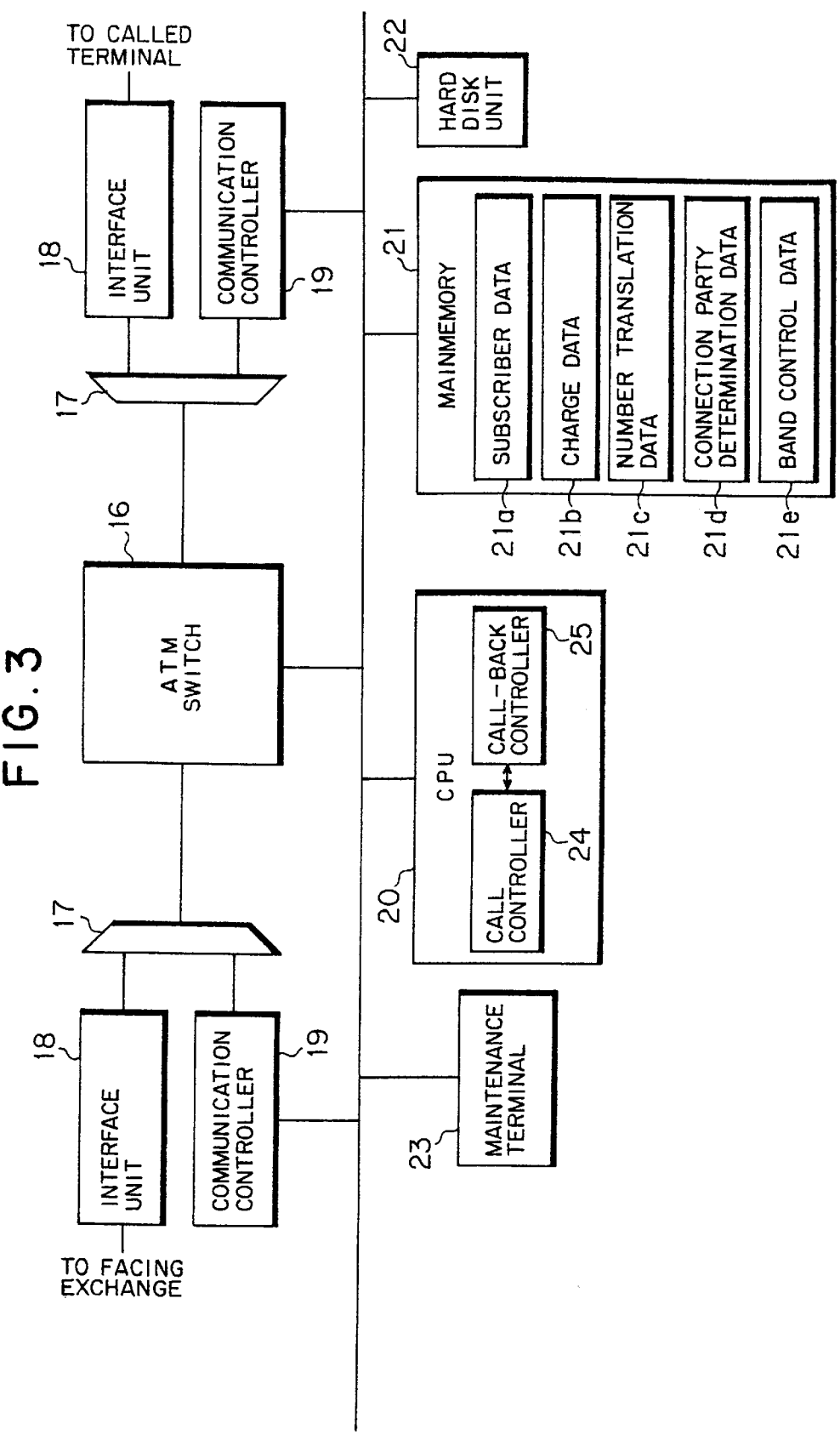
FIG. 3 is a block diagram illustrating a construction of an ATM exchange in the embodiment.

Further, the main memory 21 stores necessary softwares on which the central controller 20 runs, and various data of the subscriber terminals 13, 14 such as a subscriber data 21*a*, charge data 21*b*, call number translation data 21*c*, connection party determination data 21*d*, and band control data 21*e*, as shown in FIG. 3. Further, the subscriber data 21*a* in the exchange 12 is arranged to be set or modified by the maintenance terminal 23 or the subscriber terminal 14, which will be described later.

Further, the hard disk 22 stores the backup data of the foregoing data 21*a* to 21*e* in the main memory 21, and the charge data, call scenarios, and traffic information of all the subscriber terminals 13, 14, etc. The maintenance terminal 23 is to carry out the collective control on the maintenance and operation of the corresponding ATM exchange 11(12). A maintenance operator of the ATM exchange 11 or 12 enters the specific commands using the maintenance terminal 23 into the central controller 20, whereby the initialization of the ATM exchange 11 or 12, the operation of setting and/or modifying the service provided and the recovery operation in case of accidents, and the data read-out/rewriting in the main memory 21, etc., can be carried out.

And, in this embodiment, at least the central controller 20 in the ATM exchange 12 that contains the called terminals 14 is provided with a call controller 24 and a call-back controller 25, as shown in FIG. 3.

Here, when the call controller 24 receives a signaling message (Setup signal: call setting request signal) that requests to set a call from a calling terminal 13 to a called terminal 14, the call controller 24 controls to set the call from the calling terminal 13 to the called terminal 14 on the basis of the calling number (identifier) of the calling terminal 13 and the called number of the called terminal 14 that are contained in the message.

Figure 5:
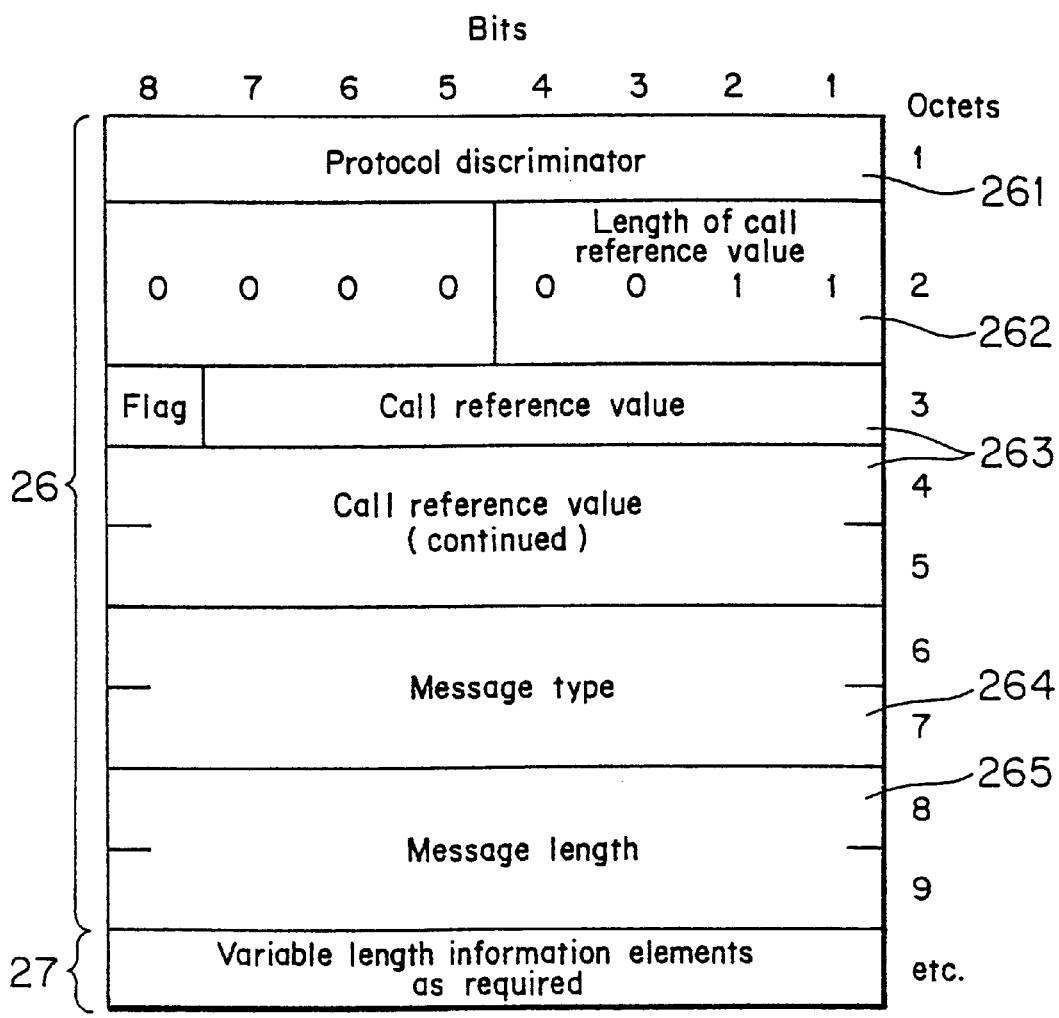
FIG. 5 is a chart illustrating a basic format of a signaling message in a DSS2 protocol.

Incidentally, the signaling message exchanged between the subscriber terminal 13/14 and the ATM exchange 11/12 conforms to a protocol called DSS2 (Digital Subscriber Signaling system NO. 2). As shown in FIG. 5, the signaling message according to the DSS2 basically contains the header (common part) 26 of 8 bits ×9 octets and the information element (additional part) 27 that is subordinate to the header 26.

And, the header 26 is designed to have the following information set therein: a protocol discriminator 261 to indicate the type of a protocol of a signaling message, a call reference value 263 to identify a call, a length information 262 to indicate the length (octet) of the call reference value, a message type code 264 to indicate the type of the message, and a message length 265 to indicate the length (octet) of the message type code 264.

The following list shows, as one example, what the values of the foregoing message type code 264 represent.
(1) 0000 0101: Setup (call setting request)
(2) 0000 1101: Setup Acknowledge (call set confirmation)
(3) 0000 0111: Connect (response)
(4) 0000 1111: Connect Acknowledge (response confirmation)
(5) 0100 1101: Release [disconnection (release) request)]
(6) 0101 1010: Release Complete [disconnection (release) complete]
(7) 0000 0010: Call Proceeding (call setting receipt)

On the other hand, the foregoing information element 27 is formed such that a plurality of the information elements are concatenated appropriately subordinately to the foregoing header 26 in correspondence with the foregoing message type code 264. In case of the foregoing Setup signal, for example, at least, a calling party number information element 271, called party number information element 272, and band (ATM traffic descriptor) information element 273, each of which has a format as shown in FIG. 6 to FIG. 8, are concatenated to the header 26 to thereby form the information element 27.

Figure 6:
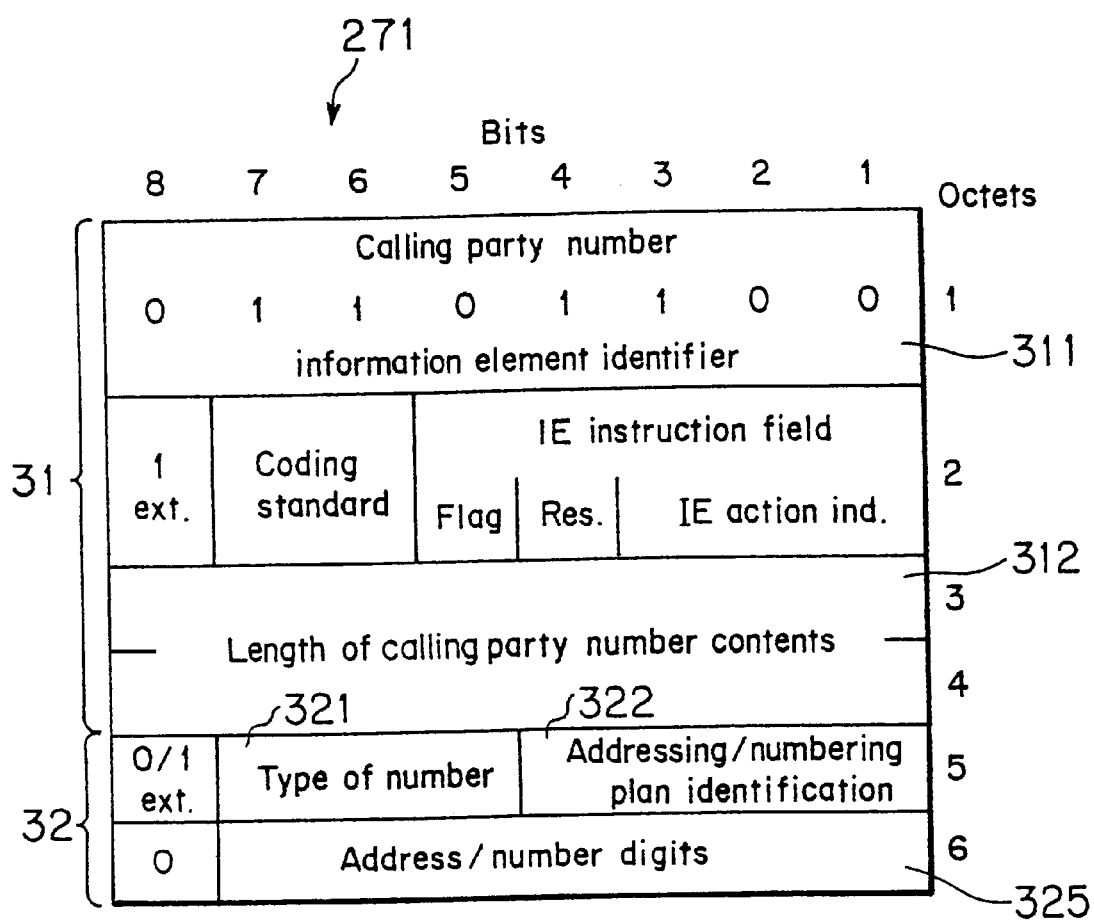
FIG. 6 is a chart illustrating a format of a calling number information element in the DSS2 protocol.
Figure 7:
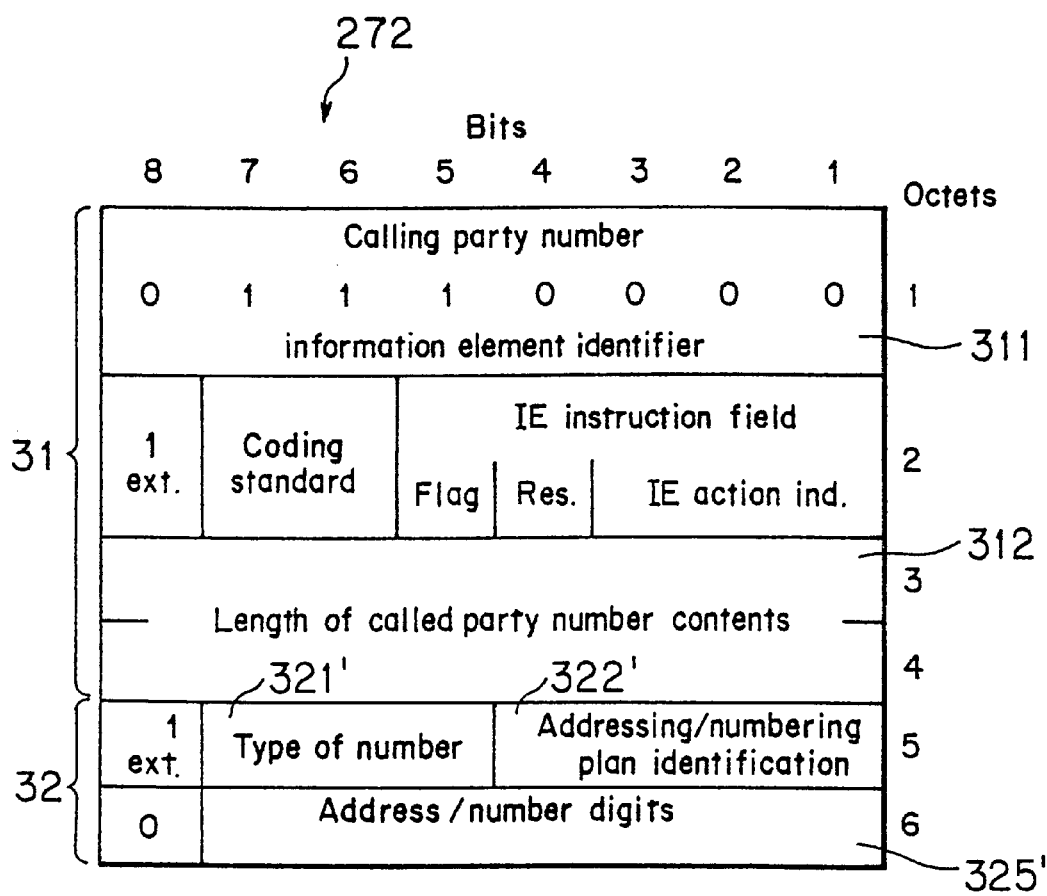
FIG. 7 is a chart illustrating a format of a called number information element in the DSS2 protocol.
Figure 8:
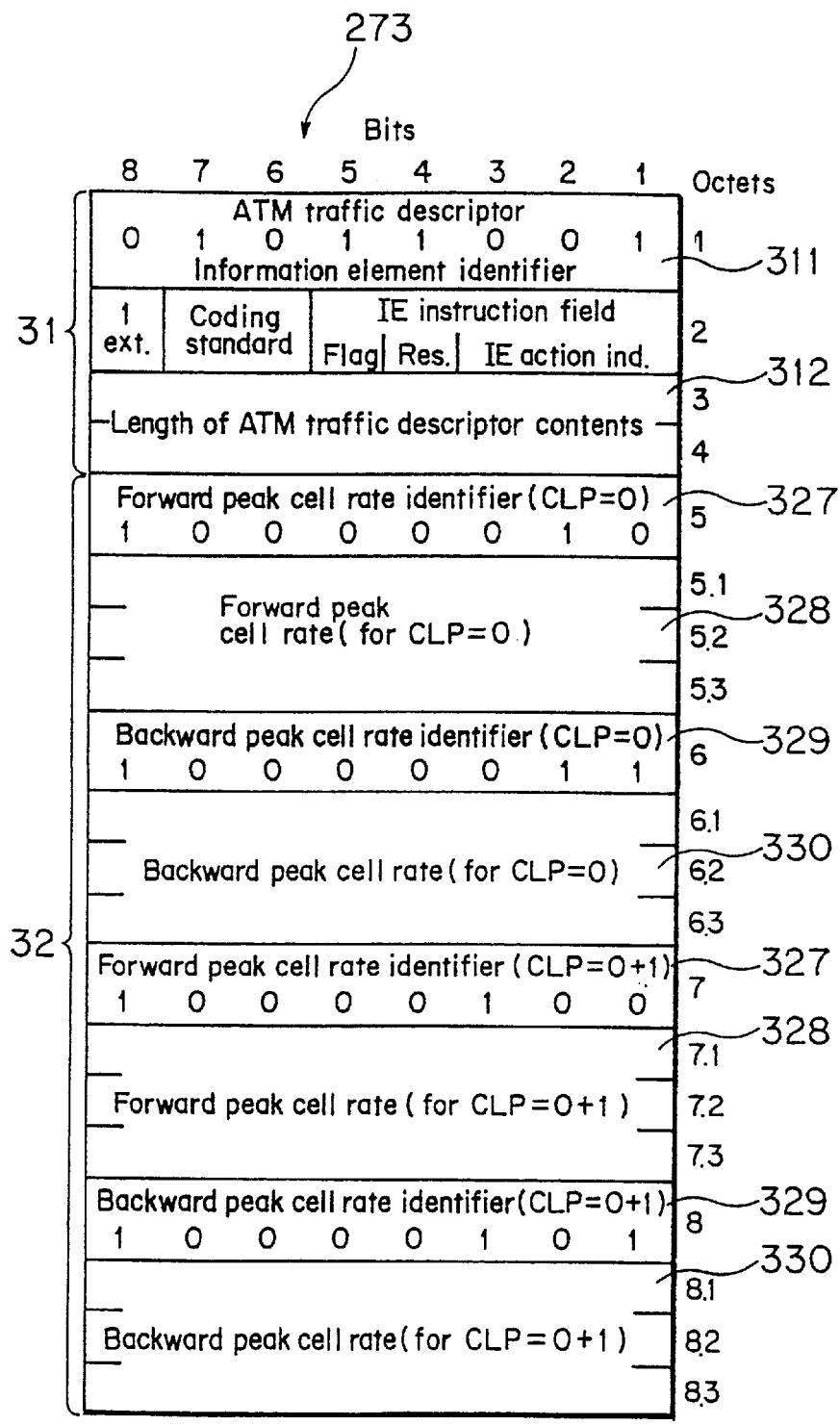
FIG. 8 is a chart illustrating a format of a band information element in the DSS2 protocol.

Each of the foregoing information elements 271 to 273 possesses a format that basically consists of a header 31 of 8 bits×4 octets and an information content 32 including actual information contents concatenated to the header 31, as shown in FIGS. 6 to 8. And, in the header 31 are set an information element identifier 311 to indicate what this information element is, and a length information 312 to indicate the length of the information content 32, etc. In the information content 32 are set information contents in correspondence with the information element identifier 311 and the length information 312.

In case of the calling number information element 271, as shown in FIG. 6, a code (01101100) to indicate "calling number information element" is set as the information element identifier 311 in the header 31. In the information content 32 are set a call number type information (Type of number) 321 to indicate international/domestic call, etc., an call number setting information (Addressing/numbering plan identification) 322 of the ISDN system, etc., a number presentation information (Presentation indicator) 323 to indicate to or not to present (inform) the calling number to the receiving side, and an actual calling number information (Address/number digits) 325.

In case of the called number information element 272, as shown in FIG. 7, a code (01110000) to indicate "called number information element" is set as the information element identifier 311 in the header 31. In the information content 32 are set, in the same manner as the foregoing calling number information element 271, a call number type information (Type of number) 321', an call number setting information (Addressing/numbering plan identification) 322', and an actual called number information (Address/number digits) 325'.

And, in case of the band information element 273, as shown in FIG. 8, a code (01011001) to indicate "band information element" is set as the information element identifier 311 in the header 31. And, a forward peak cell rate 328, an identifier 327 (code=10000010) of the forward peak cell rate 328, a backward peak cell rate 330, and an identifier 329 (code=10000011) of the backward peak cell rate 330, etc., are set in the information content 32.

Further, the foregoing identifiers 327, 329, and the forward/backward peak cell rates 328/330 are set in the band information element 273, as required, as to the case of the priority cell (CLP Cell Loss Priority=0) and the case of the nonpriority cell (CLP=0+1). Here, the foregoing "forward" means the direction from the calling terminal 13 toward the called terminal 14, and the "backward" means the reverse direction (heading from the called terminal 14 toward the calling terminal 13).

The description as to information elements set in the signals (Release, Connect, etc.) except the foregoing Setup signal will be omitted in this embodiment.

Figure 9:
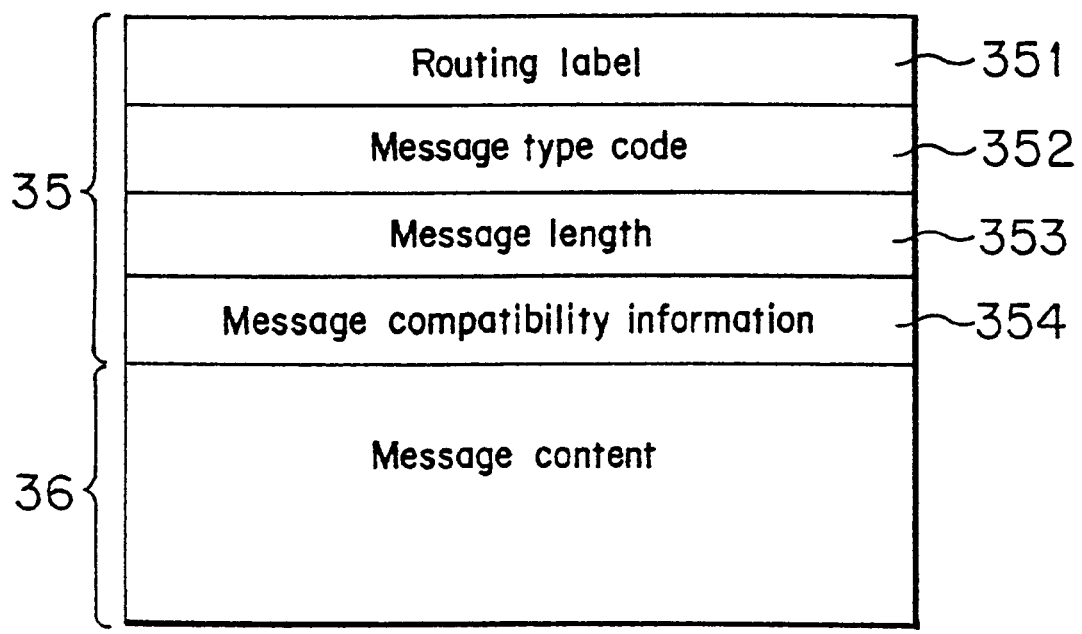
FIG. 9 is a chart illustrating a basic format of a signaling message in a B-ISUP protocol.

The signaling message thus exchanged between the subscriber terminal 13/14 and the ATM exchange 11/12 conforms to the DSS2 protocol as mentioned above. On the other hand, the messages handled in the ATM exchanges 11, 12 conform to a protocol called as the B-ISUP (B-ISDN User Part), which contains a header 35 and a message content 36 to follow the header 35, as shown in FIG. 9.

And, a transfer destination information (Routing label) 351, message type code 352, message length 353, and message compatibility information 354 of the concerned message are set in the corresponding data areas of the header 35; and contents (called as parameters) corresponding to the message type code 352 set in the header 35 are appropriately set in the message content 36.

The following list shows, as one example, what the values of the foregoing message type 352 represent.
(1) 0000 0001: IAM [Initial Address Message (=Setup)]
(2) 0000 1010: IAA [IAM Acknowledge (=Setup Acknowledge)]
(3) 0000 0110: ACM (Address Complete)
(4) 0000 1100: REL (Release)
(5) 0000 1001: ANM [Answer Message (=Connect)]

Figure 10:
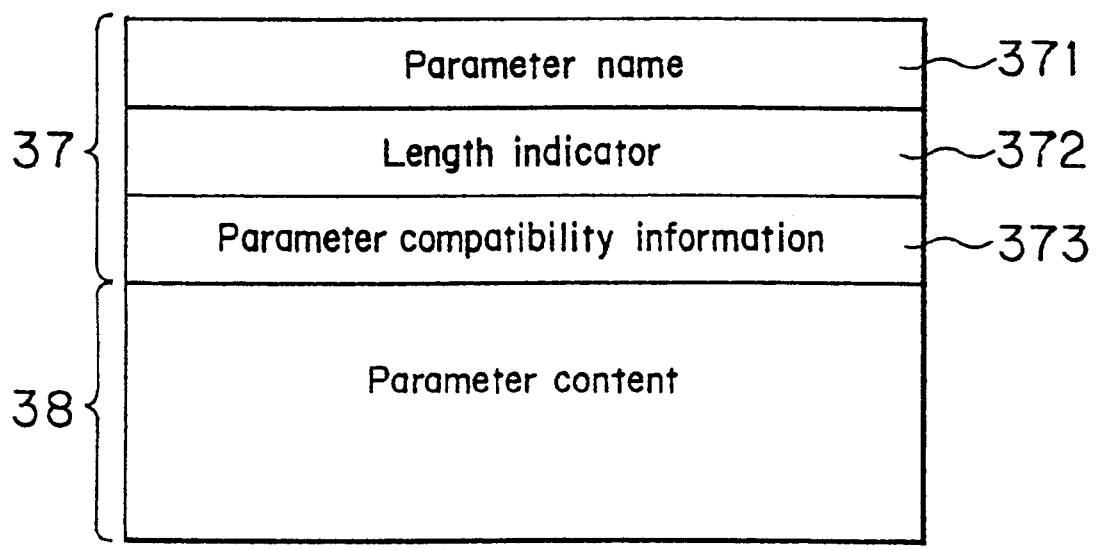
FIG. 10 is a chart illustrating a format of a parameter in the B-ISUP protocol.

The foregoing parameters correspond to the information element 27 in the foregoing DSS2, which basically possesses a format comprising a header 37 and a parameter content 38 to follow the header 37, as shown in FIG. 10. And, a type information (Parameter name) 371, length information (Length indicator) 372, and compatibility information (Parameter compatibility information) 373 of the concerned parameter are set in the corresponding data areas of the header 37; and contents corresponding to the parameter type name 371 set in the header 37 are appropriately set in the parameter content 38.

For example, the foregoing IAM signal is a message between stations for the Setup signal of the foregoing DSS2. And, the calling number information element 271, called number information element 272, and band information element 273, etc., which are contained in the foregoing Setup signal, are converted according to the protocol by the call controller 24 in the ATM exchange 11/12; and the necessary parts as the detailed information of the parameter according to the B-ISUP protocol are each set in the parameter content 38 of the IAM signal.

Figure 11:
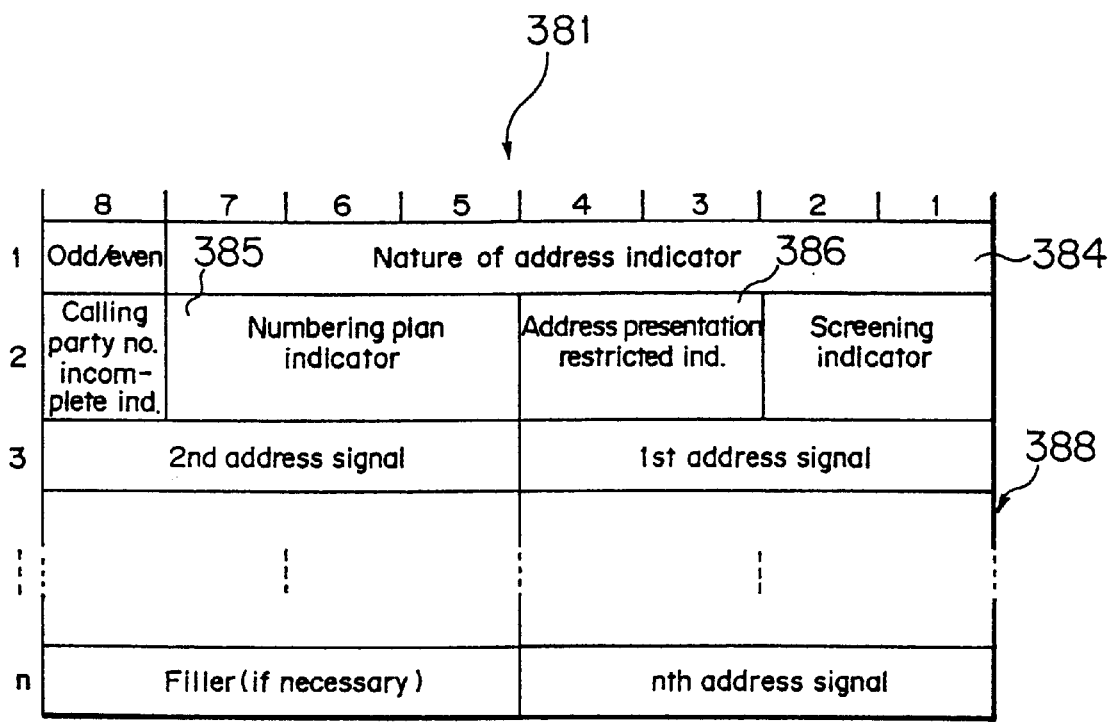
FIG. 11 is a chart illustrating a format of a detailed information of a calling number parameter in the B-ISUP protocol.
Figure 12:
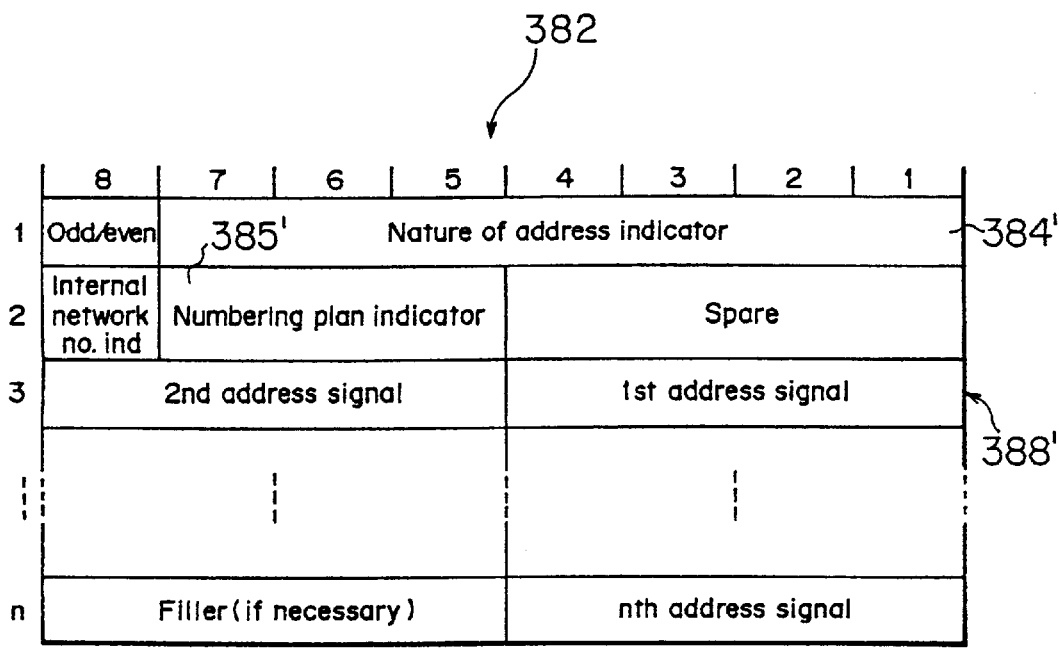
FIG. 12 is a chart illustrating a format of a detailed information of a called number parameter in the B-ISUP protocol.
Figure 13:
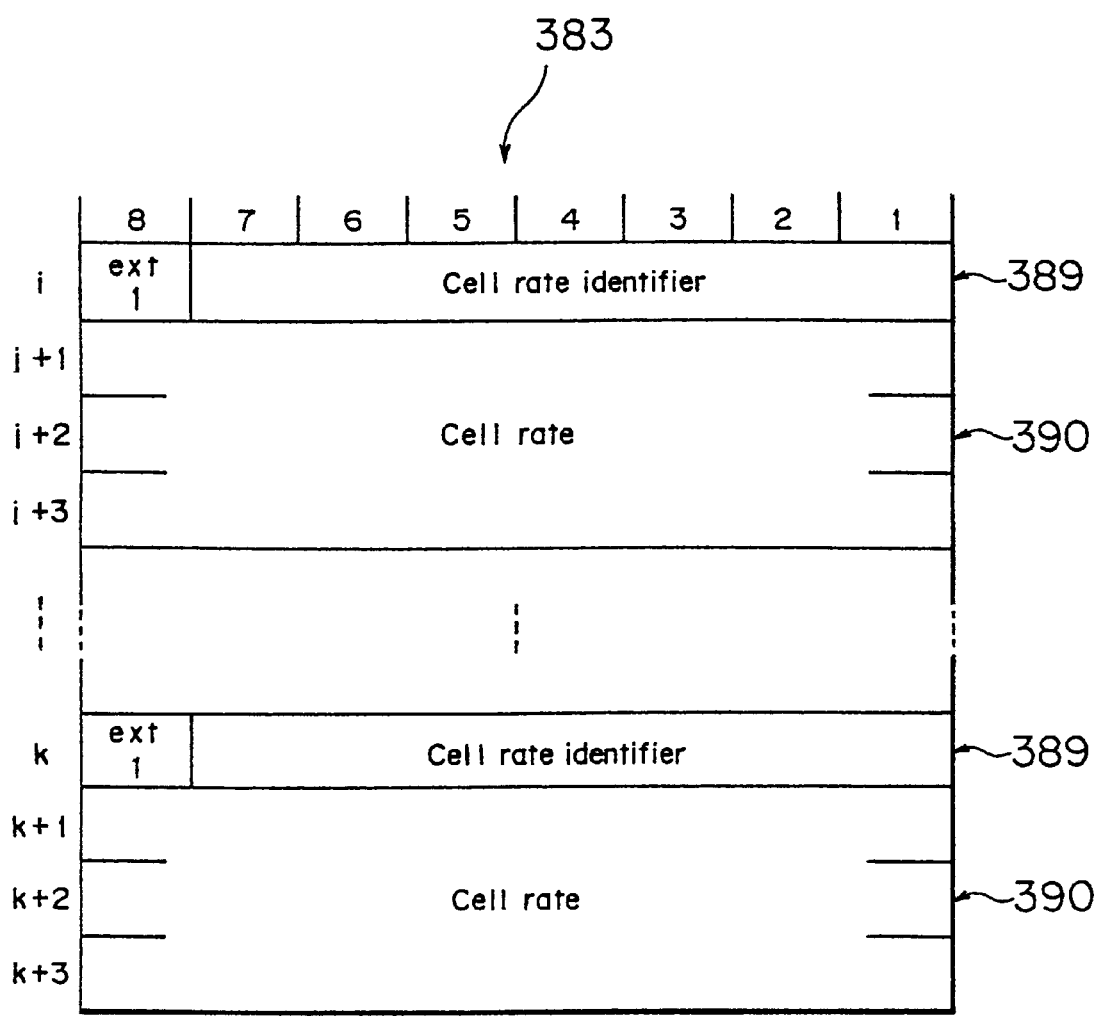
FIG. 13 is a chart illustrating a format of a detailed band parameter information in the B-ISUP protocol.

Concretely, the calling number information element 271 of the Setup signal is set as the calling number parameter detailed information 381, the called number information element 272 of the Setup signal is set as the called number parameter detailed information 382, and the band information element 273 of the Setup signal is set as the band parameter detailed information 383, in the parameter content 38 of the IAM signal as appropriate, as each shown in FIGS. 11 to 13.

For example, in the foregoing calling number parameter detailed information 381, as shown in FIG. 11, the number type information (Type of number) 321 (see FIG. 6) of the Setup signal is set as a number type information (Nature of address indicator) 384 by using the seventh through the first bit (seven bits) of the first octet, and the number setting information (Addressing/numbering plan identification) 322 is set as a number setting information (Numbering plan indicator) 385 by using the seventh bit through the fifth bit (three bits) of the second octet.

Further, the number presentation information (Presentation indicator) 323 of the Setup signal is set as a number presentation information (Address presentation restricted indicator) 386 by using the fourth and the third bits of the second octet, and the actual calling number information (Address/number digits) 325 is set as a calling number information (address signal) 388 by using the octets on and after the third octet.

On the other hand, in the called number parameter detailed information 382, as shown in FIG. 12, the number type information (Type of number) 321' (see FIG. 7) of the Setup signal is set as a number type information (Nature of address indicator) 384' by using the seventh through the first bit (seven bits) of the first octet, the number setting information (Addressing/numbering plan identification) 322' is set as a number setting information (Numbering plan indicator) 385' by using the seventh bit through the fifth bit of the second octet, and the actual called number information (Address/number digits) 325' is set as a called number information (address signal) 388' by using the octets on and after the third octet.

Further, in the band parameter detailed information 383, as shown in FIG. 13, the forward/backward peak cell rates 328, 330 of the Setup signal and the identifiers 327, 329 thereof are each set as a cell rate information (Cell rate) 390 and a cell rate identifier 389.

The description will be omitted here as to the detailed information set in the signals (IAA, ACM, etc.) other than the foregoing IAM signal.

The ATM exchanges 11, 12 execute during the call processing such a protocol conversion processing that converts the signaling message of the foregoing DSS2 protocol received from the subscriber terminal 13 (14) into the message of the foregoing B-ISUP protocol conforming to the exchanges 11, 12, and converts the message of the foregoing B-ISUP protocol transmitted to the subscriber terminal 13 (14) into the message of the foregoing DSS2 protocol conforming to the subscriber terminals 13 (14).

Figure 4:
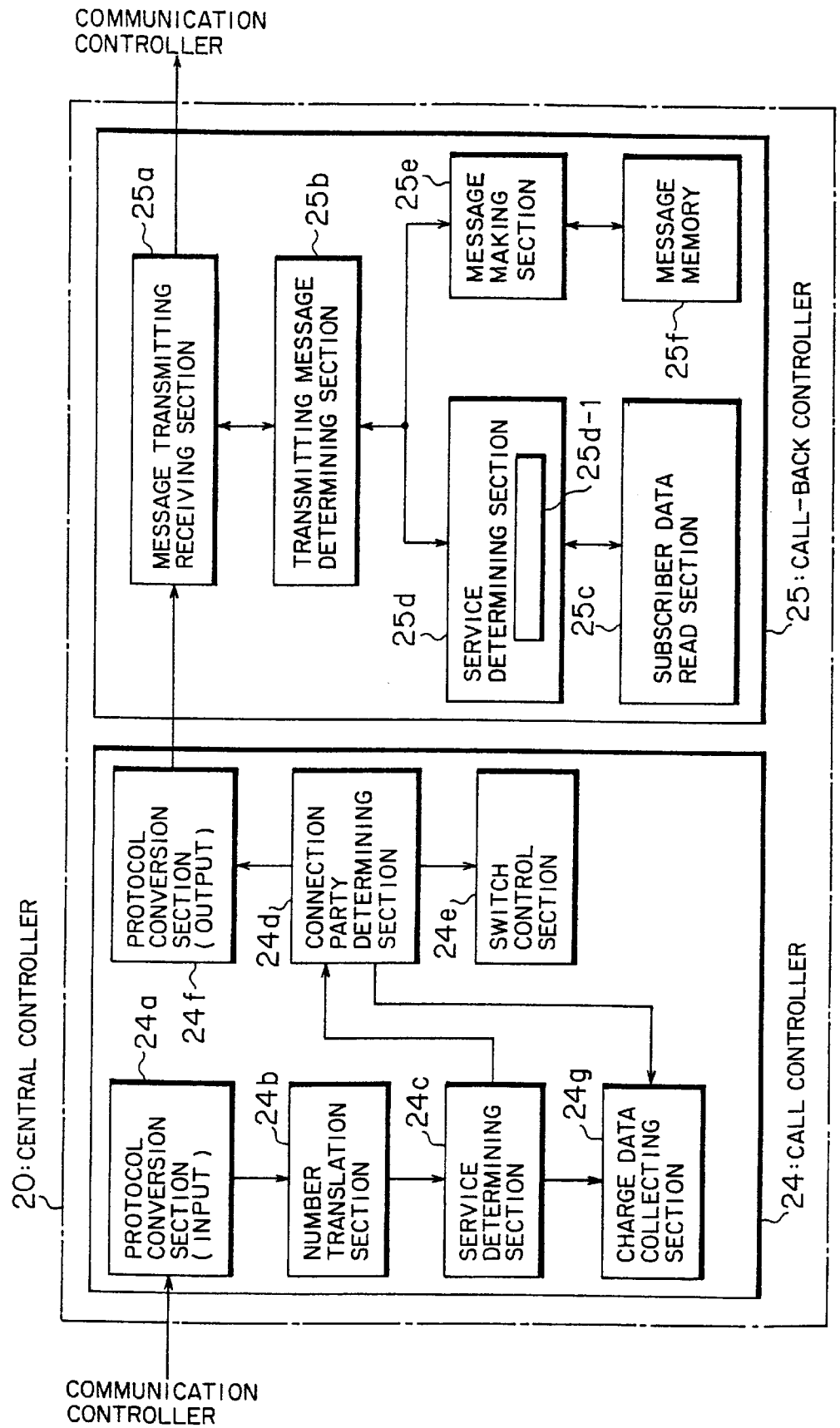
FIG. 4 is a block diagram illustrating a construction of a central controller of the ATM exchange in the embodiment.

Therefore, as shown in FIG. 4, the foregoing call controller 24 is comprised of, from the functional view point, protocol conversion sections 24a, 24f, call number translation section 24b, service determining section 24c, connection party determining section 24d, switch control section 24e, and charge data collecting section 24g.

Here, the protocol conversion section 24a uniformly converts the signaling message of the DSS2 protocol received through the communication control section 19 (see FIG. 3) into the message of the B-ISUP protocol. However, the protocol conversion section 24a does not convert the protocol, if the received signaling message is a message of the B-ISUP protocol from the other ATM exchanges 11, 12.

The call number translation section 24b translates the number information (calling number information 388, called number information 388') contained in the message whose protocol is converted by the protocol conversion section 24a. In this embodiment, the translation section 24b gives the type number of the device that contains the calling terminal 13/called terminal 14 and the location number to indicate where the foregoing terminals 13, 14 are contained in the device, on the basis of the foregoing calling number information 388 and called number information 388'.

The service determining section 24c determines the service to be provided to the subscriber terminals 13, 14 such that a call (path) between the subscriber terminal 13 and 14 is connected or disconnected, on the basis of the call number information translated by the foregoing translation section 24*b*. The connection party determining section 24*d* determines the party to which messages (setting/disconnection of a path, etc.) are connected (transmitted) in correspondence with the service determined by the service determining section 24*c*.

The switch control section 24*e* controls to switch the ATM switch 16 in accordance with the determination by the connection party determining section 24*d*. The protocol conversion section 24*f* converts the message of the B-ISUP protocol to be transmitted to the connection party determined by the connection party determining section 24*d* into the message of the foregoing DSS2 protocol. However, the protocol conversion section 24*f* does not convert the protocol if the connection party of the message is the other station, and transmits the message of the B-ISUP protocol as the format remains.

The charge data collecting section 24*g*, receiving the Setup (or IAM) signal, secures an area (not illustrated) of the charge data in the main memory 21, wherein the subscriber terminal 13 (or 14) having the calling number information 325 (or 388) contained in the received Setup (or IAM) signal is treated as the sender. And, each time a call is disconnected and the communication finishes, the collecting section 24*g* collects the forward/backward passing cell numbers that are counted by the foregoing shared interface shelf 17 (see FIG. 2), as an information for making the charge data.

On the other hand, the foregoing call-back controller 25 transmits the Release signal (disconnection request signal) to the calling terminal 13 to disconnect a path heading the called terminal 14 from the calling terminal 13 set by the call controller 24, and thereafter, on the basis of the calling/called number information 325/325' of the Setup signal, the call-back controller 25 transmits the reverse Setup signal (reverse connection request signal) to the calling terminal 13 from the called terminal 14, thus executing the stealth call-back service that sets a reverse path to the foregoing path.

Therefore, the call-back controller 25 in this embodiment is comprised of a message transmitting receiving section 25*a*, transmitting message determining section 25*b*, subscriber data read section 25*c*, service determining section 25*d*, message making section 25*e*, and message memory 25*f* as shown in FIG. 4.

The message transmitting receiving section 25*a* receives the message of the DSS2 protocol from the subscriber terminals 13, 14 received through the communication control section 19 and the call controller 24. On the other hand, the message transmitting receiving section 25*a* transmits a message through the communication control section 19 to the subscriber terminals 13, 14 determined by the transmitting message determining section 25*b*. Here, in this embodiment, when the message transmitting receiving section 25*a* receives the Setup signal, the message memory 25*f* is to store the content of the information.

The transmitting message determining section 25*b* determines a message to be transmitted in accordance with the signaling message received by the foregoing message transmitting receiving section 25*a*. In this embodiment, when the service determining section 25*d* determines that the signaling message received by the message transmitting receiving section 25*a* is the Setup signal and the sender of the Setup signal is the terminal that allows the call-back service to be executed, the transmitting message determining section 25*b* transmits the Release signal to the sender of the foregoing Setup signal, and then transmits the Setup signal.

The subscriber data read section 25*c* retrieves the main memory 21 (see FIG. 3) on the basis of the number information (called number information 325' or 388') contained in the Setup signal (or IAM signal) received by the message transmitting receiving section 25*a*, and thereby reads out the subscriber data 21*a* of the subscriber terminal 14 being the destination of the Setup signal.

Figure 14:
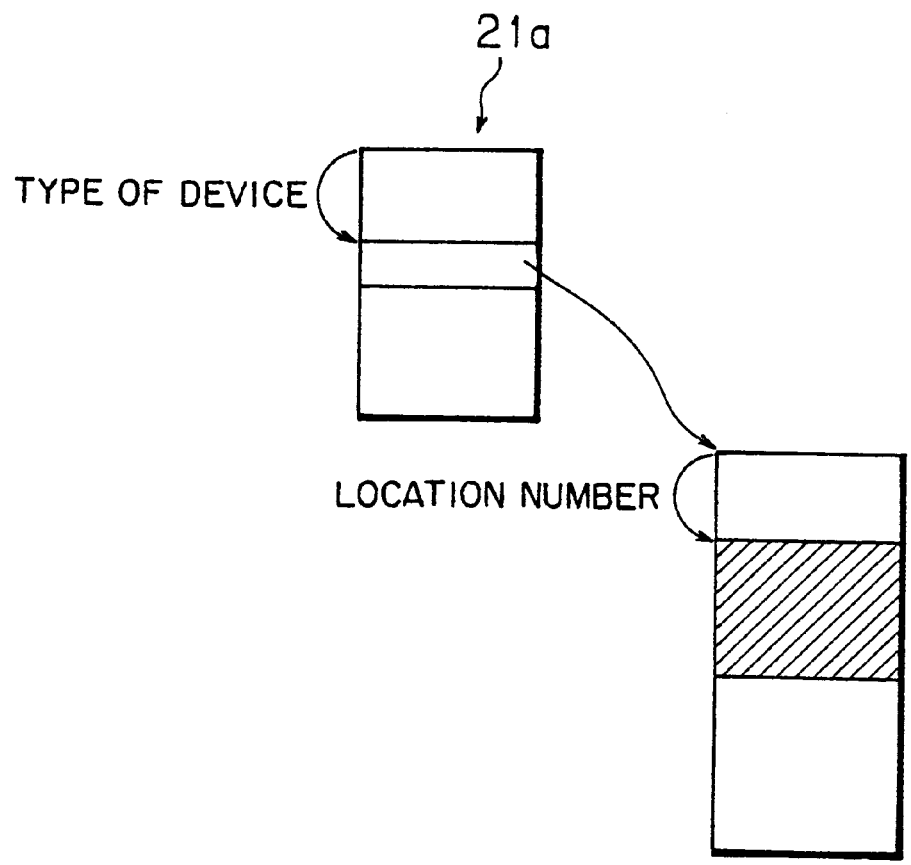
FIG. 14 is a chart typically illustrating one example of a subscriber data used in the ATM exchange in the embodiment.

The subscriber data 21*a* in this embodiment is constructed such that it can be indexed for each device type number and for each location number, as typically shown in FIG. 14. The subscriber data read section 25*c* indexes the subscriber data 21*a*, serving the foregoing device type number and the location number obtained by the call number translation section 24*b* as a key; thereby reading out the subscriber data 21*a* corresponding to the destination.

The service determining section 25*d* determines to or not to execute the call-back service (control), and in this case, it has a called terminal determining section 25*d*-1 to determine whether the called terminal 14 is a terminal allowed the call-back service to be executed on the basis of the subscriber data 21*a* read out by the subscriber data read section 25*c*. And, if the called terminal determining section 25*d*-1 determines that the called terminal 14 is a terminal allowed the call-back service to be executed, the service determining section 25*d* will give the instruction to execute the call-back service to the transmitting message determining section 25*b*.

Concretely, as shown in FIG. 15 with slant lines, the foregoing subscriber data 21*a* is designed to contain a stealth call-back service flag (SCB) 211 to indicate the possession of right to receive the stealth call-back service and a stealth call-back active flag (SCBF) 212 to indicate whether or not the call-back service can be executed when the Setup (or IAM) signal is received. If both the corresponding flag 211 and 212 are ON (for example, "1") when receiving the Setup signal, the called party is to be determined as a terminal allowed the call-back service.

That is, the subscriber data 21*a* shown in FIGS. 14, 15 functions as an attribute information table to store the attribute information to indicate whether the subscriber terminal 14 is a terminal allowed the call-back control to be executed, for each of the subscriber terminals 14. And, the foregoing subscriber data read section 25*c* functions as an attribute information reading unit to read out the information on the attribute information table.

FIG. 16 through FIG. 20 illustrate the detailed contents of data except the call-back service flag 211 and the call-back active flag 212 in the foregoing subscriber data 21*a* shown in FIG. 15.

Next, the foregoing message making section 25*e* makes a message to be transmitted on the basis of the data for making the signaling message stored in the message memory 25*f*, in accordance with the determination by the transmitting message determining section 25*b*. In this embodiment, if the foregoing service determining section 25*d* determines to execute a call-back service, the message making section 25*e* makes a disconnection request (Release) signal of the path on the basis of the calling/called number information 325, 325', in accordance with the instruction from the transmitting message determining section 25*b*, and makes a setting request (Setup) signal of a path heading from the called terminal 14 to the calling terminal 13.

That is, the foregoing message making section 25*e* has the functions (1) and (2) mentioned below, and the message transmitting receiving section 25*a* has the following functions (3) and (4).

(1) to generate a disconnection request (Release) signal for disconnecting a path established by the call controller 24 (a function as a release signal generator).

(2) to generate a reverse call setting request (Setup) signal transmitted from the called terminal 14 to the calling terminal 13 on the basis of the number information 325, 325' (a function as a reverse call request signal generator)

(3) a function as a release request signal transmitter for transmitting the Release signal generated by the release signal generator to the calling terminal 13.

(4) a function as a reverse call request signal transmitter for transmitting the reverse call request (Setup) signal generated by the reverse call request signal generator to the calling terminal 13 after transmitting the Release signal.

Hereunder, the operation of the ATM exchange 12 in this embodiment constructed as above will be described in detail with reference to FIG. 21 through FIG. 23.

Figure 21:
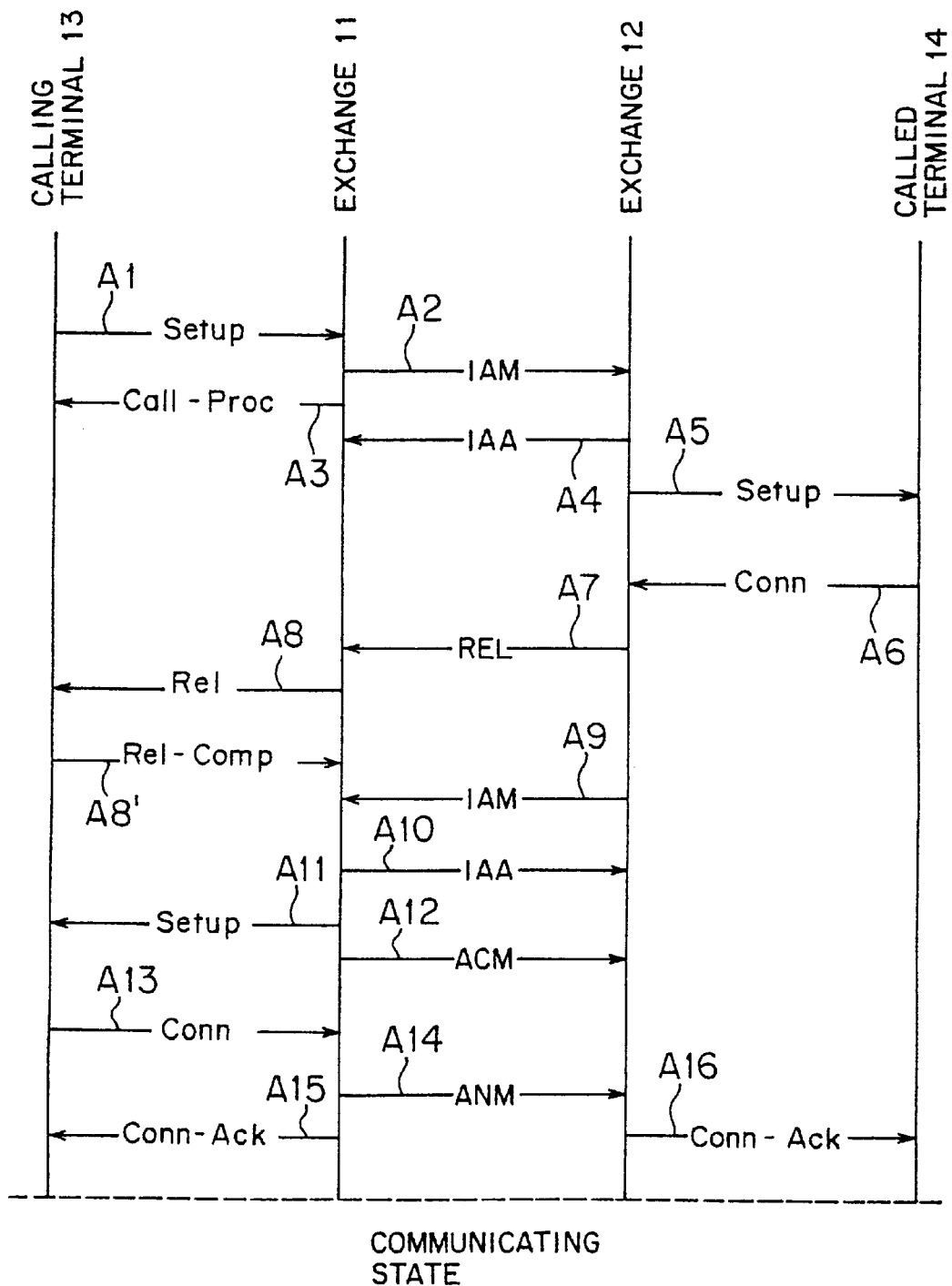
FIG. 21 is a signal sequence chart for explaining the operation of the ATM exchange in the embodiment.

First, as shown in FIG. 21, suppose that a subscriber terminal 13 transmits the Setup signal to communicate with a subscriber terminal 14 at step A1. This Setup signal is received by the call controller 24 of the ATM exchange 11 (hereunder, referred to as calling exchange 11). In the call controller 24, the received Setup signal is converted by the protocol conversion section 24a into the IAM signal [the protocol (format) is converted], and then the IAM signal is transmitted to the ATM exchange 12 containing the subscriber terminal 14 at step A2. On the other hand, the signaling message (Call-Proc) to indicate that the path is being set is transmitted back to the subscriber terminal 13, being the sender that transmitted the Setup signal, at step A3.

Figure 22:
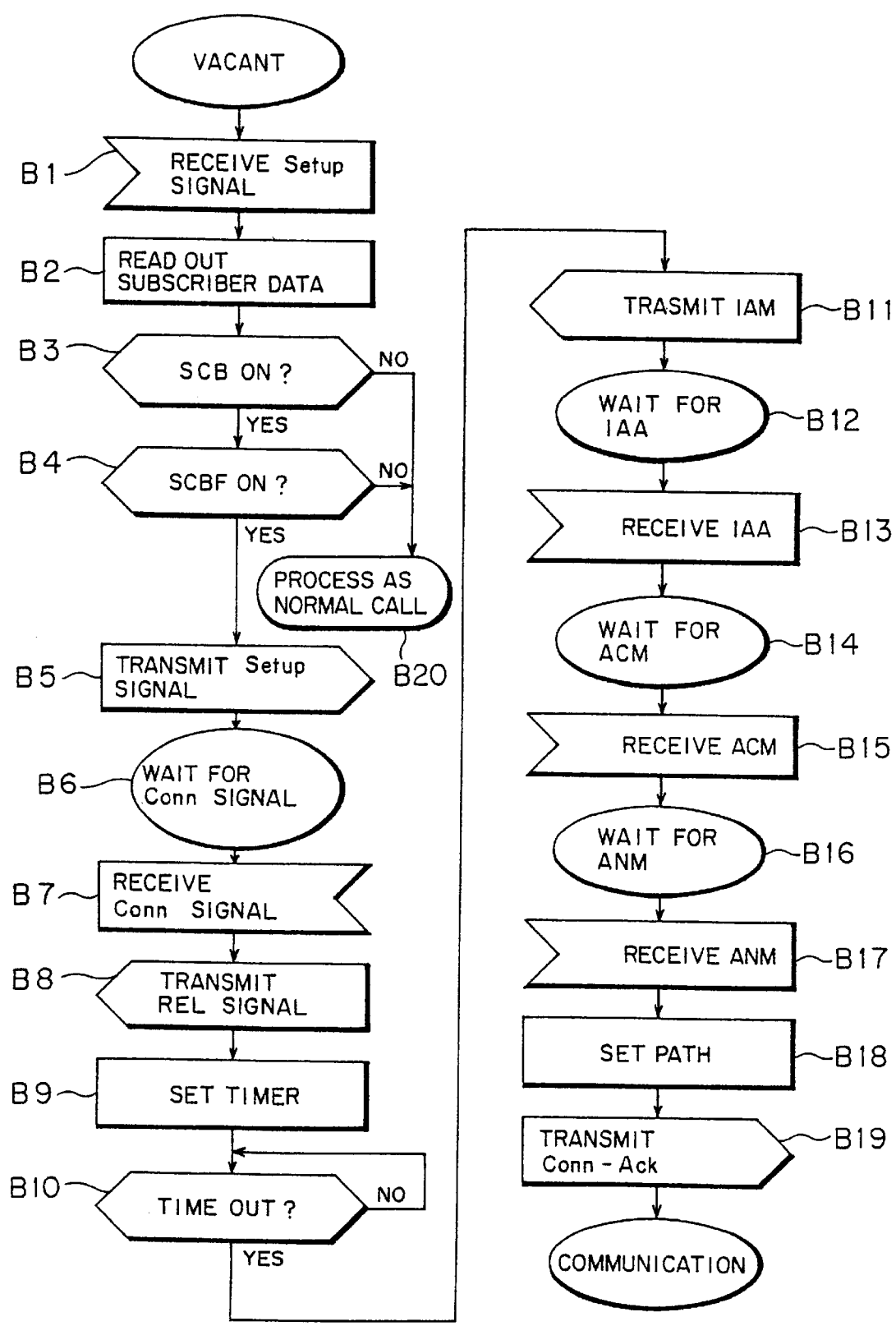
FIG. 22 is a flow chart for explaining the operation of the ATM exchange in the embodiment.

Next, as shown in FIG. 22, when the foregoing IAM signal is received by the call controller 24 of the ATM exchange 12 (hereunder, referred to as called exchange 12), the call number translation section 24b in the call controller 24 obtains the type number and the location number of the device that contains the calling terminal 13/called terminal 14 on the basis of the calling/called number information 388, 388' contained in the received IAM signal.

And, the call controller 24 causes the service determining section 24c and the connection party determining section 24d to determine the connection party of the path on the basis of the numbers obtained as above, causes the switch control section 24e to control the ATM switch 16, and generates the acknowledgment signal (IAA signal) in response to the foregoing IAM signal to send back to the calling exchange 11 (step A4).

On the other hand, the received IAM signal is converted into the Setup signal of the DSS2 protocol by the protocol conversion section 24f to be transmitted to the call-back controller 25. In the call-back controller 25, as shown in FIG. 22, this Setup signal is received by the message transmitting receiving section 25a (step B1), and then, the subscriber read section 25c indexes the subscriber data 21a serving the type number and the location number of the device obtained on the basis of the called number information in the Setup signal as a key, thereby reading out the subscriber data 21a of the called terminal 14 (step B2).

Here, the call-back controller 25 makes the message memory 25f store the information of the information element 27 (at least, calling/called information elements 271, 272, and band information element 273) of the Setup signal received by the message transmitting receiving section 25a.

And, the called terminal determining section 25d-1 of the service determining section 25d in the call-back controller 25 determines whether or not both the flag 211 and 212 (see FIG. 15) of the subscriber data 21a are ON (step B3, B4). If both the flag 211 and 212 are ON (if both the step B3 and B4 determine YES), the call-back controller 25 transmits the Setup signal through the communication control section 19 to the called terminal 14 [step B5 (step A5 in FIG. 21], which brings the step into the waiting state for receiving the Connect signal from the called terminal 14 (step B6).

Thereafter, when the message transmitting receiving section 25a of the call-back controller 25 receives the Connect signal from the called terminal 14 [step B7 (step A6 in FIG. 21)], the call (path) heading from the calling terminal 13 to the called terminal 14 (between the called exchange 12 and the called terminal 14) is set at this moment. However in this case, since the called terminal determining section 25d-1 determines that both the flag 211 and 212 in the subscriber data 21a are ON and the called terminal 14 is a terminal allowed the call-back service to be executed, first, the transmitting message determining section 25b gives the instruction to the message making section 25e to make the disconnection request (Release) signal for the calling terminal 13.

And, the message making section 25e makes the Release signal transmitted from the called terminal 14 to the calling terminal 13 on the basis of the information in the information element 27 of the Setup signal stored in the message memory 25f. This Release signal is converted into the REL signal of the B-ISUP protocol by the call controller 24 and transmitted to the calling terminal 13 (calling exchange 11) [step B8 (step A7 in FIG. 21)].

And, as shown in FIG. 21, receiving this REL signal through the call controller 24, the calling exchange 11 converts the format into the DSS2 format (Release signal) through the protocol conversion section 24a or 24f, and then, transmits the converted signal to the calling terminal 13 (step A8). Thereafter, when the response (Release Complete) to this disconnection (Release) request signal is received by the calling exchange 11 (step A8'), the call heading from the calling terminal 13 to the called terminal 14 set by the call controller 24 of the called exchange 12 is disconnected as mentioned above.

On the other hand, when the call-back controller 25 of the called exchange 12 transmits the disconnection request signal to the calling terminal 13 (calling exchange 11) as above as shown in FIG. 22, the transmitting message determining section 25b sets a timer that clocks a specific time (at least, an estimated time till the Release Complete signal is received by the calling exchange 11 to disconnect the path since the REL signal has been transmitted) (step B9), and monitors whether this timer is in the time-out (NO route in step B10).

And, when this timer goes the time-out, the transmitting message determining section 25b gives an instruction to the message making section 25e to make the Setup signal for the calling terminal 13. Receiving this instruction, the message making section 25e makes the Setup signal heading the calling terminal 13 from the called terminal 14, on the basis of the information of the information element 27 of the Setup signal stored in the message memory 25f.

Concretely, the message making section 25e transposes the calling number information 325 and the called number information 325' on the basis of the contents (information elements 271 to 273) of the Setup signal stored in the message memory 25f, and makes the Setup signal in which the forward and backward peak cell rates 328, 330 are transposed, and thereby makes the backward Setup signal (reverse connection request signal) transmitted to the calling terminal 13.

And, the call-back controller 25 transmits the Setup signal thus made to the call controller 24 through the transmitting message determining section 25b and the message transmitting receiving section 25a in the same manner as the foregoing disconnection request signal. The call controller 24 converts this Setup signal into the IAM signal of the B-ISUP protocol, transmits the converted signal to the calling terminal 13 (calling exchange 11) [step B11 (step A9 in FIG. 21)], and waits for receiving the Acknowledge information (IAA signal) in correspondence to this IAM signal (step B12)

On the other hand, the calling exchange 11 returns the Acknowledge information (IAA signal) in correspondence to the foregoing IAM signal to the called exchange 12 (step A10). In the calling exchange 11, the connection party determining section 24d determines the connection party of the path on the basis of the calling/called number information 388/388' set in the received IAM signal, and the protocol conversion section 24a converts the received IAM signal into the Setup signal, transmits the converted signal to the calling terminal 13 (step A11), and transmits to the called exchange 12 the information (ACM signal) that the reception of the address information (calling/called number information 388/388') required for setting the path is complete (step A12).

Thereafter, when the calling terminal 13 responds to the foregoing Setup signal and transmits the response (Connect) signal (step A13), the calling exchange 11 converts the Connect signal into a signal (ANM signal) of the B-ISUP protocol for use between stations by means of the protocol conversion section 24f of the call controller 24. And then, the calling exchange 11 transmits the ANM signal to the called exchange 12 (step A14), and transmits the Acknowledge signal (Conn Ack) of the foregoing Connect signal to the calling terminal 13 (step A15).

And, at the time that the called exchange 12 receives the foregoing IAA signal, ACM signal, ANM signal from the calling exchange 11 normally (steps B13 to B17) as shown in FIG. 22, the called exchange 12 completes the setting of the call (path) heading the calling terminal 13 from the called terminal 14 (step B18), and transmits the same Acknowledge signal (Conn Ack) as the foregoing to the called terminal 14 [step B19 (step A16 in FIG. 21)], thereby starting a communication such that the calling terminal 13 becomes a called party and the called terminal 14 becomes a calling party.

Accordingly, the rate for the communication between the terminal 13 and 14 is charged not to the calling terminal 13 that transmitted the call setting request, but to the called terminal 14.

And, when either one of the foregoing flags 211, 212 is in the OFF state (when either the step B3 or B4 determines NO), the called terminal determining section 25d-1 determines that the called terminal 14 is not a terminal allowed the call-back service, and accordingly, the call-back controller 25 is put into operation to pass the message exchanged between the call controller 24 and the communication control section 19 therethrough. In consequence, the call controller 24 executes the normal call setting (step B20), and the communication rate is charged to the calling terminal 13.

Next, the charging process at the called exchange 12 when the call-back service is in operation will be described with reference to the typical drawings shown in FIGS. 23(a) to FIG. 23(c).

Figures 23A, 23B, 23C:
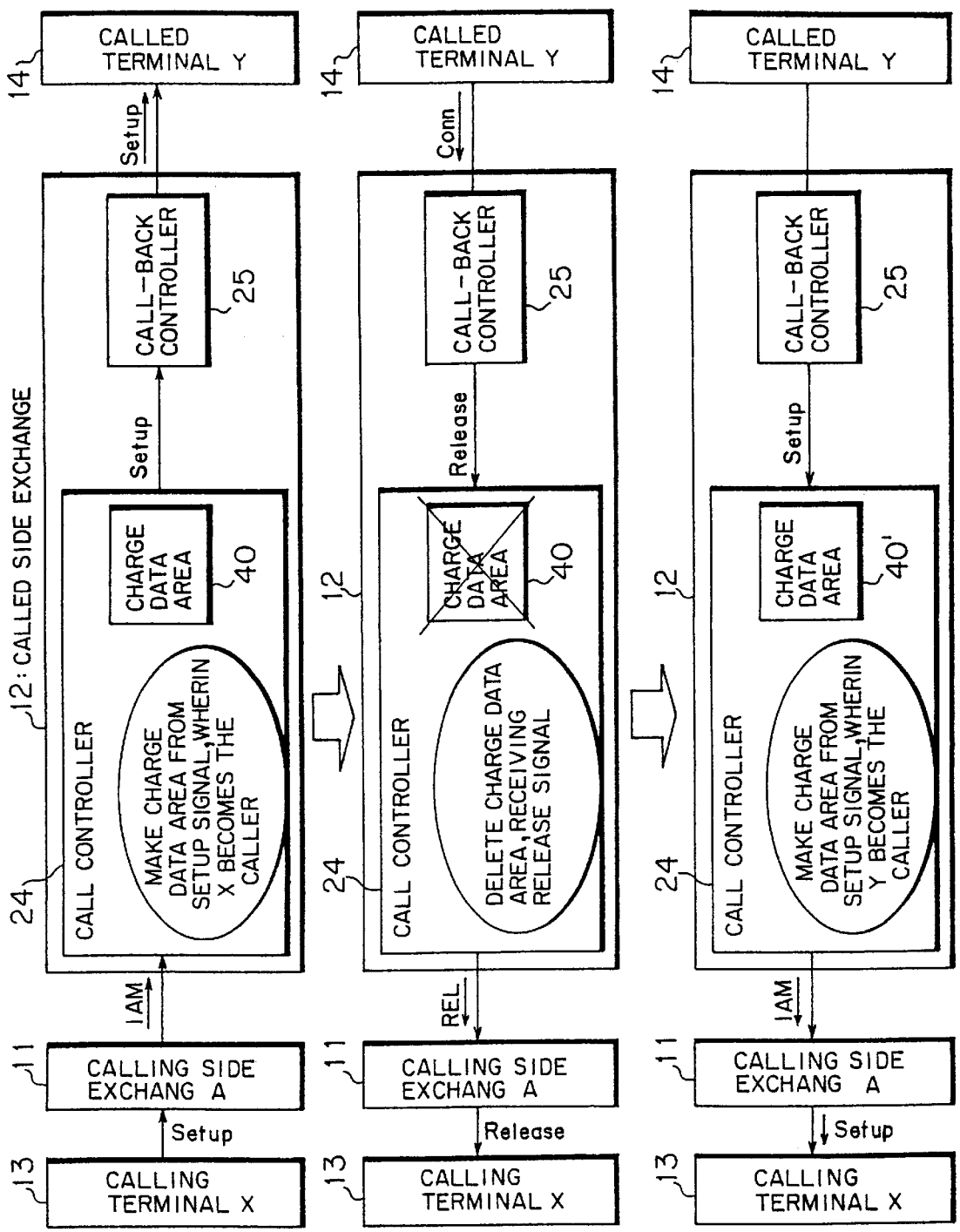
FIG. 23(a) through FIG. 23(c) are typical charts for explaining a call rate charging process in the ATM exchange in the embodiment.

First, as shown in FIG. 23(a), when the Setup signal from the calling terminal 13 is converted into the IAM signal by the calling exchange 11 to be received by the call controller 24 of the called exchange 12, the charge data collecting section 24g (see FIG. 4) in the call controller 24 makes a charge data area 40 wherein the calling terminal 13 becomes a calling party as usual, on the basis of the content (calling number information 388) of the received IAM signal (actually, the data area is secured in the main memory 20).

However, when the call-back controller 25 executes the call-back control and generates the disconnection request (Release) signal forwarded to the calling terminal 13, as shown in FIG. 23(b), the charge data collecting section 24g receives this Release signal from the call-back controller 25, and the charge data collecting section 24g deletes the charge data area 40 made as above accordingly.

Thereafter, when the call-back controller 25 generates the Setup signal forwarded to the calling terminal 13 and the call controller 24 receives this Setup signal, as shown in FIG. 23(c), the charge data collecting section 24g makes a charge data area 40' wherein the called terminal 14 becomes a calling party, on the basis of the content (calling number information 325) of the Setup signal.

And, when the communication between the terminal 13 and 14 is finished, the charge data collecting section 24g acquires the forward/backward cell number (or, communication time) from the shared interface shelf 17, and registers the acquired information in the charge data area 40'. Thereby, the communication rate between the terminal 13 and 14 is charged to the called terminal 14.

As described above, according to the ATM exchange 12 of this embodiment, when the call controller 24 receives the Setup (or, IAM) signal transmitted from a calling terminal 13 to a called terminal 14, the call-back controller 25 transmits the Release signal to the calling terminal 13 to disconnect the call transmitted from the calling terminal 13 to the called terminal 14, and then, transmits the Setup signal to the calling terminal 13 to set up a reverse call. Therefore, without a special operation by the terminals 13 and 14, it can automatically be arranged that the sender is treated as the called terminal 14 and the destination is treated as the calling terminal 13.

Therefore, without positioning an operator in the switched network or preparing a special system such as the intelligent network (IN), as is the case with the collect call service or the free dial service, it is possible to provide the service that charges the called party for the communication rate very easily in a low cost.

Further, since this embodiment executes the call-back service only when the called terminal determining section 25d-1 of the call-back controller 25 determines that the called terminal 14 is a terminal allowed the call-back service on the basis of the attribute information (flags 211, 212) of the subscriber data 21a of the called terminal 14, it is possible to avoid a misoperation such that a call-back service is executed unconditionally against the intention of the subscribers to automatically set the called terminal 14 as the sender, thus serving to enhance the reliability and serviceability of the call-back control.

(b-2) Description of a First Modified Example

Figure 24:
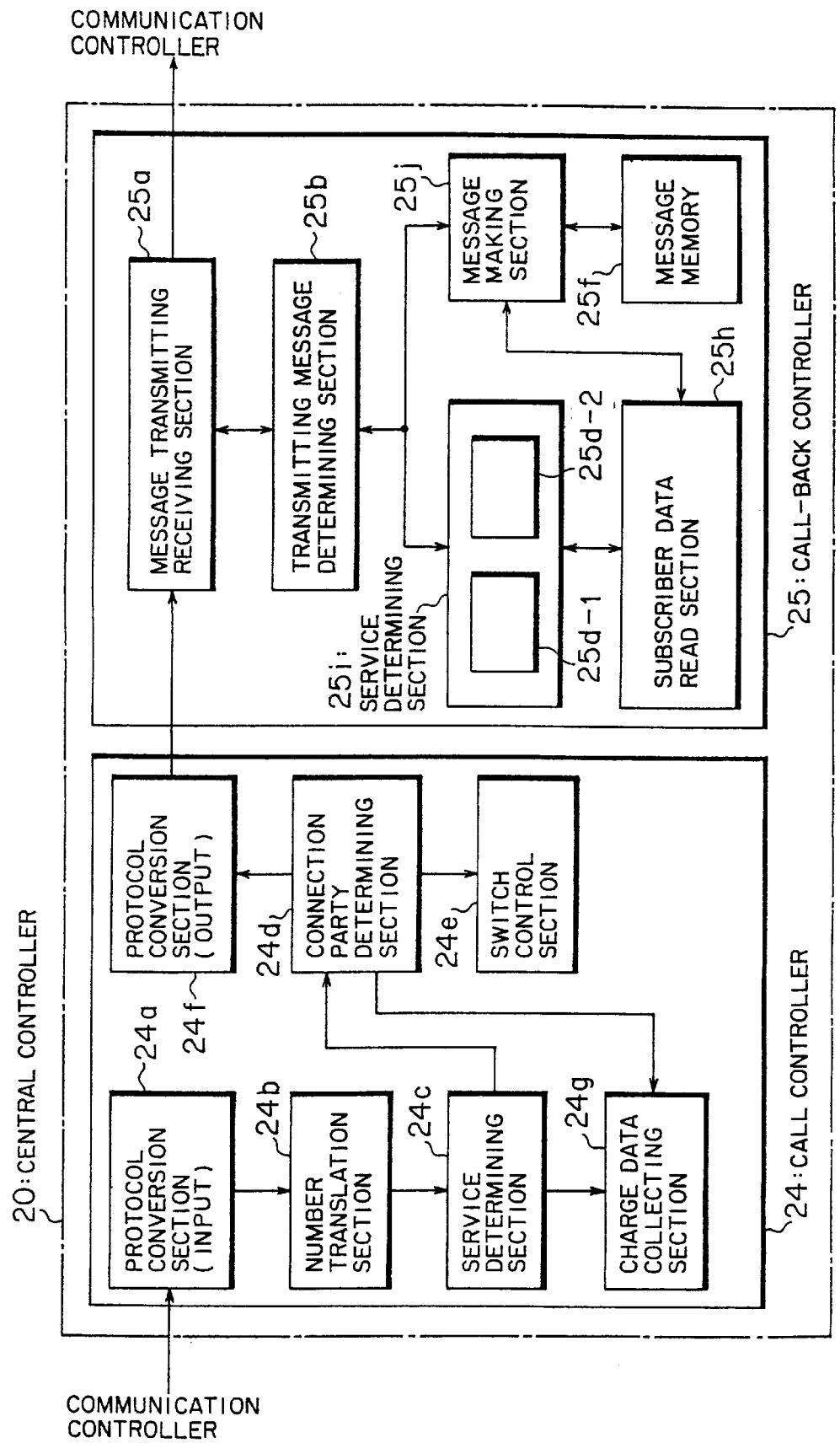
FIG. 24 is a block diagram illustrating a first modified example of the central controller of the ATM exchange in the embodiment.

FIG. 24 is a block diagram illustrating a first modified example of the foregoing central controller 20. Compared to the one shown in FIG. 4, the central controller 20 shown in FIG. 24 differs in that the call-back controller 25 comprises a service determining section 25i and a message making section 25j. And, in this modified example, the subscriber data 21a in the main memory 21 contains a band information table 214 as typically shown in FIG. 25.

Figure 25:
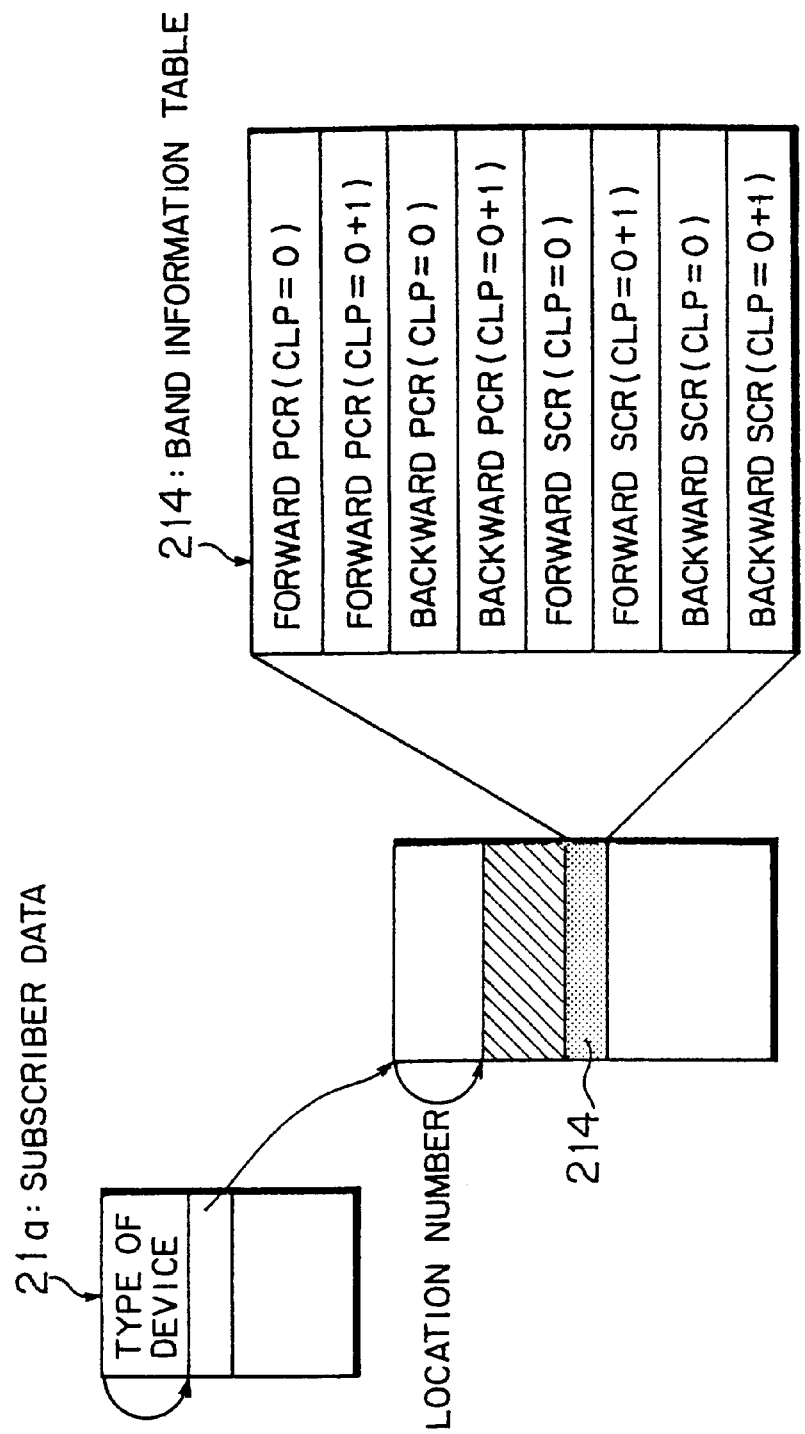
FIG. 25 is a chart typically illustrating a subscriber data used in the first modified example.

The band information table 214 stores a band value (peak cell rate) for use in setting a call between the subscriber terminal 13 and 14. In this modified example, as shown in FIG. 25, the Forward/Backward peak cell rates (PCR: Peak Cell Rate) are registered in case of the priority cell (CLP: Cell Loss Parity=0), and the nonpriority cell (CLP=0+1).

And, the service determining section 25i contains a band information determining section 25d-2, in addition to the called terminal determining section 25d-1 in the abovementioned embodiment. The band information determining section 25d-2 is to determine whether or not the band information element 273 of the Setup signal transmitted from the calling terminal 13 contains "0" in the band value (peak cell rate).

Further, if the called terminal determining section 25d-1 determines that the called terminal 14 is a terminal allowed the call-back service and the band information determining section 25d-2 determines that the band value (peak cell rate)="0" is set in the band information element 273 of the Setup signal transmitted from the calling terminal 13, the message making section 25j sets the corresponding band value registered in the band information table 214 in the band information element 273 to make the Setup signal.

In other words, in the first modified example, when the called terminal determining section 25d-1 determines that the called terminal 14 is a terminal allowed the call-back service and the band information determining section 25d-2 determines that the band value="0" is set in the Setup signal, the Setup signal containing the corresponding band value in the band information table 214 is made by the message making section 25j, and this Setup signal is transmitted to the calling terminal 13; and thereby, the call-back service is carried out which employs the band value registered beforehand in the foregoing table 214 for the communication between the terminal 13 and 14.

The operation of the ATM exchange 12 (call-back controller 25) thus constructed in the first modified example will be described with reference to the flow chart (steps C1 to C15) shown in FIG. 26.

First, a Setup signal is transmitted from a subscriber terminal 13 in the same manner as the foregoing embodiment, and the Setup signal is received by the call-back controller 25 through the ATM exchange 11 (step C1). Then, a subscriber data read section 25h of the call-back controller 25 reads out the subscriber data 21a of the called terminal 14 on the basis of the called number information 325' of the Setup signal (step C2).

And, the called terminal determining section 25d-1 of the service determining section 25i determines whether both the flag 211 and 212 set in the subscriber data 21a of the called terminal 14 thus read out are ON (steps C3, C4). If the result shows that either one of the flags 211, 212 is OFF (if either the step C3 or C4 determines NO), the service determining section 25i determines that the called terminal is not a terminal allowed the call-back service and the normal call setting is carried out by the call controller 24 (step C8).

On the other hand, if both the flag 211 and 212 are ON (if both the step C3 and C4 determine YES), the service determining section 25i reads out the band value set in the band information element 273 of the received Setup signal (step C5), and determines whether or not the band value is equal to "0" by means of the band information determining section 25d-2 (step C6).

As the result, if the band value is not equal to "0", the band information determining section 25d-2 determines that the calling terminal 13 does not request the call-back service, and the normal call setting is carried out by the call controller 24 (from NO route in step C6 through step C8). If the band value is equal to "0", the band information determining section 25d-2 determines that the calling terminal 13 requests the call-back service (YES route in step C6 through step C7).

Then, the band information determining section 25d-2 gives an instruction to the message making section 25j through the transmitting message determining section 25b, and thereby, the message making section 25j makes the Setup signal wherein the band value for the called terminal 14 out of the band values registered in the band information table 214 is set in the band information element 273 (step C9).

And, this Setup signal is transmitted to the called terminal 14 through the message transmitting receiving section 25a (step C10). When the response (Conn) to this Setup signal returns from the called terminal 14 (step C11), the call-back controller 25 transmits the Release signal to the calling terminal 13 (step C12), and thereafter, the subscriber data read section 25c reads out the subscriber data 21a (band information table 214) (step C13).

Then, in the same manner as the Setup signal transmitted to the calling terminal 13, the call-back controller 25 makes by means of the message making section 25j a Setup signal wherein the band value for the called terminal 14 in the band information table 214 is set in the band information element 273 (step C14), and transmits the Setup signal to the calling terminal 13 through the message transmitting receiving section 25a (step C15).

Thereby, the call transmitted from the called terminal 14 to the calling terminal 13 is automatically set by using the band value for the called terminal 14 in the table 214, and the charging process to the called terminal 14 is carried out in the same manner as in foregoing embodiment. Here, the signal sequence between the calling terminal 13, the ATM exchanges 11, 12, and the called terminal 14 is the same as shown in FIG. 21.

Thus, according to the foregoing ATM exchange 12, when the called terminal 14 is a terminal allowed the call-back service and the band value="0" is set in the Setup signal transmitted from the calling terminal 13, since the call transmitted from the called terminal 14 to the calling terminal 13 is set by using the band value set beforehand in the band information table 214, a misoperation can be avoided which automatically sets the called party as the sender against the intention of the subscribers, and in addition, the necessary band can automatically be secured to achieve the communication between the terminals 13 and 14, even though the band of the Setup signal cannot be set by the calling terminal 13.

Figure 27:
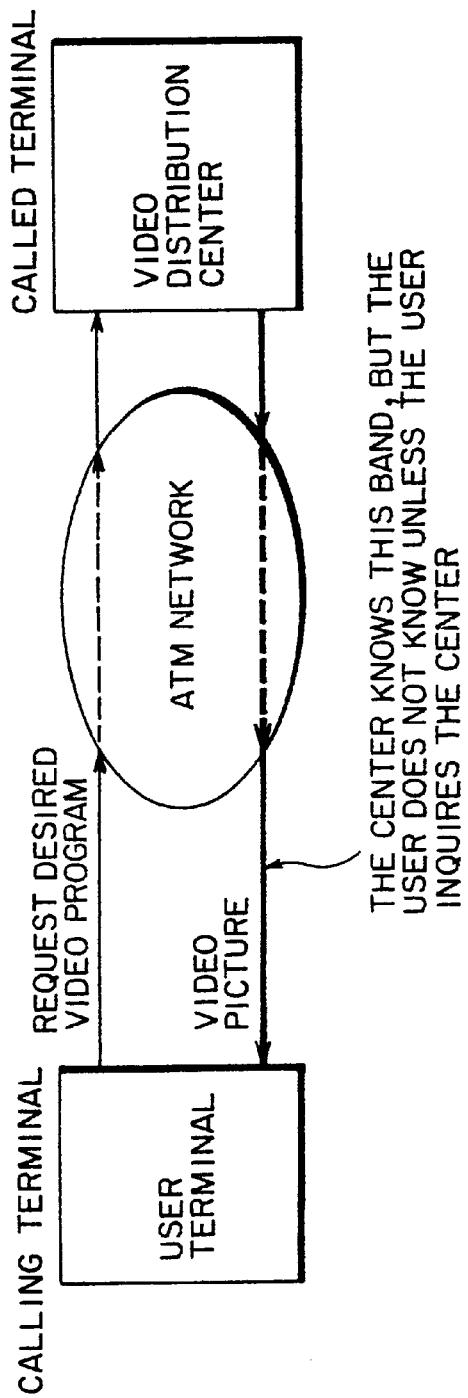
FIG. 27 is a chart for explaining the effect obtained from the ATM exchange in the first modified example.

Therefore, a calling party can communicate with a desired called party, even though the calling party is not informed of the band value required for the communication with the called party, which further favors to improve the serviceability. Suppose a video-on-demand system that employs the ATM network as shown in FIG. 27, for example. In this case, the video distribution center (equivalent to the called terminal 14) knows the band value for distributing the video (picture) data to the user' terminal (equivalent to the calling terminal 13). However, the user does not know the band value unless the user asks the center.

Therefore, until the user asks the center to get the band value required for the distribution of the video, the user cannot execute the communication with the center and cannot receive the distribution of the video. However, setting the band values for each of videos for distribution on the foregoing band information table 214, and installing the foregoing ATM exchange 12 in the center will enable the user to receive the distribution of the video, without the user's inquiring each time the band value to the center.

Further, in the foregoing modified example, after the band value="0" is determined, the determination is executed as to each of the flags 211, 212. However, the order of these determinations may be changed as appropriate.

(b-3) Description of a Second Modified Example

Figure 28:
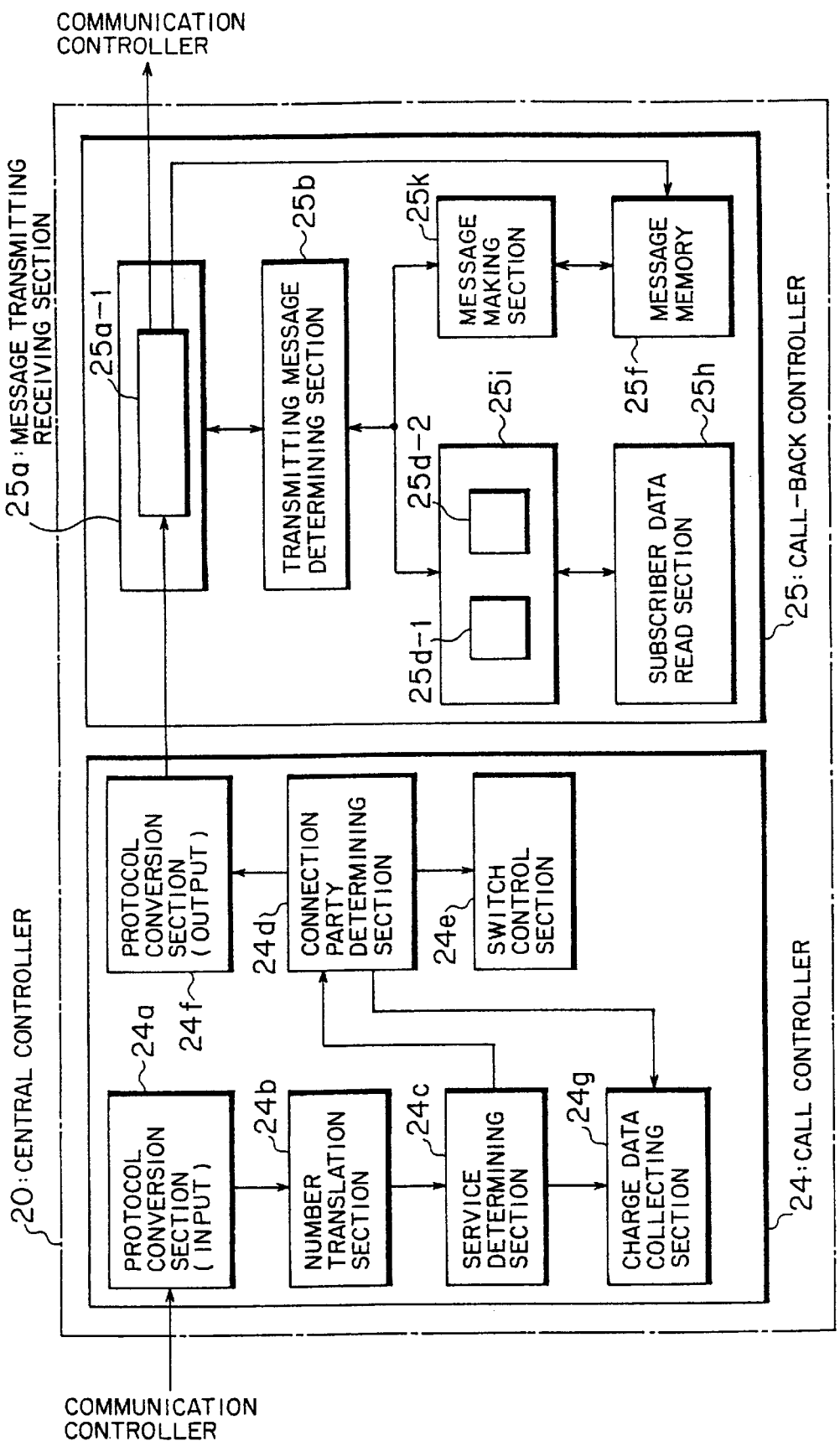
FIG. 28 is a block diagram illustrating a second modified example of the central controller of the ATM exchange in the embodiment.

FIG. 28 is a block diagram illustrating a second modified example of the central controller 20 shown in FIG. 4. Compared to the one shown in FIG. 4, the central controller 20 shown in FIG. 28 differs in that the message transmitting receiving section 25a includes a band value extracting section 25a-1 and the call-back controller 25 comprises the service determining section 25i and a message making section 25k. Here, the service determining section 25i is the same as shown in the foregoing first modified example, which also includes the called terminal determining section 25d-1 and band information determining section 25d-2.

Here, the band value extracting section 25a-1 receives the band value to be used between the calling terminal 13 and the called terminal 14 from the called terminal 14. In this modified example, when a Setup signal is transmitted to the called terminal 14 and the called terminal 14 responds to the Setup signal, the band value extracting section 25a-1 extracts the band information element 273 that has been set on the side of the called terminal 14 in the response (Connect) signal transmitted from the called terminal 14, which is stored in the message memory 25f.

And, when the called terminal determining section 25d-1 determines that the called terminal 14 is a terminal allowed the call-back service and the band information determining section 25d-2 determines that the band value="0" is set in the Setup signal transmitted from the calling terminal 13, the message making section 25k makes a Setup signal in which the band information element 273 extracted from the Connect signal by the band value extracting section 25a-1 is added on the Setup signal.

In short, the call-back controller 25 in this modified example does not make the Setup signal transmitted to the calling terminal 13 by using the band value registered beforehand on the band information table 214, as is the case with the first modified example, but makes the Setup signal to be transmitted to the calling terminal 13 by using the band value set in the Connect signal that, when the Setup signal is transmitted to a called terminal 14, the called terminal 14 returns therefrom, thus carrying out the foregoing call-back service.

The operation of the ATM exchange 12 (call-back controller 25) thus constructed in the second modified example will be described with reference to the flow chart (steps D1 to D13) shown in FIG. 29 and the signal sequence chart (steps E1 to E13) shown in FIG. 30.

First, when a Setup signal is transmitted from a subscriber terminal 13 in the same manner as the foregoing embodiment and the Setup signal is received by the call-back controller 25 through the ATM exchange 11 (step D1, steps E1 to E3), the subscriber data 21a of the called terminal 14 is read out by a subscriber data read section 25h in the call-back controller 25 on the basis of the called number information 325' in the Setup signal (step D2).

And, the called terminal determining section 25d-1 of the service determining section 25i determines whether both the flag 211 and 212 set in the subscriber data 21a of the called terminal 14 thus read out are ON (steps D3 and D4). If the result shows that either one of the flags 211, 212 is OFF (if either the step D3 or D4 determines NO), the called terminal determining section 25d-1 determines that the called terminal 14 is not a terminal allowed the call-back service and the normal call setting is carried out by the call controller 24 (step D8).

On the other hand, if both the flag 211 and 212 are ON (if both the steps D3 and D4 determine YES), the service determining section 25i refers to the band value set in the band information element 273 of the received Setup signal (step D5), and determines whether or not the band value is equal to "0" by means of the band information determining section 25d-2 (step D6).

As the result, if the band value is not equal to "0", the band information determining section 25d-2 determines that the calling terminal 13 does not request the call-back service, and the normal call setting is carried out by the call controller 24 (from NO route in step D6 through step D8). If the band value is equal to "0", the band information determining section 25d-2 determines that the calling terminal 13 requests the call-back service (YES route in step D6 through step D7).

Then, the band information determining section 25d-2 gives the transmitting message determining section 25b an instruction to transmit the received Setup signal having the band value="0" unchanged to the called terminal 14 (steps D9, E4 and E5). Thereafter, when the called terminal 14 responds to the Setup signal and returns to the called exchange 12 the Connect signal wherein a desired band value is set (step E6) and the message transmitting receiving section 25a of the call-back controller 25 receives this Connect signal (steps D10 and E7), the message transmitting receiving section 25a extracts the band information element 273 from the received Connect signal through the band value extracting section 25a-1, and stores the extracted band information element 273 in the message memory 25f.

And, the message making section 25k makes a Release signal in the same manner as the foregoing embodiment, and the message transmitting receiving section 25a transmits the Release signal to the calling terminal 13 (steps D11, E8 to E10). Thereafter, the message making section 25k makes a Setup signal wherein the band information element 273 stored in the message memory 25f is added on the information element 27 (step D12), and the message transmitting receiving section 25a transmits the Setup signal to the calling terminal 13 (steps D13, E11 to E13).

Thereby, the call (path) heading to the calling terminal 13 from the called terminal 14 is automatically set by using the band value received from the called terminal 14, and the charging to the called terminal 14 is carried out in the same manner as in foregoing embodiment. Here, the signal sequence between the calling terminal 13, the ATM exchanges 11, 12, and the called terminal 14 is the same as shown in FIG. 21 also in this case.

Thus, according to the ATM exchange 12 (call-back controller 25) in the second modified example, since the call heading to the calling terminal 13 from the called terminal 14 is set by using the band value received from the called terminal 14, the necessary band can automatically be secured to execute the communication between the calling terminal 13 and the called terminal 14, even though the band information table 214 is not prepared in the main memory 21 as is the case with the first modified example.

Therefore, the second modified example can achieve the same effect as the first modified example while reducing the memory capacity required for the main memory 21.

Further, in this embodiment, since the band value received from the called terminal 14 is contained in the Connect signal that, when a called terminal 14 responds to the Setup signal, the called terminal 14 transmits therefrom, the band value required for setting the call heading to the calling terminal 13 from the called terminal 14 can be acquired without a special sequence for receiving the band value; and therefore, the necessary band can be secured very easily and swiftly to achieve the communication between the terminal 13 and 14.

Figure 31:
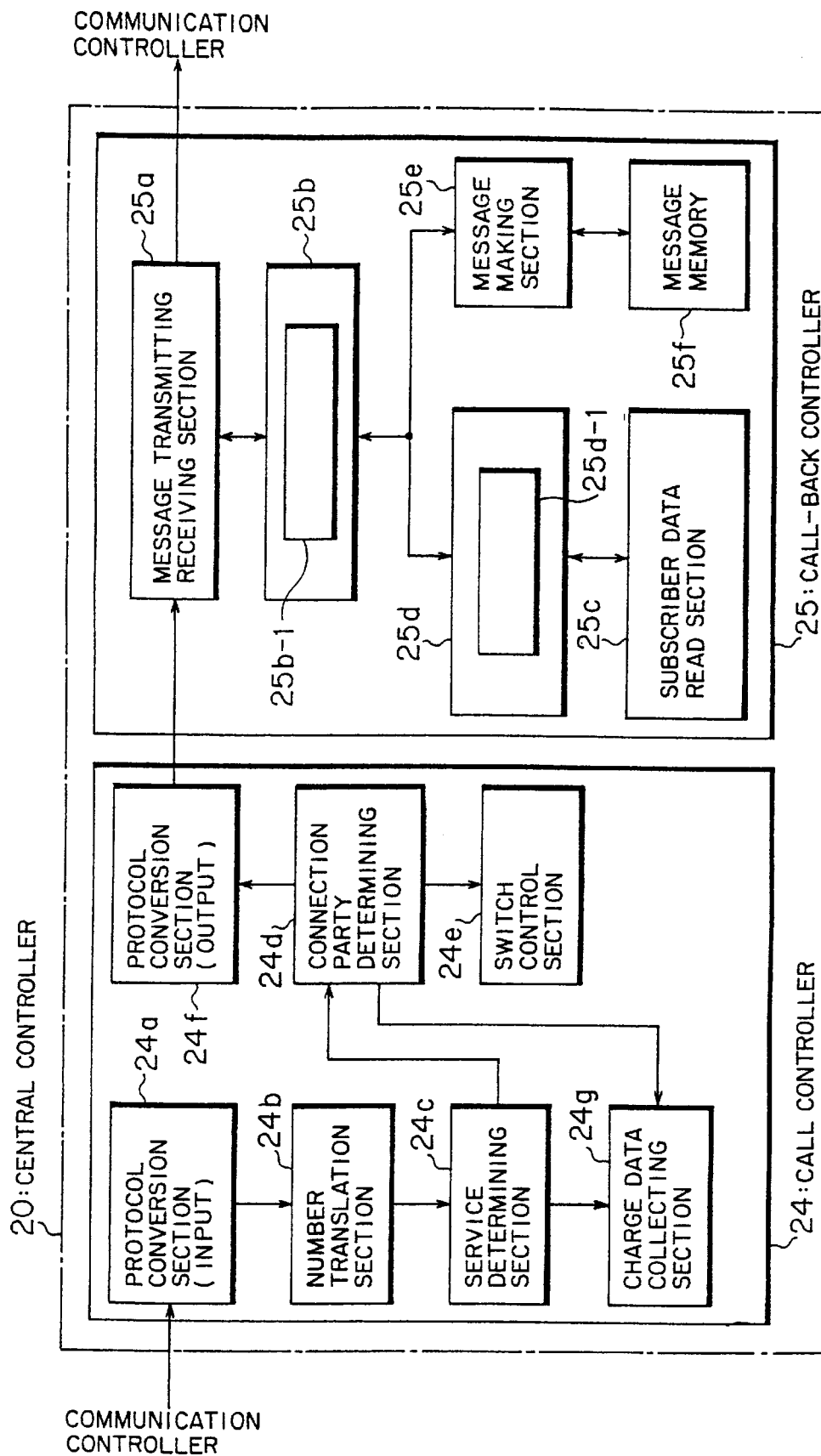
FIG. 31 is a block diagram illustrating a third modified example of the central controller of the ATM exchange in the embodiment.

Further, also in this modified example, the order of the determination as to the band value="0" and the one as to each of the flags 211, 212 may be changed as appropriate.
(b-4) Description of a Third Modified Example FIG. 31 is a block diagram illustrating a third modified example of the central controller 20 shown in FIG. 4. Compared to the one shown in FIG. 4, the central controller 20 shown in FIG. 31 differs in that the transmitting message determining section 25b of the call-back controller 25 comprises a call-back request determining section 25b-1.

Figure 32:
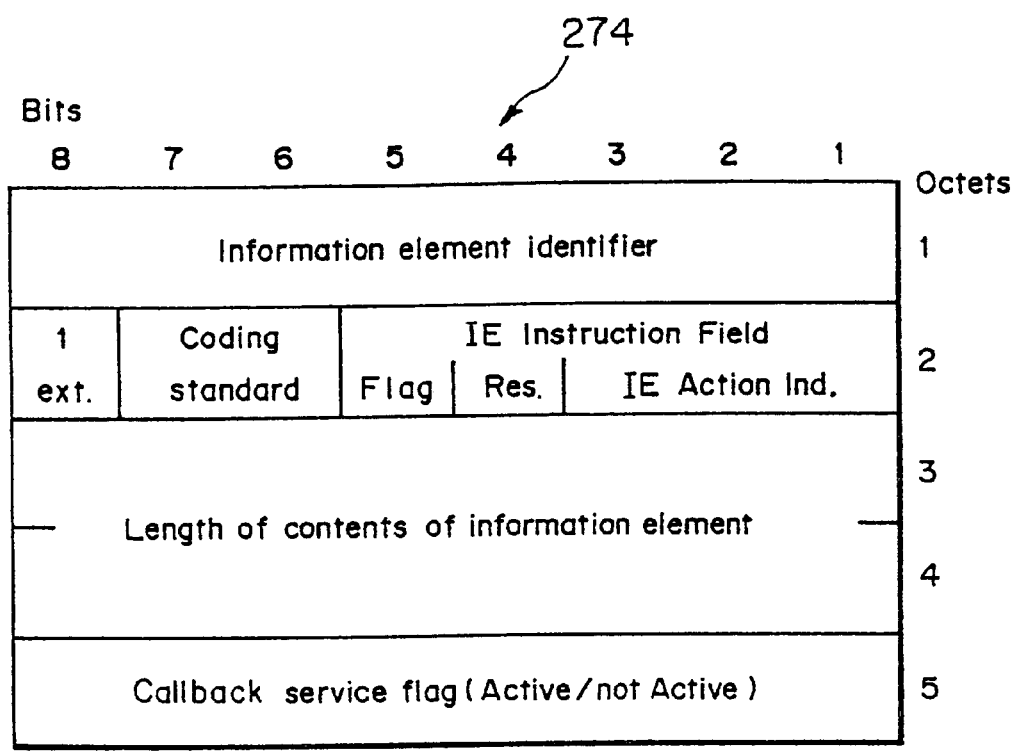
FIG. 32 is a chart illustrating a format of an information element requesting for a call-back control set in the Setup signal in the third modified example.

Here, the call-back request determining section 25b-1 determines whether or not a special information for requesting to conduct the call-back service is set in the Setup signal transmitted from the calling terminal 13. In this embodiment, the call-back request determining section 25b-1 is designed to determine that the calling terminal 13 requests to conduct the call-back service, when a newly defined call-back request information element 274 having a format shown in FIG. 32 is set in the information element 27 of the Setup signal transmitted from the calling terminal 13.

And, the call-back controller 25 in this embodiment is designed to carry out the call-back service, when the called terminal determining section 25d-1 determines that the called terminal 14 is a terminal allowed the call-back service and the call-back request determining section 25b-1 determines that the call-back request information element 274 is set in the Setup signal.

The call-back service by the ATM exchange 12 (call-back controller 25) thus constructed in the third modified example will be described with reference to the flow chart (steps F1 to F8) shown in FIG. 33 and the signal sequence chart (steps G1 to G13) shown in FIG. 34.

First, when a Setup signal is transmitted from a subscriber terminal 13 in the same manner as the foregoing embodiment and the Setup signal is received by the call-back controller 25 through the ATM exchange 11 (step F1, steps G1 to G3), the call-back request determining section 25b-1 of the call-back controller 25 analyzes the information element 27 of the Setup signal (step F2), and determines whether or not the foregoing call-back request information element 274 is set therein (step F3).

As the result, if the call-back request information element 274 is not set in the received Setup signal (if the step F3 determines NO), the call-back request determining section 25b-1 determines that the calling terminal 13 does not request to conduct the call-back service, and the normal call setting is carried out by the call controller 24 (from NO route in step F3 through step F8).

On the other hand, if the call-back request information element 274 is set in the foregoing Setup signal, the call-back request determining section 25b-1 determines that the calling terminal 13 requests to conduct the call-back service, and the subscriber data read section 25c reads out the subscriber data 21a of the called terminal 14 from the main memory 21 (YES route in step F3 through step F4).

And, the called terminal determining section 25d-1 of the service determining section 25d determines whether or not both the flag 211 and 212 set in the subscriber data 21a of the called terminal 14 thus read out are ON (steps F5 and F6). As the result, if either one of the flags 211, 212 is OFF (if either one of the steps F5 and F6 determines NO), the called terminal determining section 25d-1 determines that the called terminal 14 is not a terminal allowed the call-back service, and the normal call setting is carried out by the call controller 24 (step F8).

On the other hand, if both the flag 211 and 212 are ON (if both the steps F5 and F6 determine YES), the called terminal determining section 25d-1 determines that the called terminal 14 is a terminal allowed the call-back service; and in the same manner as the foregoing embodiment, the message transmitting receiving section 25a transmits the Release signal to the calling terminal 13, and thereafter transmits the Setup signal thereto, thus executing the stealth call-back service (from YES route in step F6 through steps F7, G3 to G12).

Thus, according to the call-back controller 25 in the third modified example, when the call-back request information element 274 is set in the Setup signal transmitted from the calling terminal 13 and the called terminal 14 is a terminal allowed the call-back service, the call heading to the calling terminal 13 from the called terminal 14 is set. Therefore, if the called terminal 14 is a terminal allowed the call-back service, the calling terminal 13 can at any time set the call wherein the called terminal 14 is processed as the calling party to communicate with the called terminal 14, which favors to greatly improve the serviceability of the call-back service.

Further, in the foregoing modified example, after the call-back request information element 274 is determined, the determination as to each of the flags 211, 212 is executed. However, the order of these determinations may be changed as appropriate.

And, in the same manner as the first and second modified examples, this modified example may also be arranged to execute the stealth call-back service by setting the band value registered on the band information table 214 or the band value received from the called terminal 14 in the Setup signal forwarded to the calling terminal 13, when the band value set in the band information element 273 of the Setup signal transmitted from the calling terminal 13 is "0".

In the third modified example, the calling terminal side is needed to set the call-back request information element 274 in the information element 27 of the Setup signal. Accordingly, the calling terminal 13 comprises at least an interface unit 131, communication control section 132, an ATM cell making section 133, and a physical layer control section 134.

Here, the interface unit 131 interfaces the terminal 13 with the peripherals such as a keyboard, display, and memory. The communication control section 132 controls the communication in accordance with the command that a subscriber inputs through the keyboard, wherein the communication control section 132 is able to assemble or disassemble the information elements such as the calling number information element 271, called number information 272, band information element 273, and the like.

The ATM cell making section 133 combines the terminal data inputted through the keyboard, memory, etc., and the foregoing various information elements assembled in the communication control section 132 into the ATM cell. And, the physical layer control section 134 regulates the specifications of the cable and connectors, and controls the physical layer of the coding and inserting/extracting functions of the ATM cell.

Figure 36:
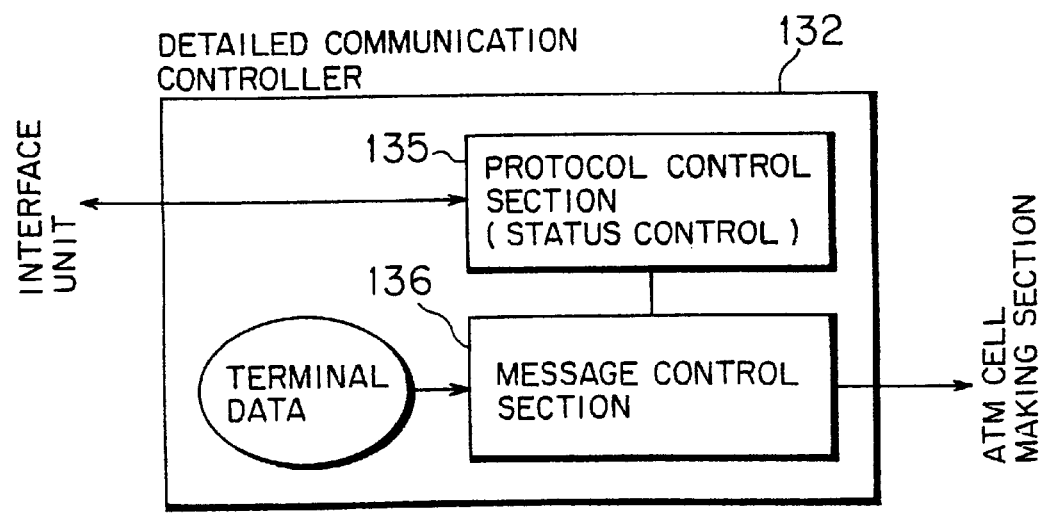
FIG. 36 is a block diagram illustrating a construction of a communication control section of the subscriber terminal in the third modified example.
Figure 37:
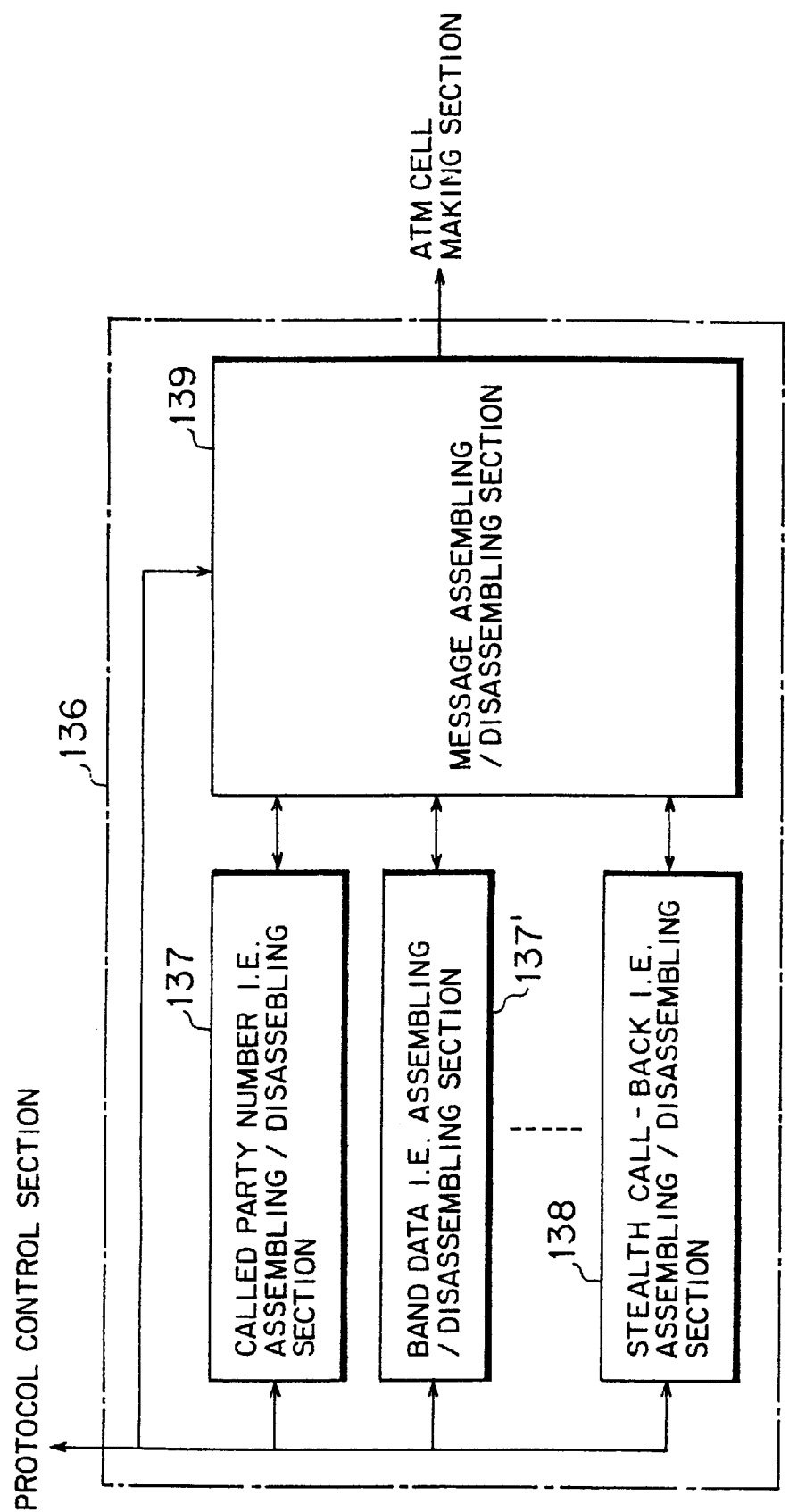
FIG. 37 is a block diagram illustrating a construction of a message control section of the subscriber terminal in the third modified example.

And, as shown in FIG. 36, the foregoing communication control section 132 comprises a protocol control section 135 and a message control section 136, wherein the message control section 136 comprises, as shown in FIG. 37, information element assembling/disassembling section 137 corresponding to the information elements such as the calling number information element 271, the called number information element 272, the band information element 273, an information element assembling/disassembling section 138 corresponding to the call-back request information element 274, and a message assembling/disassembling section 139.

Here, the information element assembling/disassembling section 137 assemble and disassemble the information elements that are each assigned to the units. The information element assembling/disassembling section 138 assembles and disassembles the call-back request information element 274. The message assembling/disassembling section 139 assembles the signaling messages of the Setup signal and the like on the basis of the information elements that are assembled by these information element assembling/disassembling sections 137, 138, and disassembles to extract the various information elements that are contained in the received signaling messages.

Thus, if the calling terminal 13 inputs the necessary information for calling such as the call number of the called terminal 14 and the information as to requesting the call-back service or not, the information element assembling/disassembling sections 137, 138 and message assembling/disassembling section 139 of the communication control section 132 will make the Setup signal containing the call-back request information element 274 to transmit to the calling exchange 11.

(b-5) Description of a Fourth Modified Example

Figure 38:
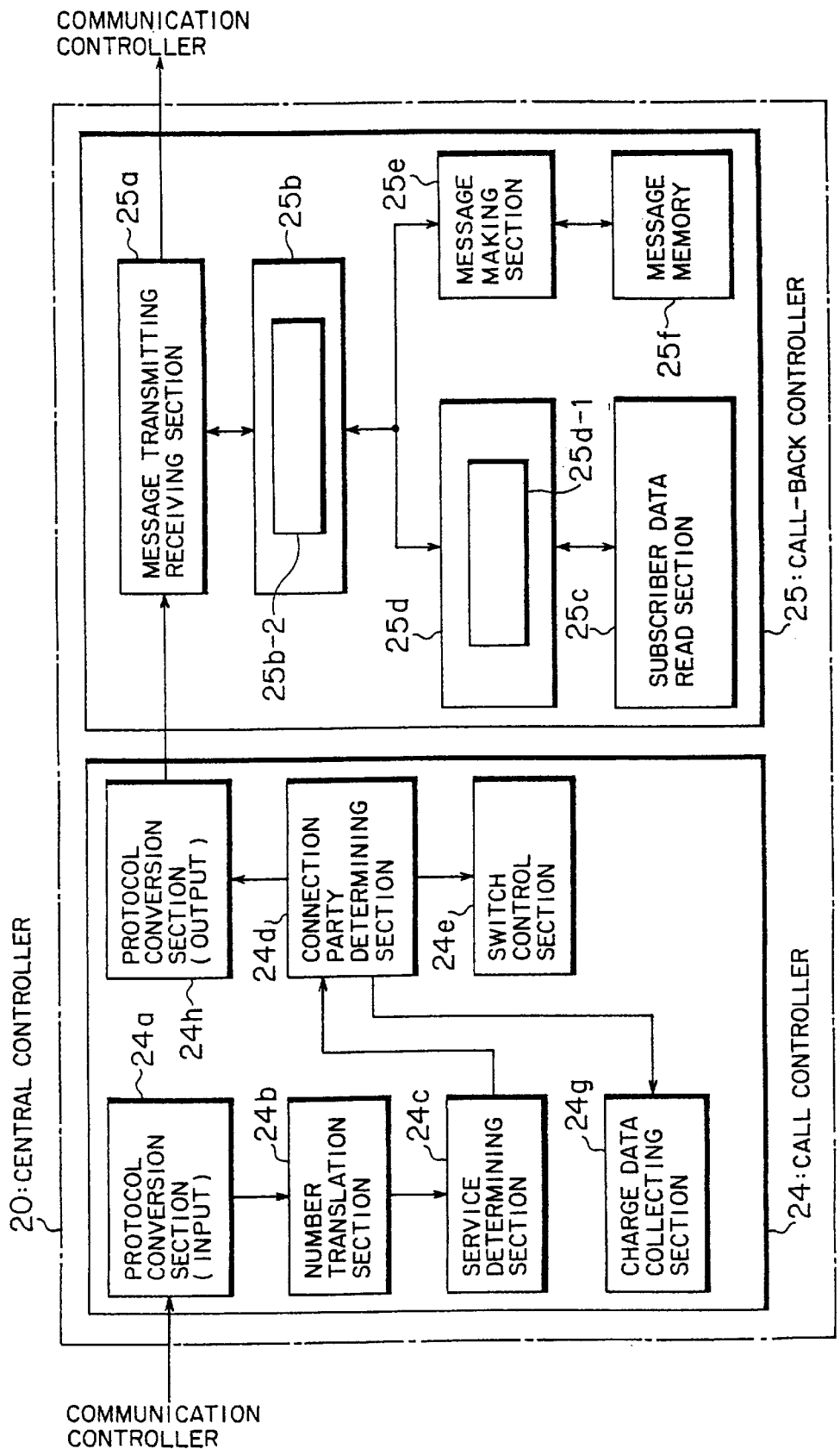
FIG. 38 is a block diagram illustrating a fourth modified example of the central controller of the ATM exchange in the embodiment.

FIG. 38 is a block diagram illustrating a fourth modified example of the central controller 20 shown in FIG. 4. Compared to the one shown in FIG. 4, the central controller 20 shown in FIG. 38 differs in that the call controller 24 comprises a protocol conversion section 24h and the transmitting message determining section 24b of the call-back controller 25 comprises a path determining section 25b-2. And, in this embodiment, as typically shown in FIG. 39, the subscriber data 21a in the main memory 21 contains a path information table 215.

Figure 40:
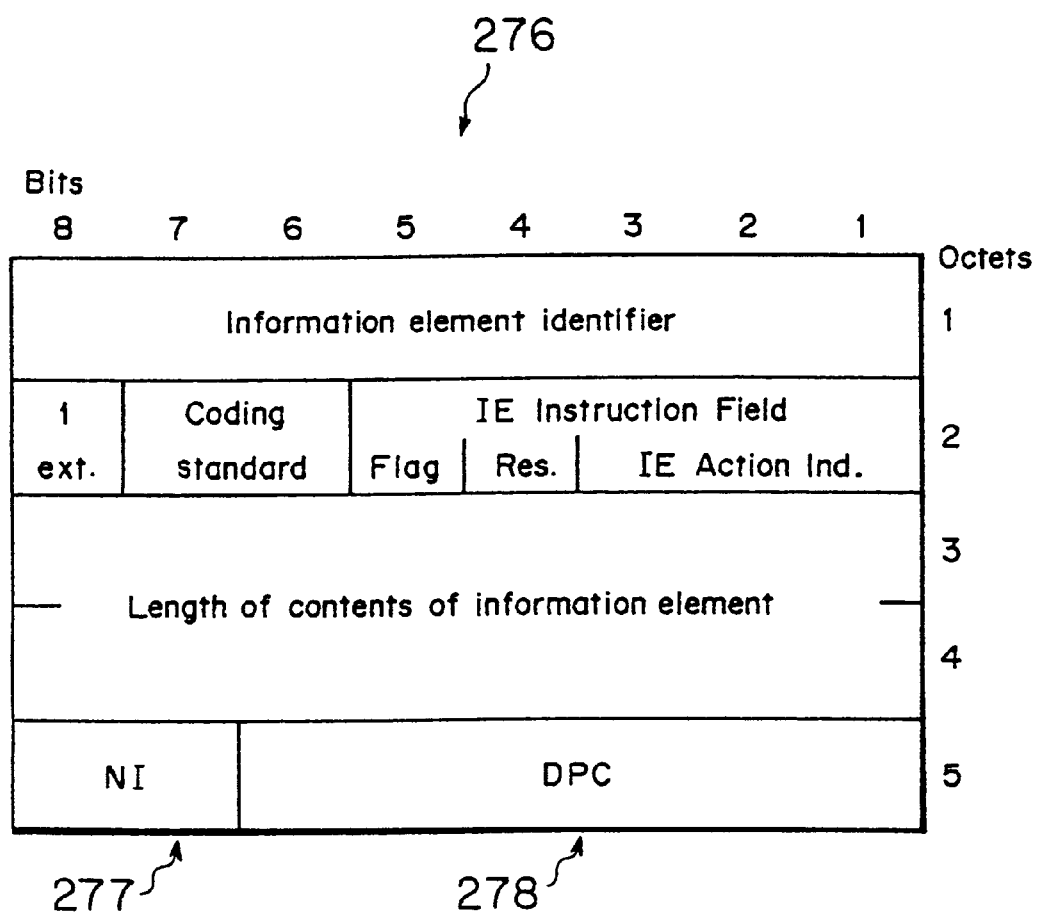
FIG. 40 is a chart illustrating a format of a path information element set in the Setup signal in the fourth modified example.

Here, the protocol conversion section 24h of the call controller 24 conducts the protocol conversion of the signaling message. In this embodiment, as shown in FIG. 40 for example, when receiving the IAM signal, the protocol conversion section 24h makes a new path information element 276 wherein a network identifier (NI) 277 relating to the network (for example, exchange 11) that transmitted the IAM signal and a destination point code (DPC) 278 are set as a terrain code (path information), and sets the foregoing IAM signal in the Setup signal when protocol converting the IAM signal into the Setup signal.

Figure 39:
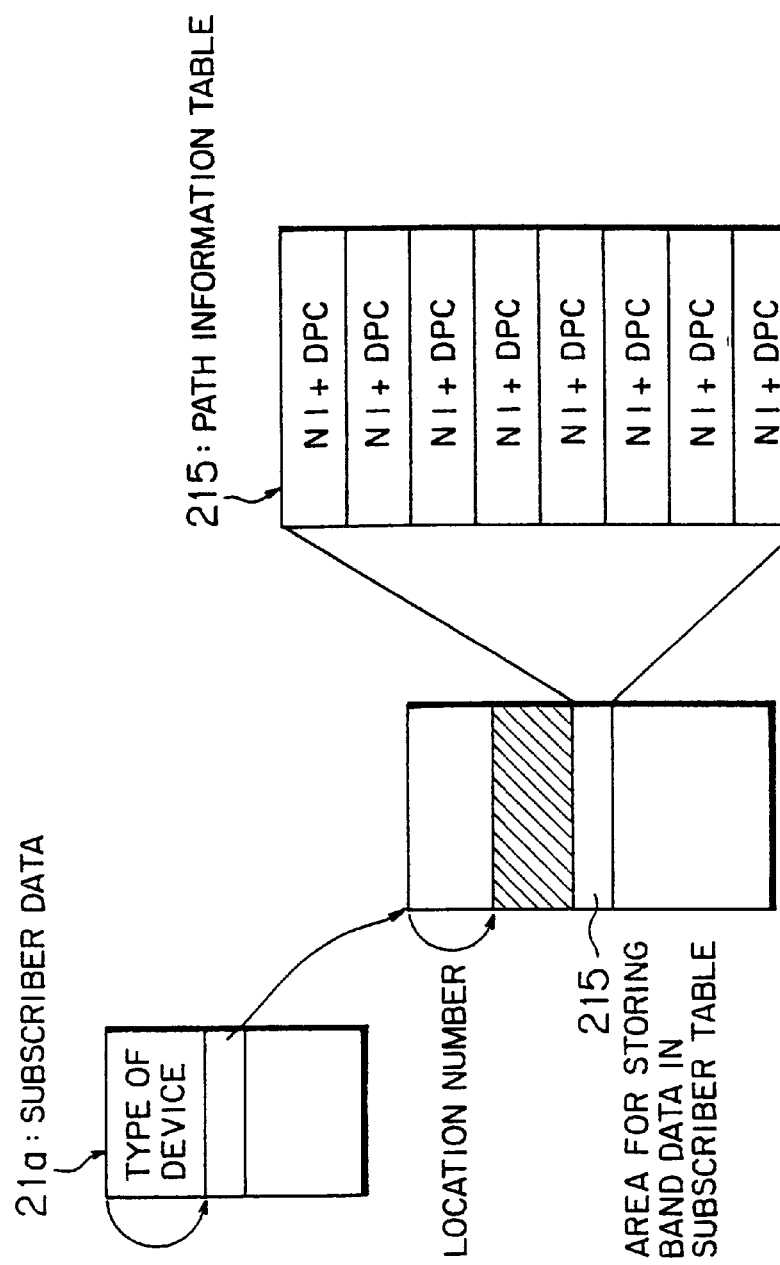
FIG. 39 is a chart typically illustrating a subscriber data used in the fourth modified example.

And, the path information table 215 stores the information of a path allowed the call-back service of a plurality of paths handled by the ATM exchange 12. On the path information table 215 in this embodiment are registered, as shown in FIG. 39, plural pairs of the terrain codes (NI+DPC) made of the network identifier (NI) 277 and the destination point code (DPC) 278.

On the other hand, the path determining section 25b-2 of the call-back controller 25 determines whether or not the path of the received Setup signal is a path allowed the call-back service, on the basis of the network identifier (NI) 277 and destination point code (DPC) 278 registered in the subscriber data 21a. Concretely, the path determining section 25b-2 determines that, when a terrain code consistent with the network identifier (NI) 277 and the destination point code (DPC) 278 set in the Setup signal is registered in the path information table 215, a path corresponding to the terrain code is the path allowed the call-back service.

And, in the fourth modified example, when the called terminal determining section 25d-1 of the service determining section 25d determines that the called terminal 14 is a terminal allowed the call-back service and the path determining section 25b-2 of the transmitting message determining section 25b determines that the path (terrain code: NI+DPC) of the Setup signal transmitted from the calling terminal 13 is a path allowed the call-back service, the stealth call-back service is carried out.

The operation of the ATM exchange 12 (call-back controller 25) thus constructed in the fourth modified example will be described with reference to the flow chart (steps H1 to H8) shown in FIG. 41 and the signal sequence chart (steps J1 to J13) shown in FIG. 42.

First, when a Setup signal is transmitted from a subscriber terminal 13 in the same manner as the foregoing embodiment and the Setup signal is received as an IAM signal by the call controller 24 through the ATM exchange 11 (step J1, J2), the protocol conversion section 24h of the call controller 24 makes the path information element 276 as to the calling exchange 11 that transmitted the IAM signal, and transmits to the call-back controller 25 the Setup signal wherein this path information element 276 is set (step J3).

When the call-back controller 25 receives this Setup signal (step H1), on the basis of the called number information 325' set in the received Setup signal, the subscriber data read section 25c reads out the subscriber data 21a of the called terminal 14 (step H2), and the path determining section 25b-2 obtains the terrain code [the network identifier (NI) 277 and destination point code (DPC) 278 in the path information element 276] that is set in the foregoing Setup signal (step H3).

And, the path determining section 25b-2 determines whether or not an information consistent with the obtained network identifier (NI) 277 and destination point code (DPC) 278 sits on the path information table 215 of the subscriber data 21a (step H4). If there sits one consistent, then the called terminal determining section 25d-1 determines whether or not both the flags 211 and 212 set in the subscriber data 21a are ON (steps H5 and H6).

As the result, if both the flags 211 and 212 are ON (if both the steps H5 and H6 determine YES), the service determining section 25d gives the transmitting message determining section 25b an instruction to transmit the Setup signal to the side of the called terminal 14 through the message transmitting receiving section 25a (steps J4 and J5), thus executing the call-back service (step H7).

That is, the call-back controller 25, receiving the response (Connect) signal corresponding to the foregoing Setup signal from the called terminal 14 (steps J6 and J7), transmits the Release signal to the calling terminal 13 to disconnect the call heading to the called terminal 14 from the calling terminal 13 (stepa J8 to J10), and thereafter, transmits the Setup signal to the calling terminal 13 to set the reverse call heading to the calling terminal 13 from the called terminal 14 (steps J11 to J13).

Further, in either of the case that an information consistent with the terrain code obtained by the path determining section 25b-2 does not exist on the path information table 215 of the subscriber data 21a (step H4 determines NO), and the case that either one of the flags 211 and 212 is OFF (step H5 or H6 determines NO), the call controller 24 executes the normal call setting (step H8).

That is, when the called terminal 14 is a terminal allowed the call-back service and the path (terrain code) of the Setup signal transmitted from the calling terminal 13 is a path allowed the call-back service, the ATM exchange 12 in the fourth modified example transmits the Release signal to the calling terminal 13, and then transmits the Setup signal thereto, thereby executing the call-back service.

Therefore, as to the calling terminal 13 that transmits the Setup signal through a network (exchange) having an identical terrain code, the ATM exchange 12 in this embodiment enables the call-back service to be executed collectively, which significantly reduces the setting operations, compared to the case that to or not to execute the call-back service is set for each of the subscriber terminals 13 and 14.

Further, in this embodiment, the determination of the flags 211 and 212 is carried out after the determination of the terrain code is finished. However, the order of these determinations may be changed as appropriate.

And, in this embodiment, when a terrain code consistent with the terrain code set in the Setup signal is registered in the path information table 215, the path corresponding to the terrain code is determined to be a path allowed the call-back service. However, depending on a situation, even when a terrain code consistent with the terrain code set in the Setup signal is not registered in the path information table 215, the path corresponding to the terrain code may be arranged to be determined as a path allowed the call-back service.

Further, in the same manner as the first and second modified examples, this modified example may also be arranged to execute the stealth call-back service by setting the band value registered on the band information table 214 or the band value received from the called terminal 14 in the Setup signal forwarded to the calling terminal 13, when the band value set in the band information element 273 of the Setup signal transmitted from the calling terminal 13 is "0".

(b-6) Description of a Fifth Modified Example

Figure 43:
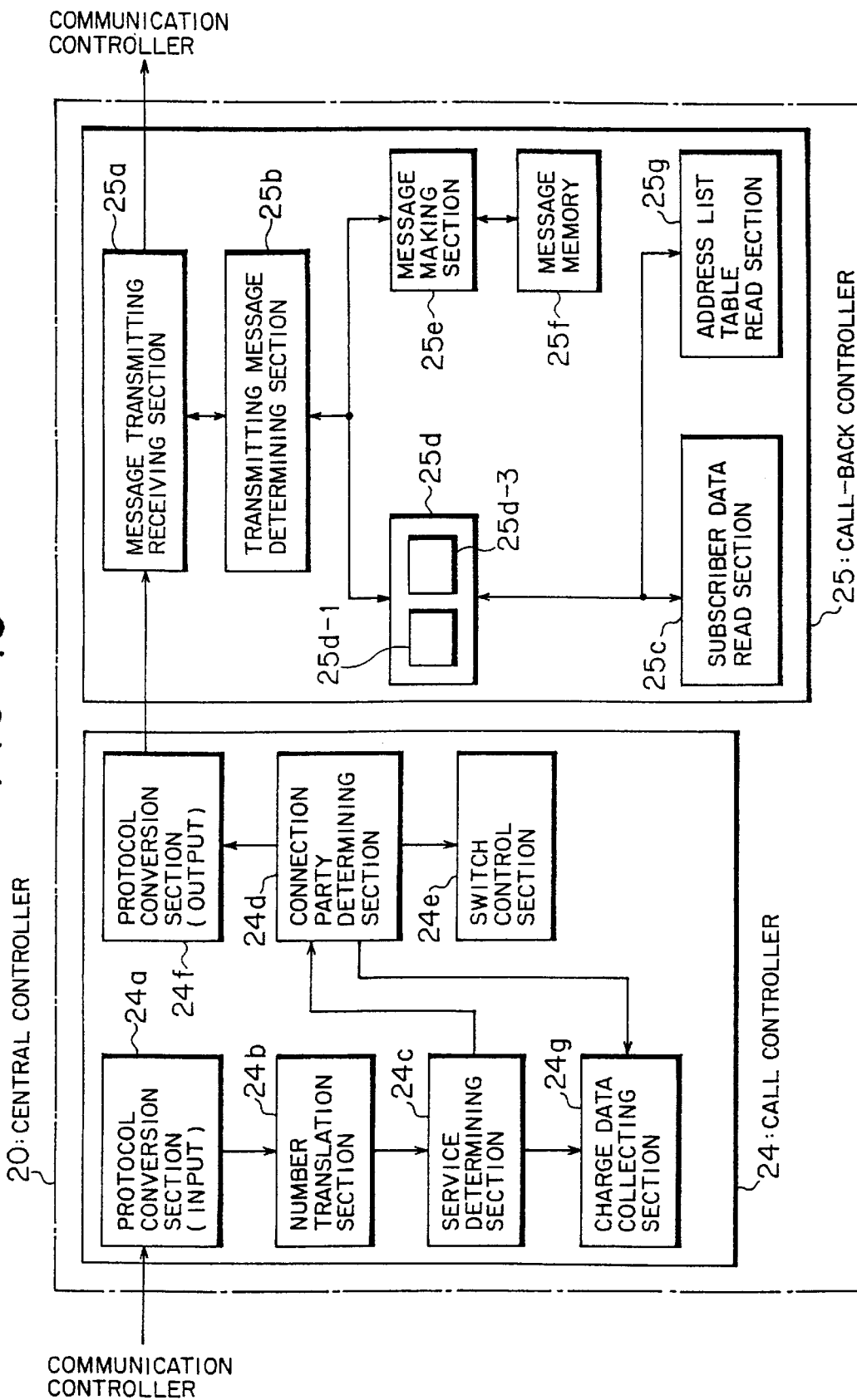
FIG. 43 is a block diagram illustrating a fifth modified example of the central controller of the ATM exchange in the embodiment.

FIG. 43 is a block diagram illustrating a fifth modified example of the central controller 20 shown in FIG. 4. Compared to the one shown in FIG. 4, the central controller 20 shown in FIG. 43 differs in that the call-back controller 25 comprises an address list table read section 25g and the service determining section 25d comprises a calling terminal determining section 25d-3 as well as the called terminal determining section 25d-1. And, in this modified example, as typically shown in FIG. 44, an address list table 216 is added on each of the subscriber data 21a in the main memory 21.

Figure 44:
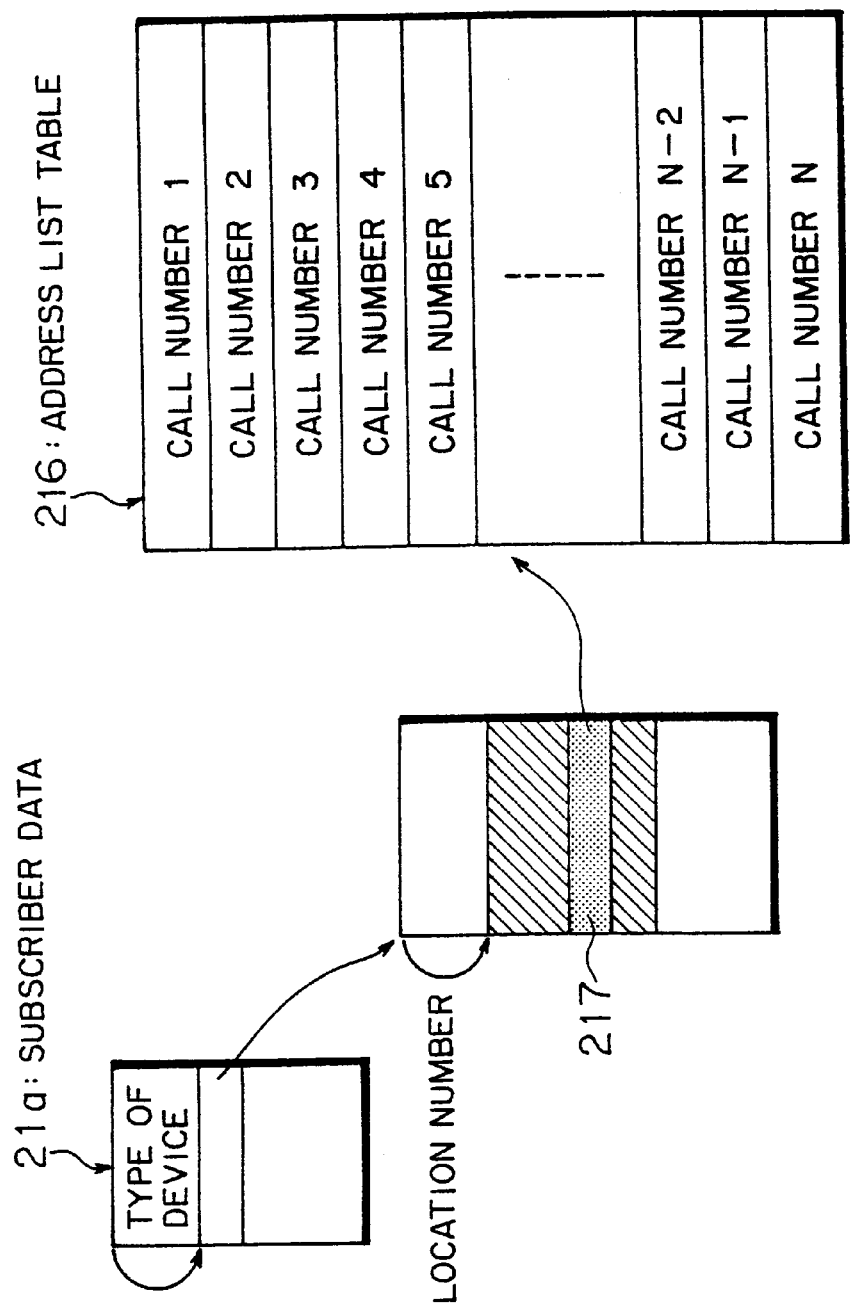
FIG. 44 is a chart typically illustrating a subscriber data used in the fifth modified example.

Here, the address list table (calling terminal information table) 216 is to store the identifiers of the calling terminals 13 allowed the call-back service for each of the subscriber terminals 13, 14. In this modified example, as shown in FIG. 44, the address list table 216 registers the call number information on the calling terminal 13 allowed the call-back service for each of the subscriber terminals 13, 14, and the call number information is linked with the corresponding subscriber data 21a through a pointer field 217 provided with each of the subscriber data 21a.

And, the address list table read section 25g is to read out the call number information registered on the address list table 216. The calling terminal determining section 25d-3 is to determine whether or not the calling terminal 13 is a terminal allowed the call-back service based on the call number information read out by this address list table reader 25g.

In this modified example, when the called terminal determining section 25d-1 determines that the called terminal 14 is a terminal allowed the call-back service and the calling terminal determining section 25d-3 determines that the calling terminal 13 is a terminal allowed the call-back service as well, the call-back controller 25 is designed to execute the call-back service.

That is, the call-back controller 25 (service determining section 25d) in this modified example is designed to determine whether not only the called terminal 14 but also the calling terminal 13 allow the call-back service.

The operation of the ATM exchange 12 (call-back controller 25) thus constructed in this modified example will be described with reference to the flow chart (steps K1 to K8) shown in FIG. 45.

First, when a Setup signal is transmitted from a subscriber terminal 13 and the Setup signal is received by the call-back controller 25 through the ATM exchange 11 (step K1), the subscriber data read section 25c in the call-back controller 25 reads out the subscriber data 21a of the called terminal 14 from the main memory 21 on the basis of the called number information 325' in the Setup signal (step K2).

And, the called terminal determining section 25d-1 of the service determining section 25d determines whether both the flags 211 and 212 set in the subscriber data 21a of the called terminal 14 thus read out are ON (steps K3 and K4). If the result shows that either one of the flags 211, 212 is OFF (if either the step K3 or K4 determines NO), the called terminal determining section 25d-1 determines that the called terminal 14 is not a terminal allowed the call-back service and the normal call setting is carried out by the call controller 24 (step K8).

On the other hand, if both the flags 211 and 212 are ON (if both the steps K3 and K4 determine YES), the service determining section 25d causes the address list table read section 25g to read out the address list table 216 linked with the subscriber data 21a through the pointer field 217 provided therein (step K5), and causes the calling terminal determining section 25d-3 to determine whether or not an information consistent with the calling number information 325 set in the received Setup signal sits in the call number information registered in the address list table 216 (step K6).

As the result, if there does not exist the call number information consistent with the subscriber data 21a on the address list table 216, the calling terminal determining section 25d-3 determines that the calling terminal 13 is not a terminal allowed the call-back service, and the normal call setting is carried out by the call controller 24 (from NO route in step K6 through step K8); and if there exists the number information consistent, the calling terminal determining section 25d-3 determines that the calling terminal 13 is also a terminal allowed the call-back service.

Thus, the call-back controller 25 executes the call-back service by transmitting the Release signal to the calling terminal 13 and then transmitting the Setup signal (from YES route in step K6 through step K7). Here, the signal sequence between the calling terminal 13, the ATM exchanges 11, 12, and the called terminal 14 is the same as shown in FIG. 21.

Thus, according to the ATM exchange 12 in the fifth modified example, the call-back service is carried out when not only the called terminal 14 but also the calling terminal 13 are the terminals allowed the call-back service; and therefore, it can be avoided that automatically the destination becomes the sender or the sender becomes the destination, against the intentions of the sender and the destination, which further serves to enhance the reliability and serviceability of the call-back service.

Further, in this modified example, after the determination as to whether the called terminal 14 is a terminal allowed the call-back service (determination of the flags 211 and 212) is carried out, the determination as to whether the calling terminal 13 is a terminal allowed the call-back service (determination based on the address list table 216) is carried out. However, the order of these determinations may be reversed.

Further, in this modified example, when a call number information consistent with the calling number information 325 set in the received Setup signal sits on the address list table 216, the corresponding calling terminal 13 is determined to be a terminal allowed the call-back service. However, reversely, when a call number information consistent therewith does not sit on the address list table 216, the corresponding calling terminal 13 may be arranged to be determined as a terminal allowed the call-back service.

(b-7) Description of a Sixth Modified Example

Figure 46:
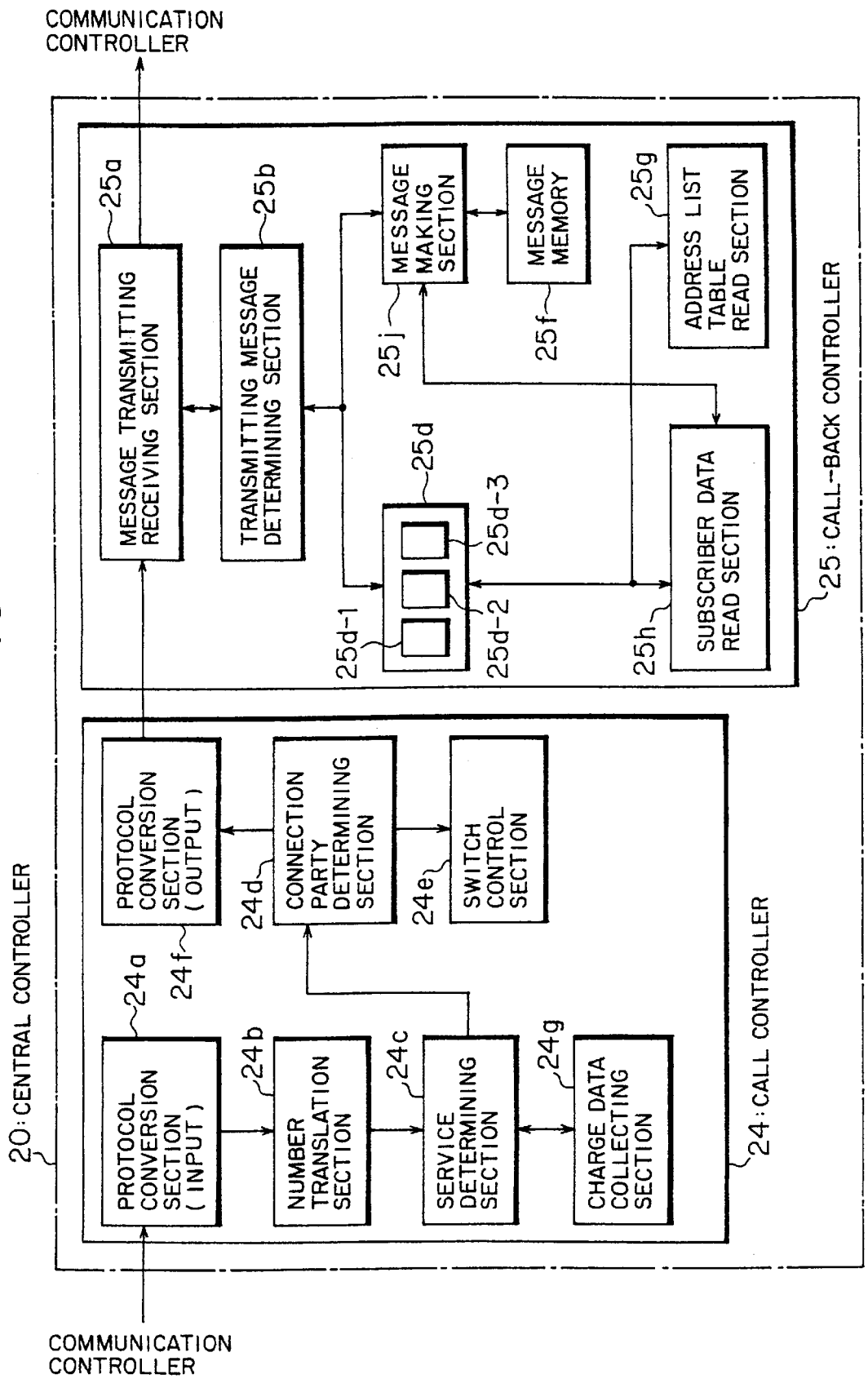
FIG. 46 is a block diagram illustrating a sixth modified example of the central controller of the ATM exchange in the embodiment.

FIG. 46 is a block diagram illustrating a sixth modified example of the central controller 20 shown in FIG. 4. Compared to the one shown in FIG. 4, the central controller 20 shown in FIG. 46 differs in that the call-back controller 25 comprises the address list table read section 25g in the fifth modified example and the subscriber data read section 25h and message making section 25j in the first modified example, and the service determining section 25d comprises the band information determining section 25d-2 in the first modified example and the calling terminal determining section 25d-3 in the fifth modified example in addition to the called terminal determining section 25d-1.

In this modified example, the band information table 214 (see FIG. 25) in the first modified example and the address list table 216 (see FIG. 44) in the fifth modified example are added on the subscriber data 21a.

In other words, the call-back controller 25 in this modified example combines the function of the first modified example and the function of the fifth modified example. Concretely, the call-back controller 25 carries out the call-back service when the following conditions are satisfied:

(1) the called terminal 14 is a terminal allowed the call-back service (as described in the first modified example),
(2) the band value set in the received Setup signal is "0" (as described in the first modified example), and in addition
(3) the calling terminal 13 is a terminal allowed the call-back service (as described in the fifth modified example).

Figure 26:
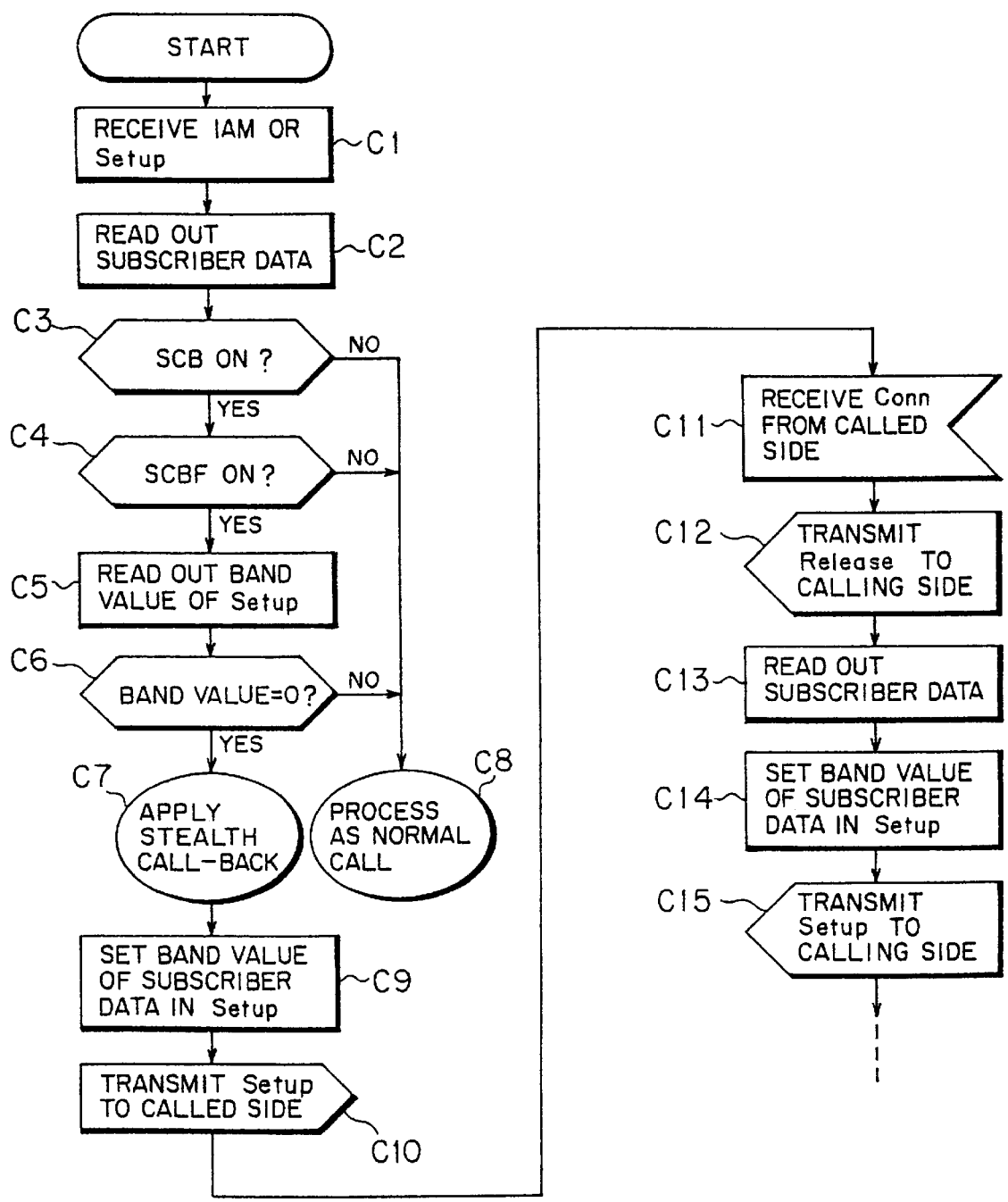
FIG. 26 is a flow chart for explaining the operation of the ATM exchange in the first modified example.
Figure 45:
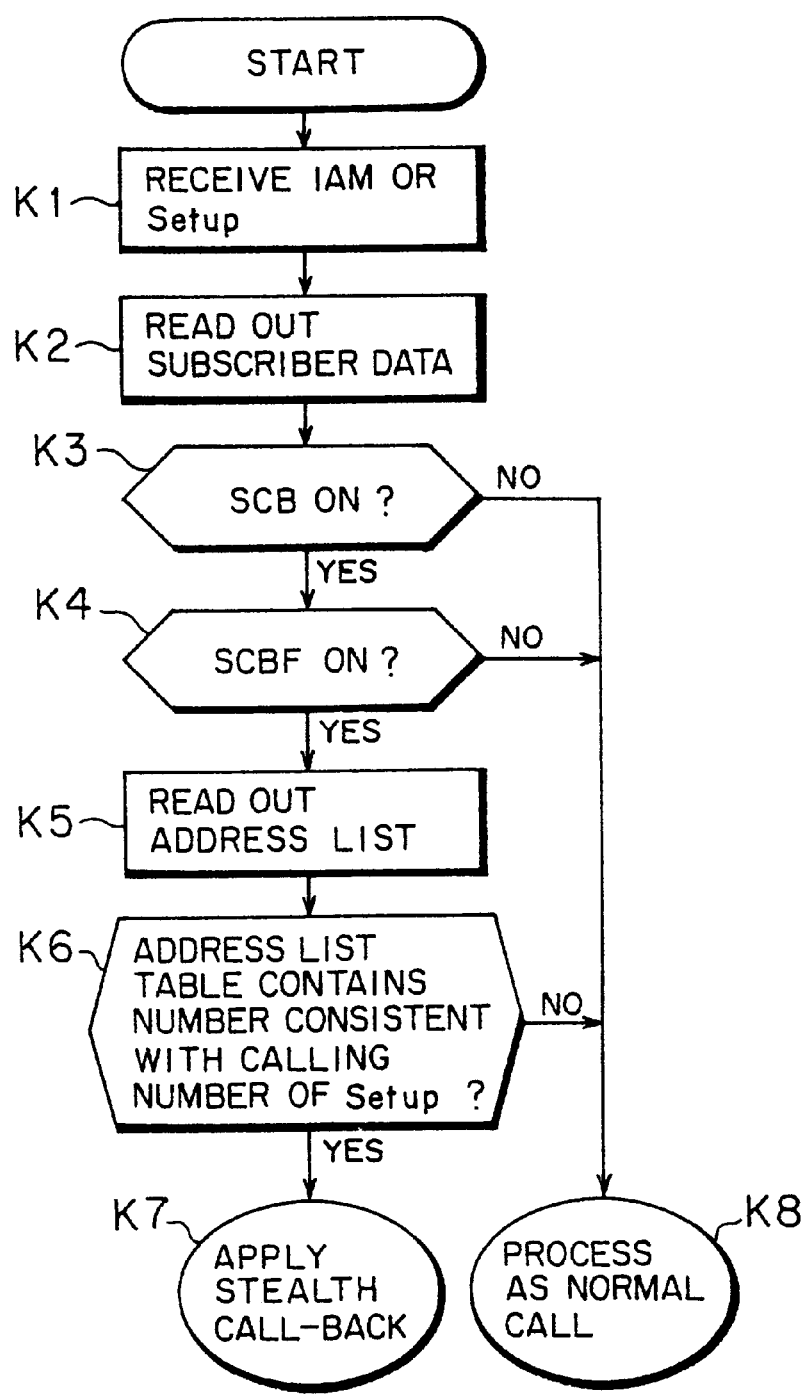
FIG. 45 is a flow chart for explaining the operation of the ATM exchange in the fifth modified example.
Figure 47:
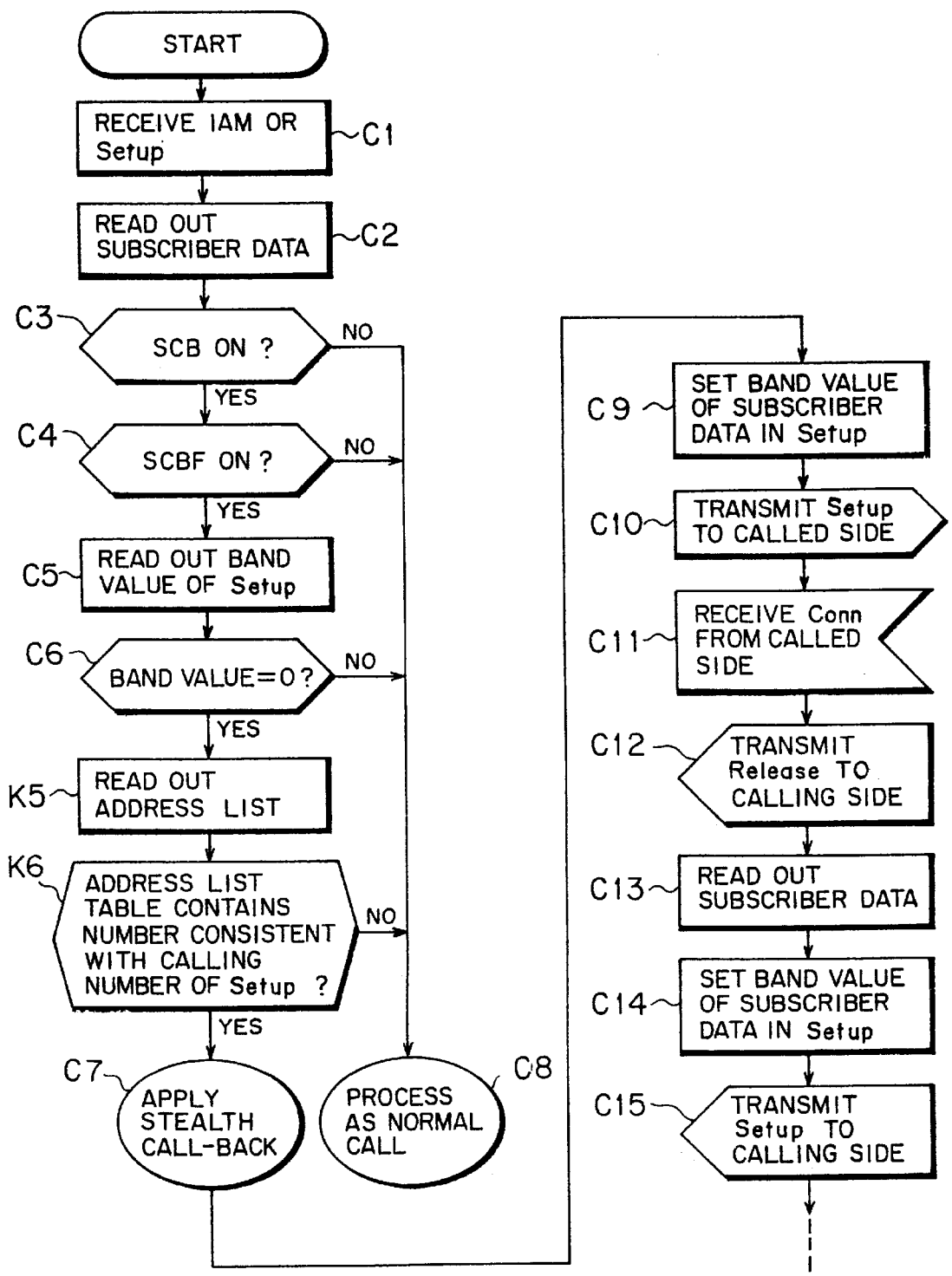
FIG. 47 is a flow chart for explaining the operation of the ATM exchange in the sixth modified example.

Therefore, as the operation of the ATM exchange 12 (call-back controller 25) in the sixth modified example is shown in the flow chart in FIG. 47, the step K5 (read-out of the address list table 216) and the step K6 (determination based on the address list table 216) in the flow chart shown in FIG. 45 are added to follow the step C6 (determination as to the band value="0") in the flow chart shown in FIG. 26.

Accordingly, the sixth modified example is able to obtain both the effect from the first modified example and the effect from the fifth modified embodiment, which further serves to enhance the reliability and serviceability of the call-back service.

(b-8) Description of a Seventh Modified Example

Figure 48:
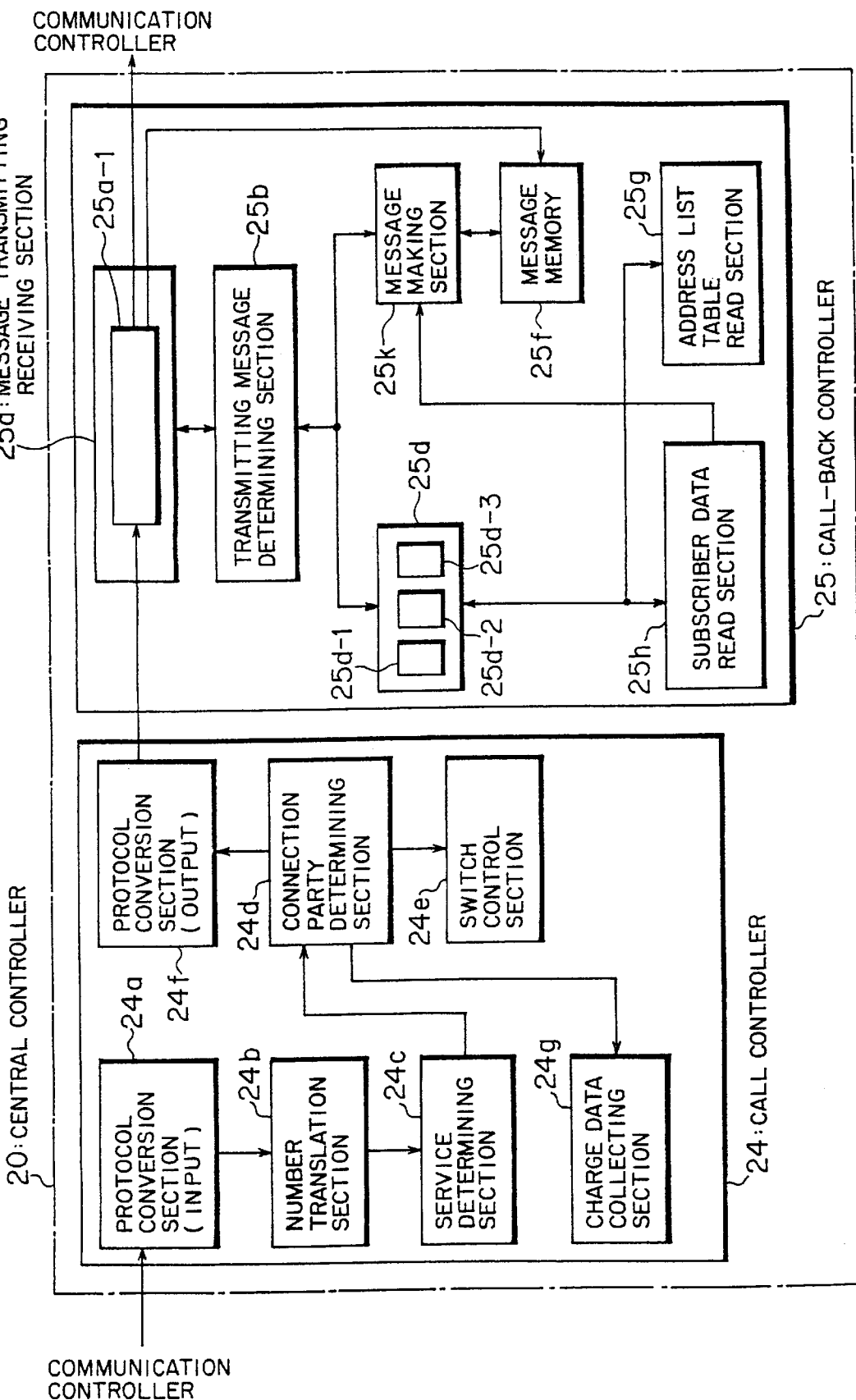
FIG. 48 is a block diagram illustrating a seventh modified example of the central controller of the ATM exchange in the embodiment.

FIG. 48 is a block diagram illustrating a seventh modified example of the central controller 20 shown in FIG. 4. Compared to the one shown in FIG. 4, the central controller 20 shown in FIG. 48 differs in that the call-back controller 25 comprises the address list table read section 25g and the subscriber data read section 25h in the fifth modified example and the message making section 25k in the second modified example, the message transmitting receiving section 25a comprises the band value extracting section 25a-1 in the second modified example, and the service determining section 25d comprises the band information determining section 25d-2 in the second modified example and the calling terminal determining section 25d-3 in the fifth modified example in addition to the called terminal determining section 25d-1.

However, in this modified example, the band information table 214 (see FIG. 25) in the first modified example and the address list table 216 (see FIG. 44) in the fifth modified example are added on the subscriber data 21a.

In other words, the call-back controller 25 in this modified example combines the function of the call-back controller 25 in the second modified example and the function of the call-back controller 25 in the fifth modified example. Concretely, the call-back controller 25 carries out the call-back service by using the band value received from the called terminal 14, when the following conditions are satisfied:

(1) the called terminal 14 is a terminal allowed the call-back service (as described in the second modified example),
(2) the band value set in the received Setup signal is "0" (as described in the second modified example), and in addition
(3) the calling terminal 13 is a terminal allowed the call-back service (as described in the fifth modified example).

Figure 29:
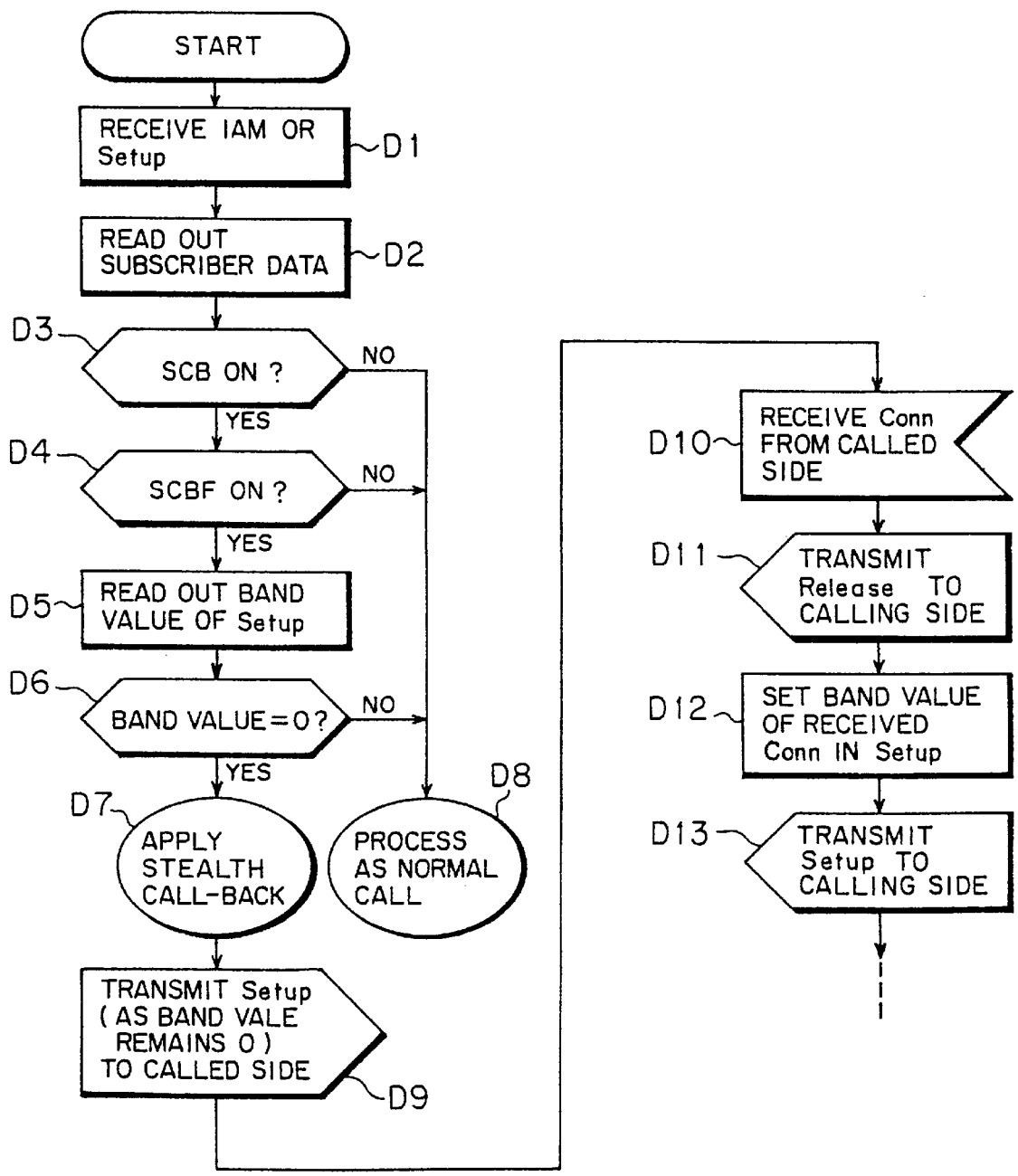
FIG. 29 is a flow chart for explaining the operation of the ATM exchange in the second modified example.
Figure 30:
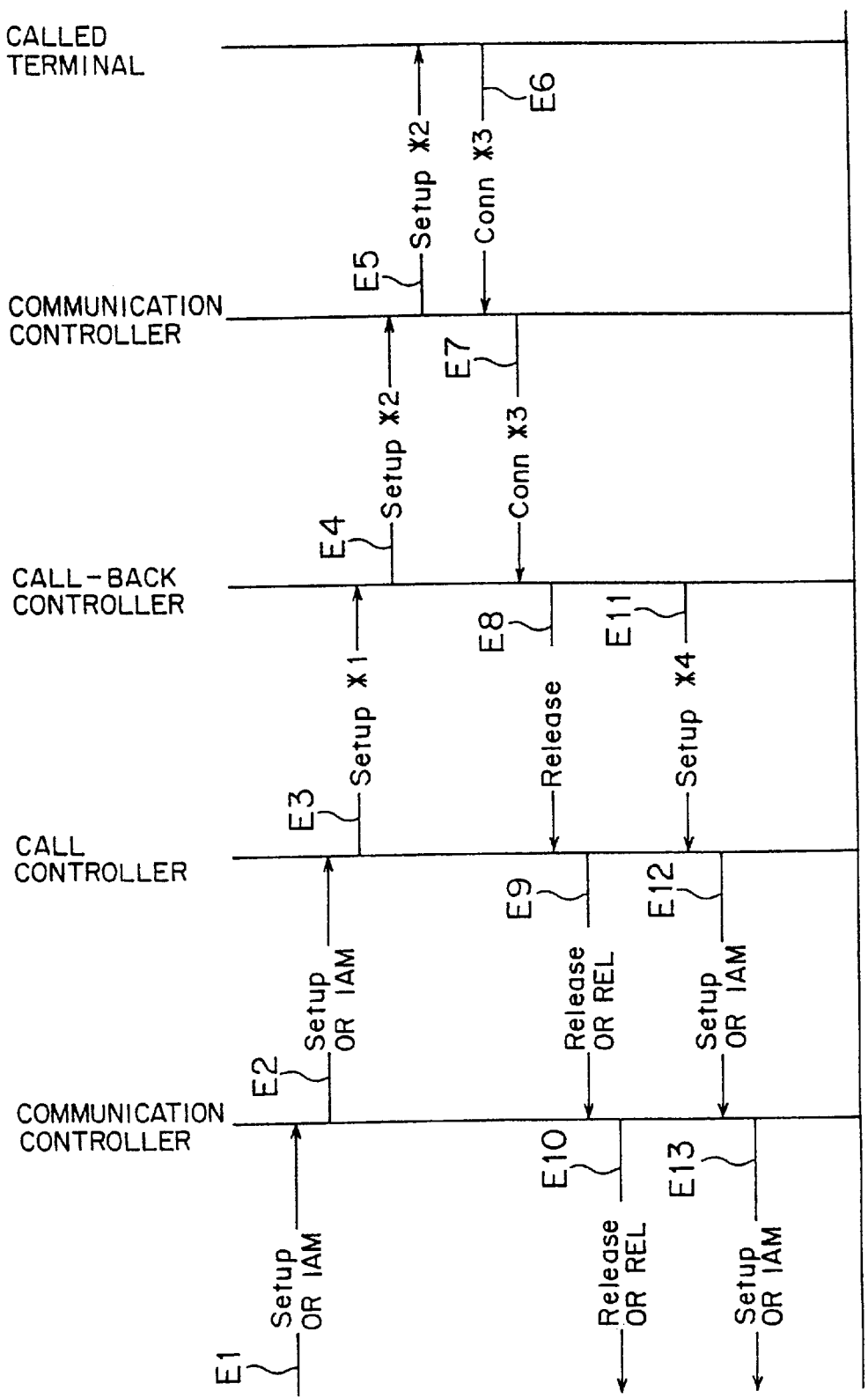
FIG. 30 is a signal sequence chart for explaining the operation of the ATM exchange in the second modified example.
Figure 49:
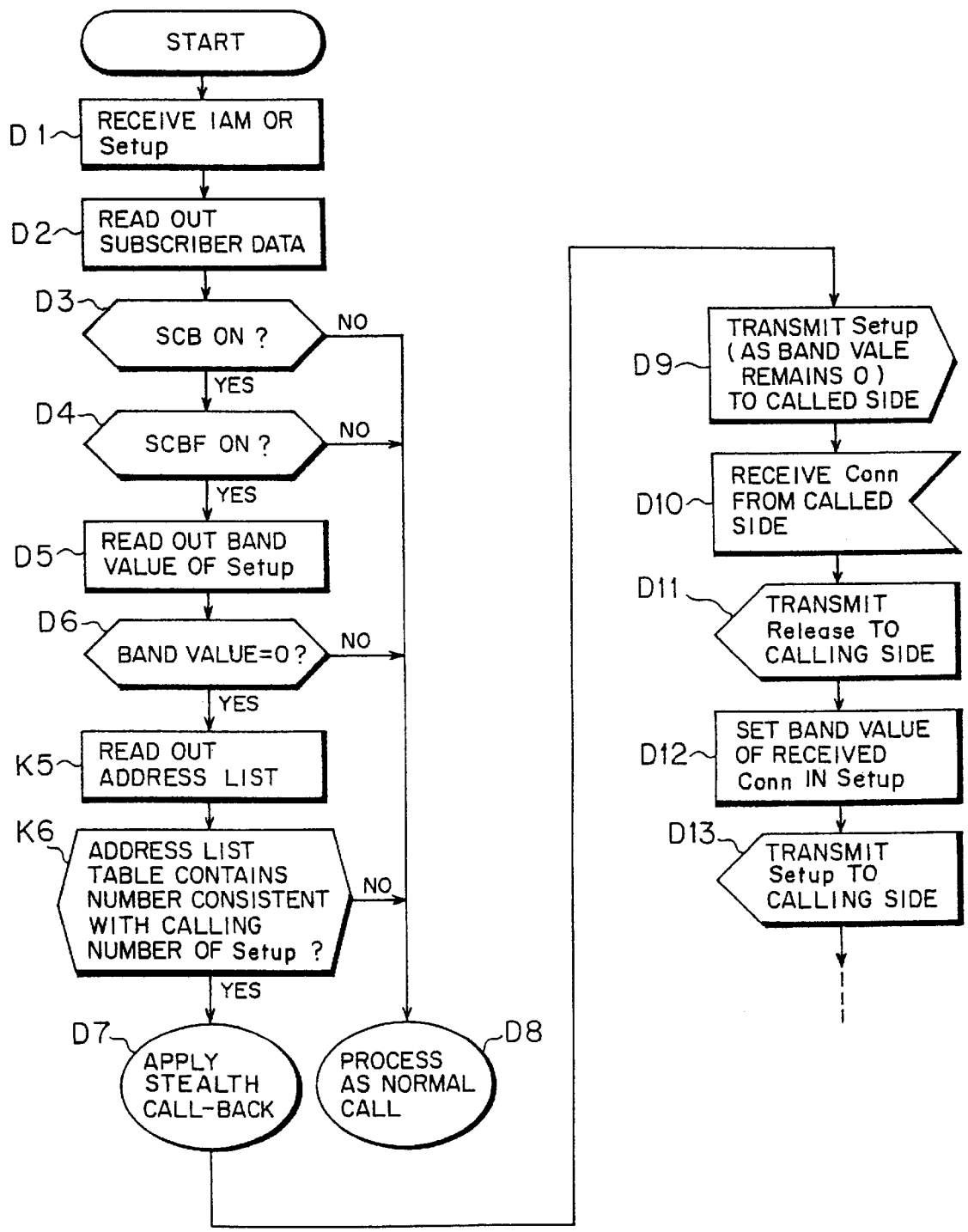
FIG. 49 is a flow chart for explaining the operation of the ATM exchange in the seventh modified example.

Therefore, as the operation of the ATM exchange 12 (call-back controller 25) in the seventh modified example is shown in the flow chart in FIG. 49, the step K5 (read-out of the address list table 216) and the step K6 (determination based on the address list table 216) in the flow chart shown in FIG. 45 are added to follow the step D6 (determination as to the band value="0") in the flow chart shown in FIG. 29.

Accordingly, the seventh modified example is able to obtain both the effect from the second modified example and the effect from the fifth modified embodiment.

Further, in this modified example, the determination is processed in the order of the determination as to the call-back request information element 274, as to the flags 211, 212, and as to the calling terminal 13. However, the order may appropriately be changed.

Further, this modified example may also be arranged to execute the call-back service by setting the band value registered on the band information table 214 or the band value received from the called terminal 14 in the Setup signal forwarded to the calling terminal 13, when the band value set in the band information element 273 of the Setup signal transmitted from the calling terminal 13 is "0".

(b-9) Description of an Eighth Modified Example

Figure 50:
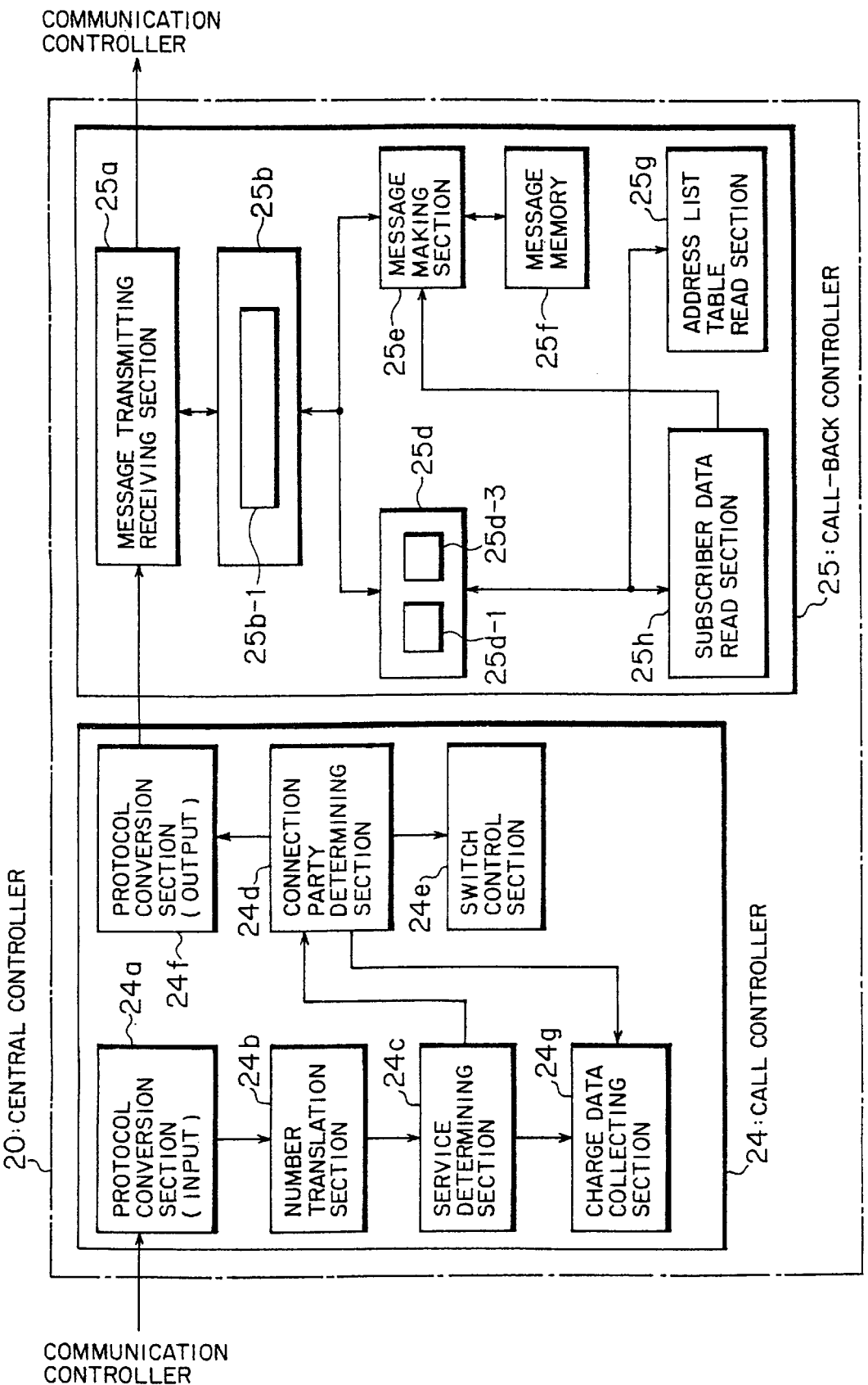
FIG. 50 is a block diagram illustrating an eighth modified example of the central controller of the ATM exchange in the embodiment.

FIG. 50 is a block diagram illustrating an eighth modified example of the central controller 20 shown in FIG. 4. Compared to the one shown in FIG. 4, the central controller 20 shown in FIG. 50 differs in that the transmitting message determining section 25b of the call-back controller 25 comprises the call-back request determining section 25b-1 in the third modified example, and the service determining section 25d comprises the called terminal determining section 25d-1 and the calling terminal determining section 25d-3 in the fifth modified example.

However, in this modified example, the address list table 216 (see FIG. 44) in the fifth modified example is added on the subscriber data 21a.

In other words, the call-back controller 25 in this modified example combines the function of the call-back controller 25 in the third modified example and the function of the call-back controller 25 in the fifth modified example. Concretely, the call-back controller 25 carries out the call-back service, when the following conditions are satisfied:

(1) the called terminal 14 is a terminal allowed the call-back service (as described in the third modified example),
(2) the call-back request information element 274 is set in the received Setup signal (as described in the third modified example), and in addition
(3) the calling terminal 13 is a terminal allowed the call-back service (as described in the fifth modified example).

Figure 33:
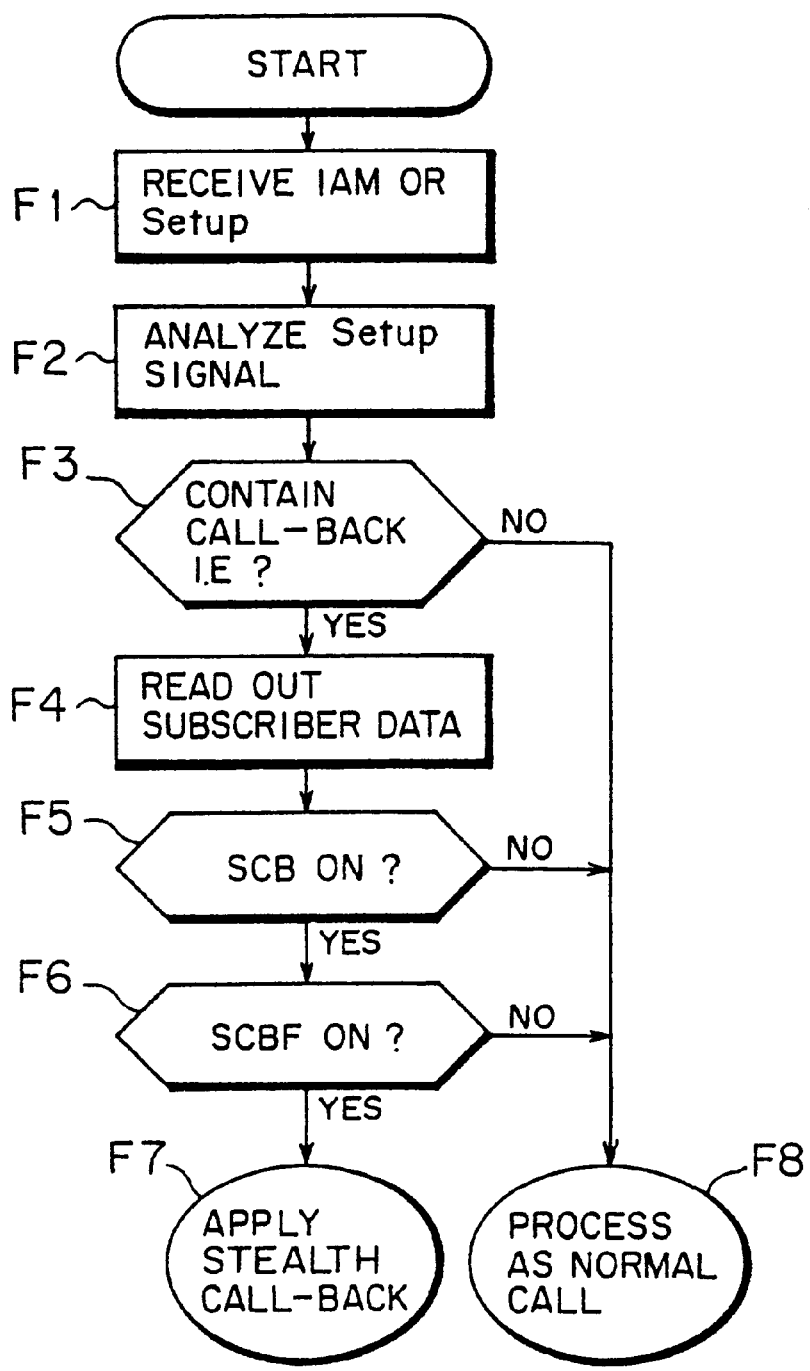
FIG. 33 is a flow chart for explaining the operation of the ATM exchange in the third modified example.
Figure 34:
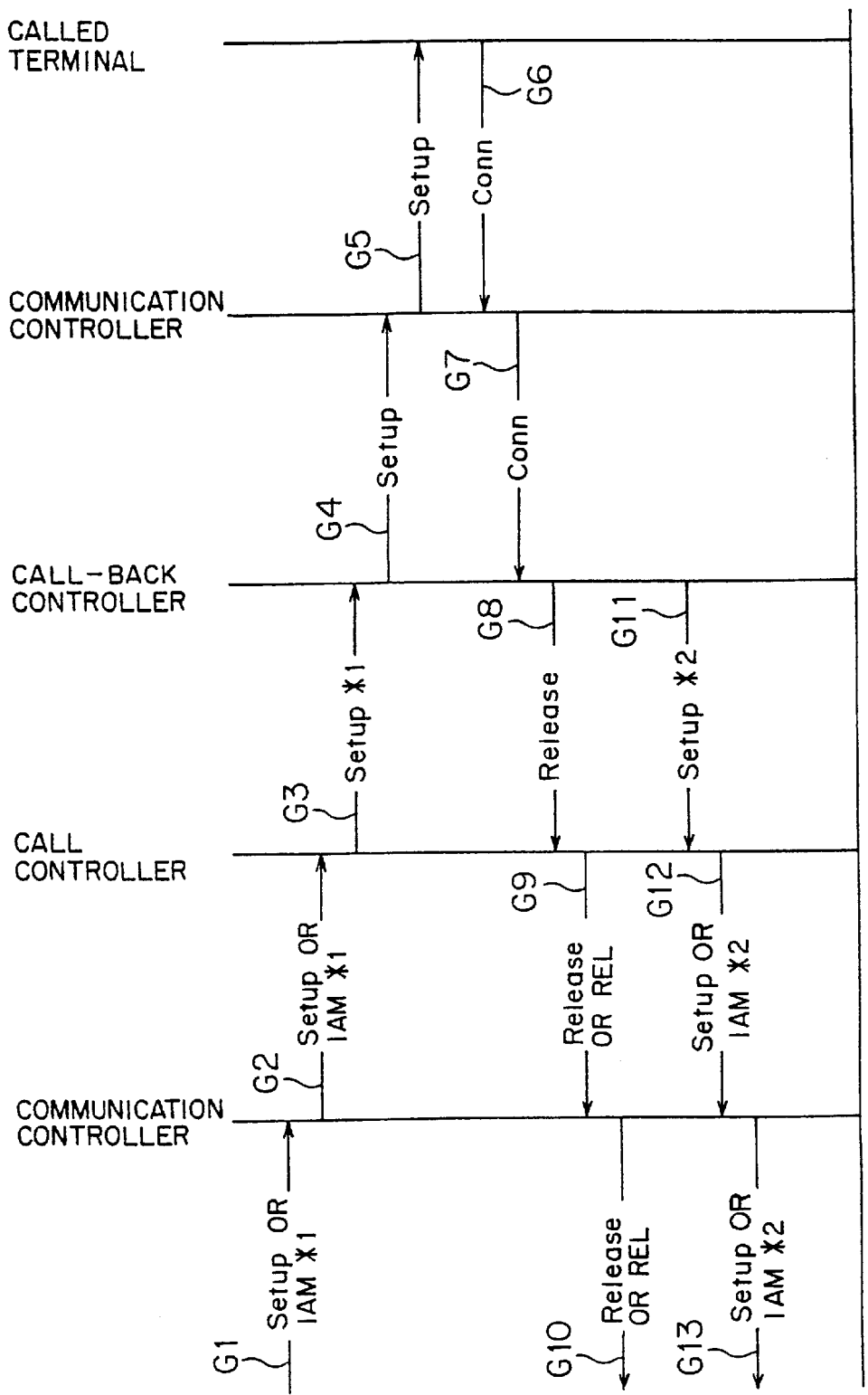
FIG. 34 is a signal sequence chart for explaining the operation of the ATM exchange in the third modified example.
Figure 35:
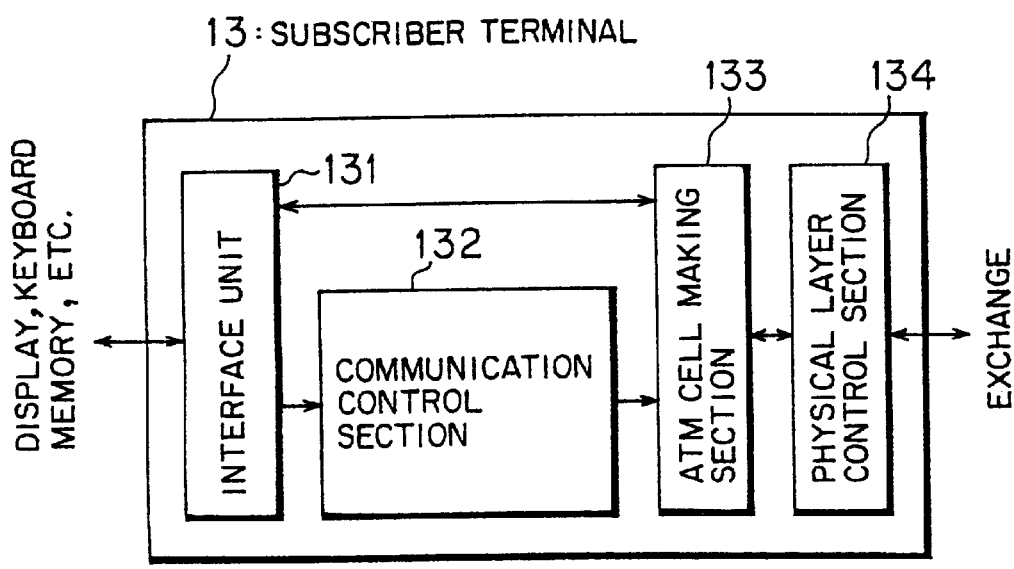
FIG. 35 is a block diagram illustrating a construction of a subscriber terminal in the third modified example.
Figure 51:
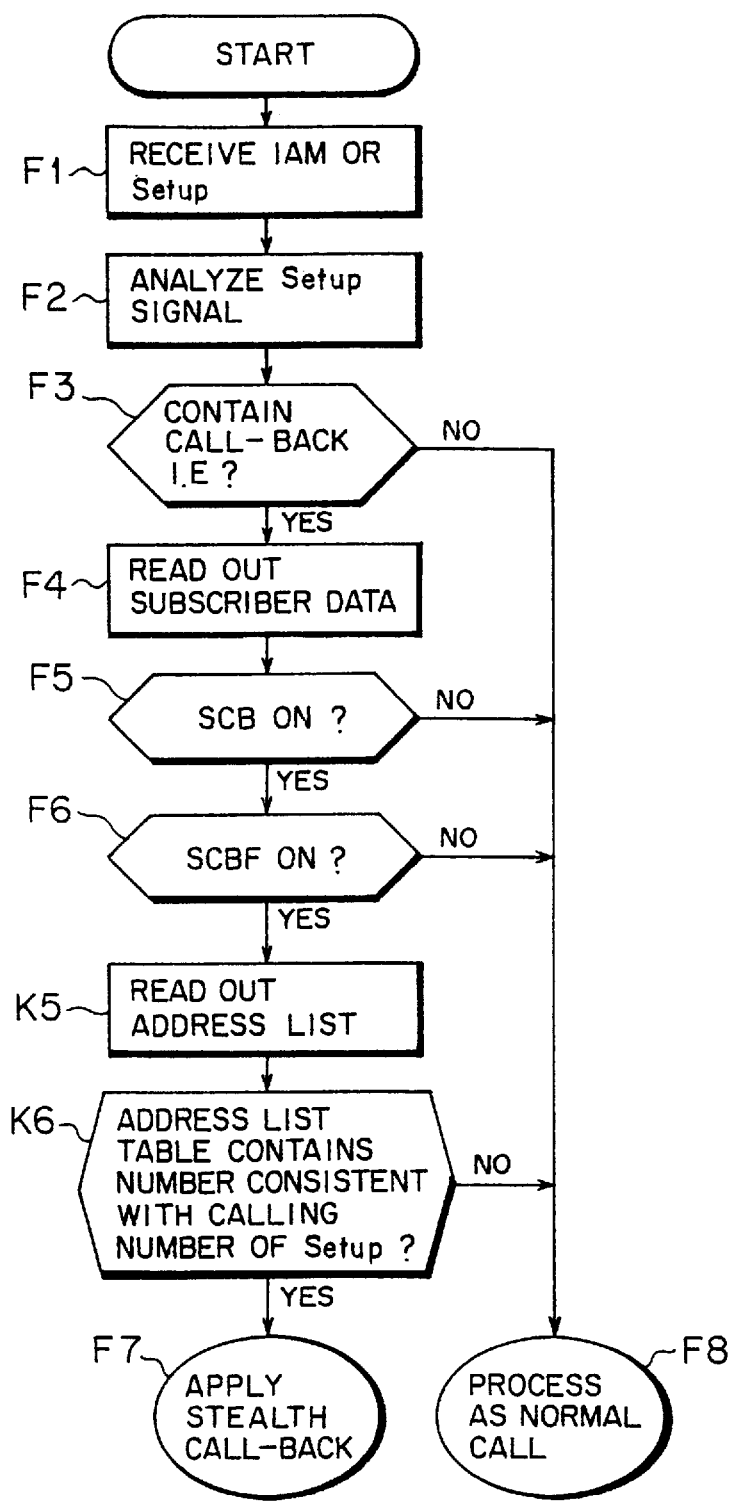
FIG. 51 is a flow chart for explaining the operation of the ATM exchange in the eighth modified example.

Therefore, as the operation of the ATM exchange 12 (call-back controller 25) in the eighth modified example is shown in the flow chart in FIG. 51, the step K5 (read-out of the address list table 216) and the step K6 (determination based on the address list table 216) in the flow chart shown in FIG. 45 are added to follow the step F6 (determination as to the flag 212) in the flow chart shown in FIG. 33.

Accordingly, the eighth modified example is able to obtain both the effect from the third modified example and the effect from the fifth modified embodiment.

Further, also in this modified example, the order of the determination as to the call-back request information element 274, as to the called terminal 14 (flags 211 and 212), and as to the calling terminal 13 may appropriately be changed.

Further, this modified example may also be arranged to execute the call-back service by setting the band value registered on the band information table 214 or the band value received from the called terminal 14 in the Setup signal forwarded to the calling terminal 13, when the band value set in the band information element 273 of the Setup signal transmitted from the calling terminal 13 is "0".

(b-10) Description of a Ninth Modified Example

Figure 52:
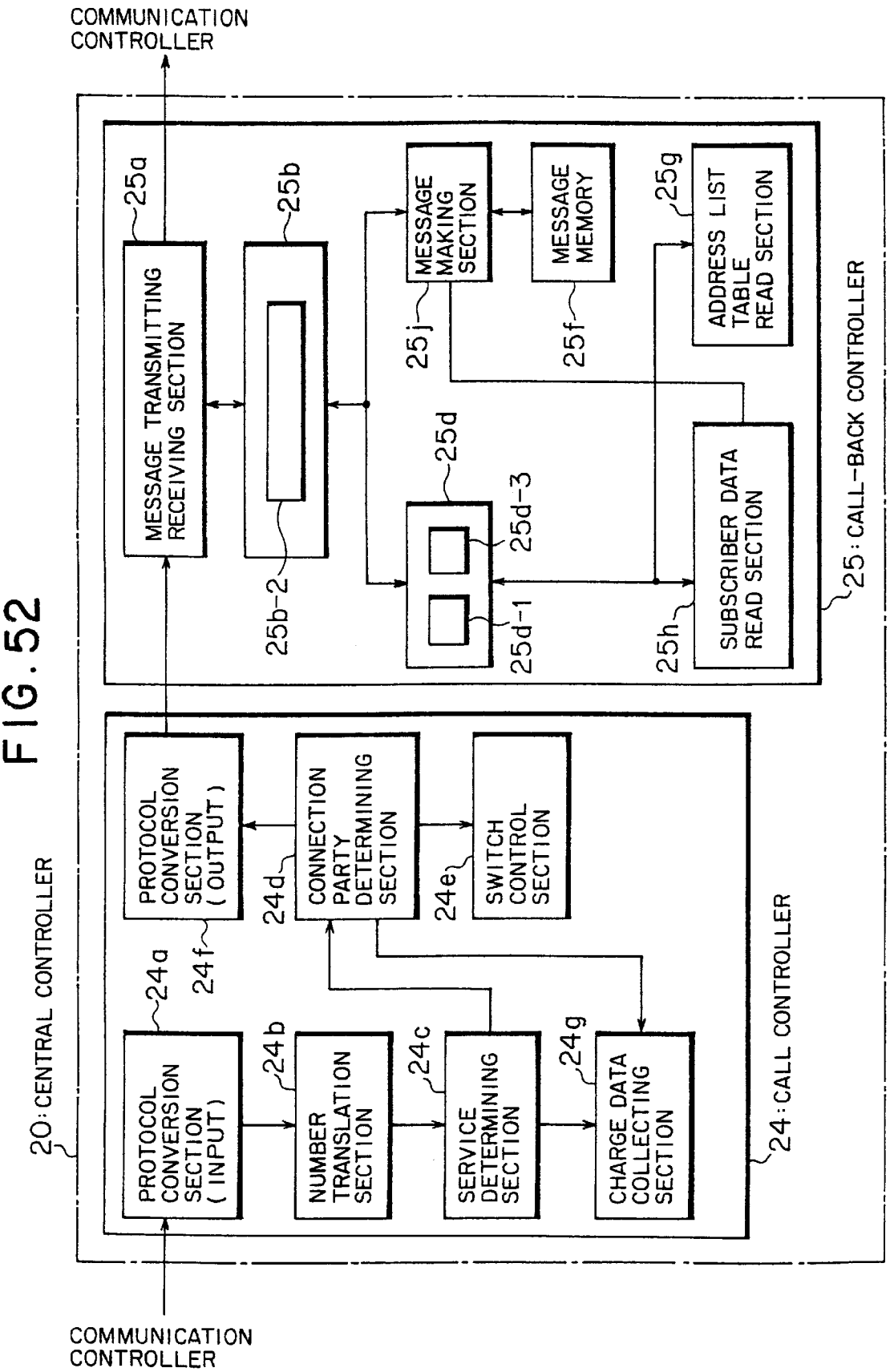
FIG. 52 is a block diagram illustrating a ninth modified example of the central controller of the ATM exchange in the embodiment.

FIG. 52 is a block diagram illustrating a ninth modified example of the central controller 20 shown in FIG. 4. Compared to the one shown in FIG. 4, the central controller 20 shown in FIG. 52 differs in that the call controller 24 comprises the protocol conversion section 24h in the fourth modified example, the transmitting message determining section 25b of the call-back controller 25 comprises the path determining section 25b-2 in the fourth modified example, and the service determining section 25d comprises the called terminal determining section 25d-1 and the calling terminal determining section 25d-3 in the fifth modified example.

However, in this modified example, the path information table 215 (see FIG. 39) in the fourth modified example and the address list table 216 (see FIG. 44) in the fifth modified example are added on the subscriber data 21a.

In other words, the call-back controller 25 in this modified example combines the function of the call-back controller 25 in the fourth modified example and the function of the call-back controller 25 in the fifth modified example. Concretely, the call-back controller 25 carries out the call-back service, when the following conditions are satisfied:

(1) the called terminal 14 is a terminal allowed the call-back service (as described in the fourth modified example),
(2) the path (terrain code) of the received Setup signal is a path allowed the call-back service (as described in the fourth modified example), and in addition
(3) the calling terminal 13 is a terminal allowed the call-back service (as described in the fifth modified example).

Figure 41:
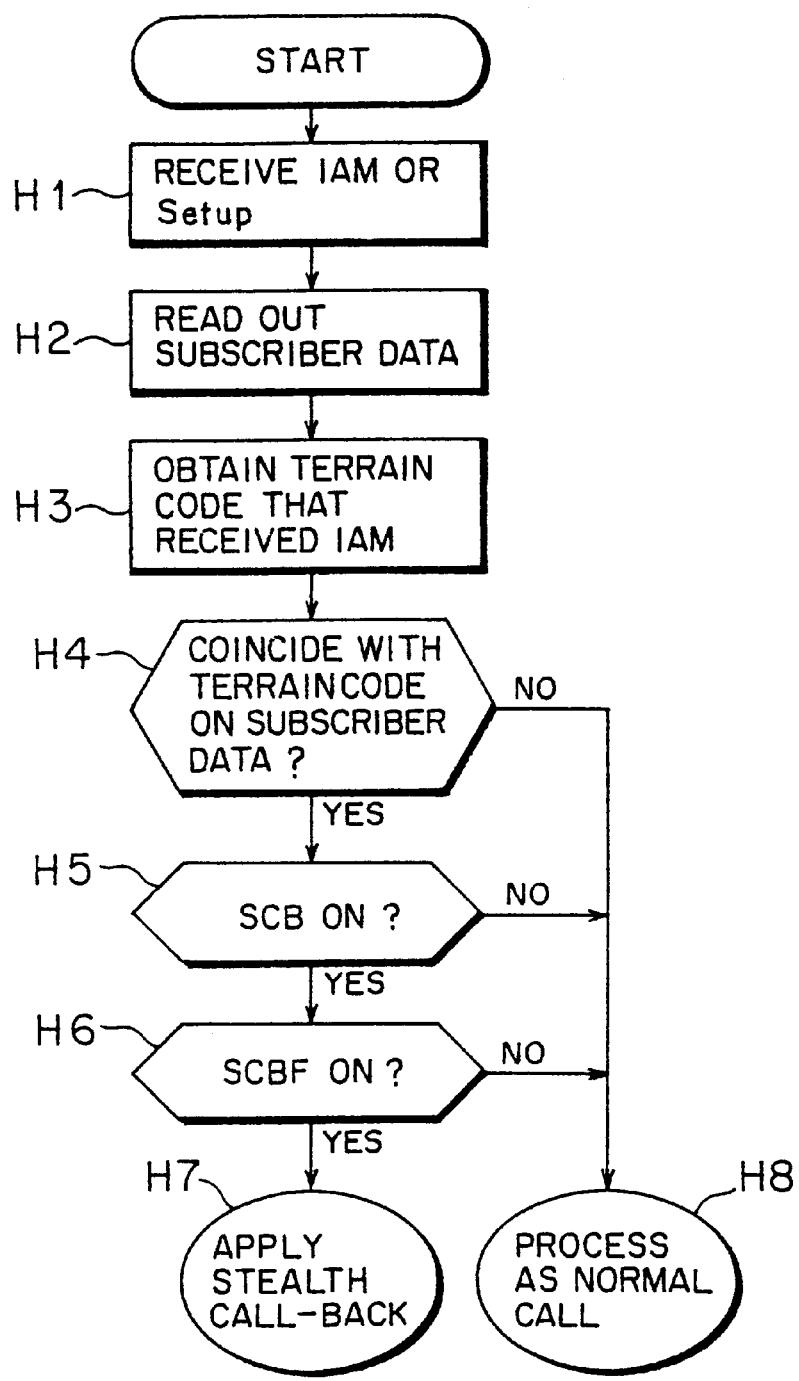
FIG. 41 is a flow chart for explaining the operation of the ATM exchange in the fourth modified example.
Figure 42:
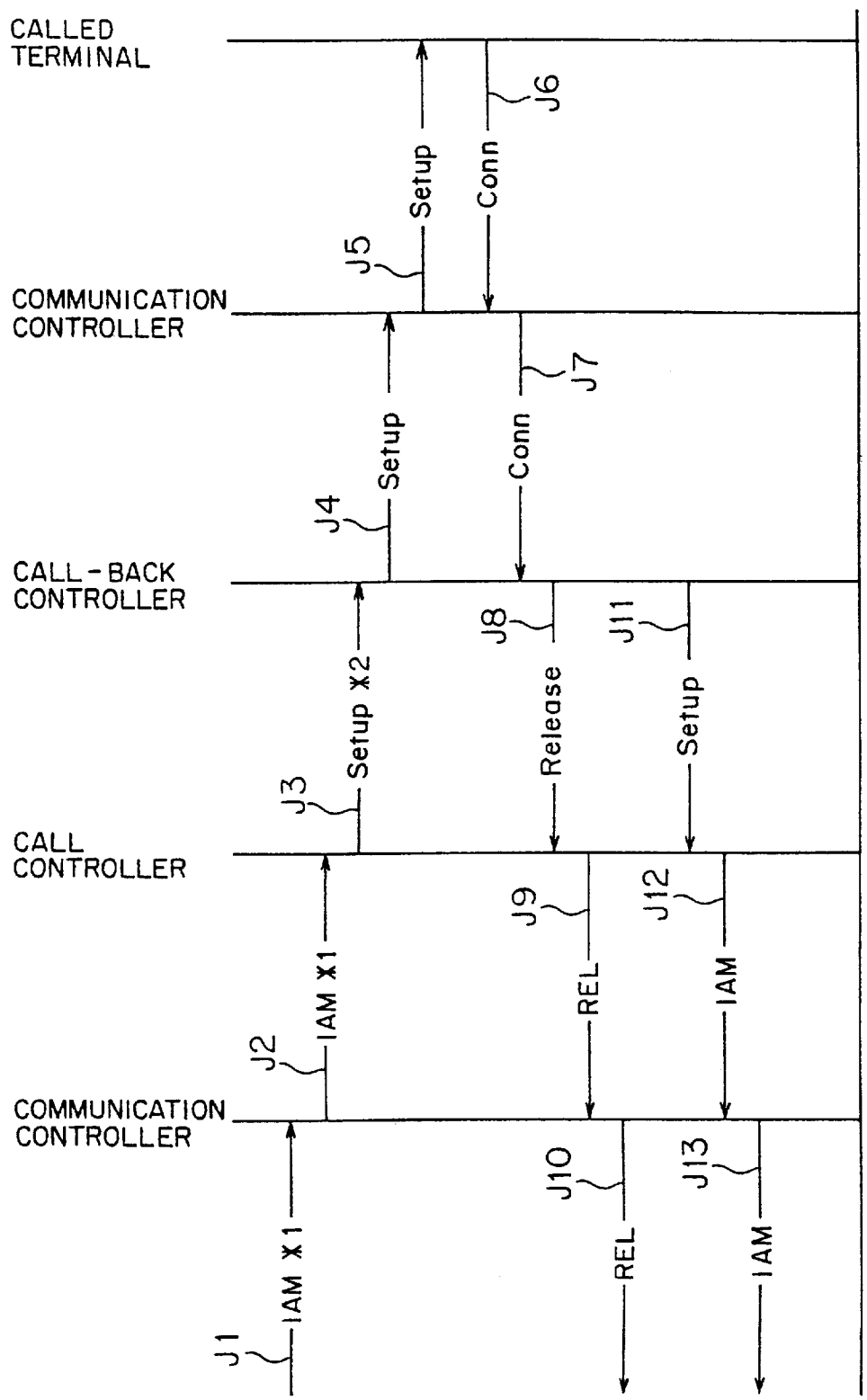
FIG. 42 is a signal sequence chart for explaining the operation of the ATM exchange in the fourth modified example.
Figure 53:
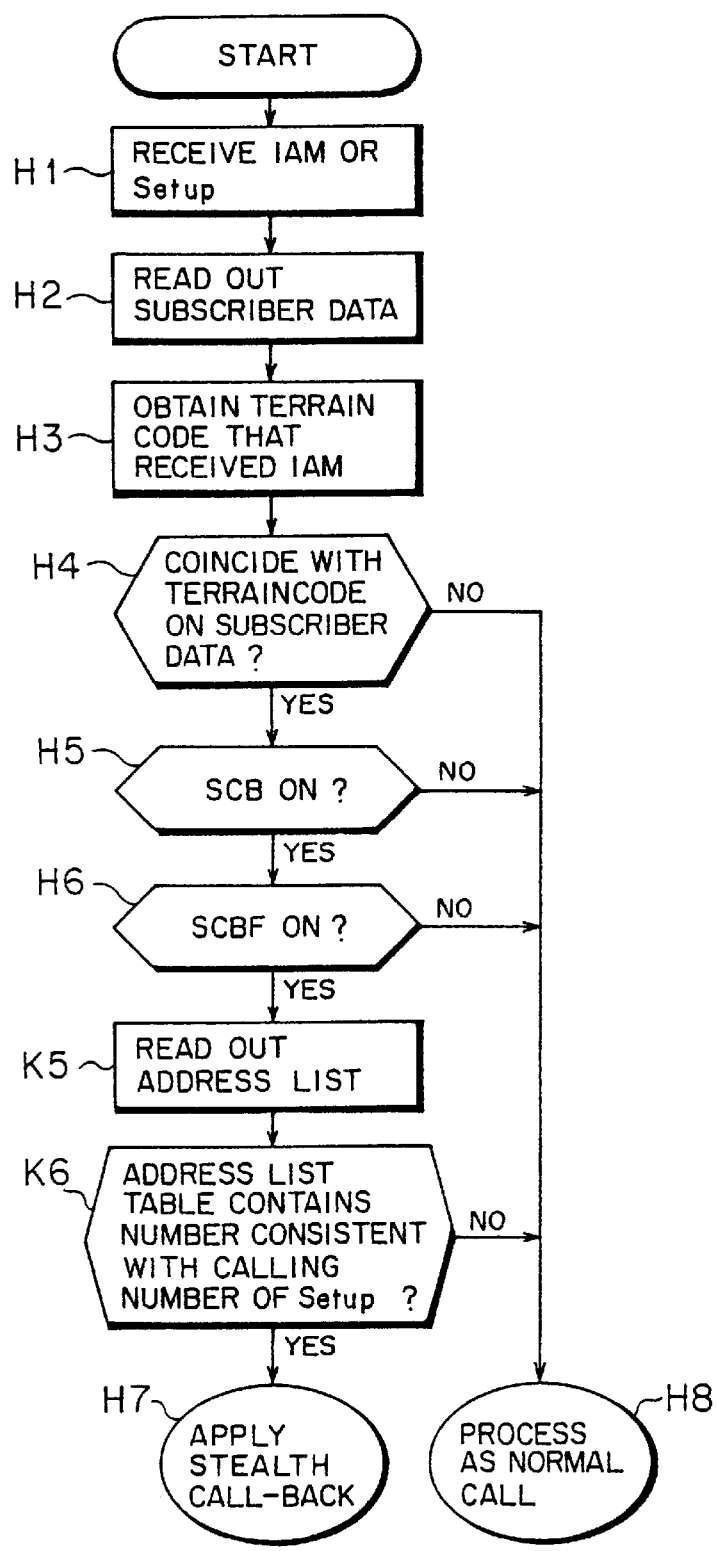
FIG. 53 is a flow chart for explaining the operation of the ATM exchange in the ninth modified example.

Therefore, as the operation of the ATM exchange 12 (call-back controller 25) in the ninth modified example is shown in the flow chart in FIG. 53, the step K5 (read-out of the address list table 216) and the step K6 (determination based on the address list table 216) in the flow chart shown in FIG. 45 are added to follow the step H6 (determination as to the flag 212) in the flow chart shown in FIG. 41.

Accordingly, the ninth modified example is able to obtain both the effect from the fourth modified example and the effect from the fifth modified embodiment.

Further, also in this modified example, the order of the determination as to the path (terrain code), as to the called terminal 14 (flags 211 and 212), and as to the calling terminal 13 may appropriately be changed.

Further, this modified example may also be arranged to execute the call-back service by setting the band value registered on the band information table 214 or the band value received from the called terminal 14 in the Setup signal forwarded to the calling terminal 13, when the band value set in the band information element 273 of the Setup signal transmitted from the calling terminal 13 is "0".

(b-11) Others

Incidentally, the maintenance terminal 23 is able to appropriately set and/or modify the information of the subscriber data 21a in the foregoing embodiment, such as the flags 211 and 212 (attribute information) the band value of the band information table 214, the path information (terrain code: NI+DPC) of the path information table 215, and the call number information (identifier of the calling terminal 13) of the address list table 216, etc.

Figure 54:
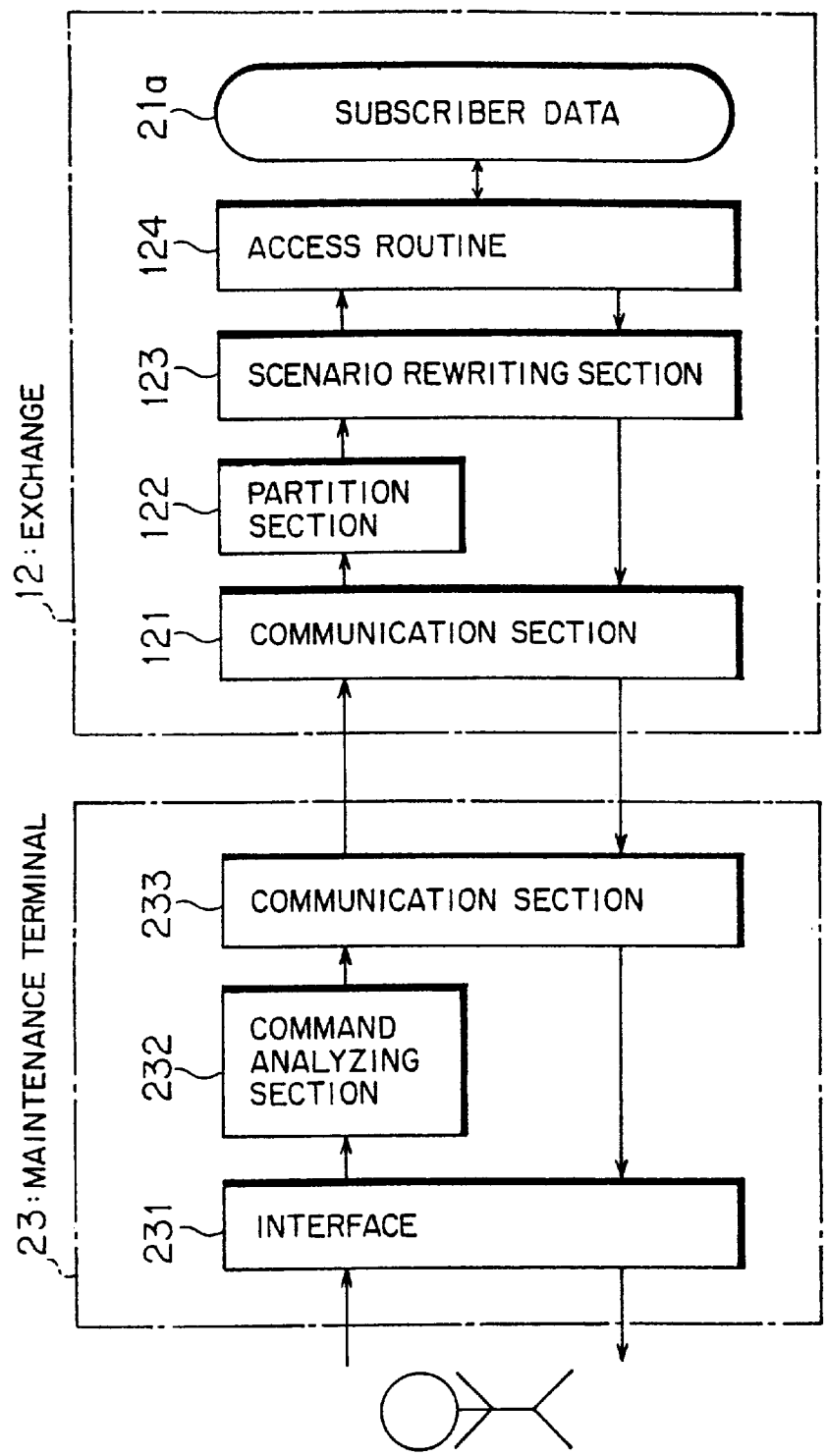
FIG. 54 is a block diagram illustrating a construction of a maintenance terminal and the ATM exchange, which focuses on the setting and/or modifying function of the subscriber data in the embodiment.

FIG. 54 is a block diagram illustrating a construction of the maintenance terminal 23 and the ATM exchange 12, which focuses on the setting and/or modifying function of the subscriber data 21a. As shown in FIG. 54, the maintenance terminal 23 comprises an interface 231, command analyzing section 232, and comunication section 233. The ATM exchange 12 comprises a comunication section 121, partition section 122, scenario rewriting section 123, and access routine section 124.

Here, the interface 231 of the maintenance terminal 23 corresponds to an information input device such as a key board or mouse, and a display; and it serves to input the setting and/or modifying command of the subscriber data 21a and to display the set and/or modified result of the subscriber data 21a.

Further, the command analyzing section 232 analyzes the instruction contents (ON/OFF of the flags 211 and 212, setting/modifying the band value, setting/modifying the terrain code, setting/modifying the call number information, etc.) of the command inputted through the interface 231. The comunication section 233 transmits to convert the instruction contents analyzed by the command analyzing section 232 into a suitable format for communicating with the ATM exchange 12, and receives to convert the set and/or modified result from the ATM exchange 12 into a suitable format for the maintenance terminal 23.

On the other hand, the comunication section 121 of the ATM exchange 12 communicates with the maintenance terminal 23 while converting the format of the instruction contents and data exchanged through the comunication section 233 into a suitable one for both sides. The partition section 122 starts the scenario rewritng section 123 in accordance with the commands (instruction contents) from the maintenance terminal 23 received through the comunication section 121.

Further, the scenario rewritng section 123 decides to rewrite which field of which subscriber data 21a on the basis of the received instruction content, and gives the information (instruction) to the access routine section 124. The access routine section 124 actually accesses the main memory 21 in accordance with the instruction from the scenario rewritng section 123, and rewrites the data in the field of the corresponding subscriber data 21a.

That is, the part formed of the foregoing comunication section 121, partition section 122, scenario rewritng section 123, and access routine section 124 sets, on the basis of the information inputted from the maintenance terminal 23, the flags 211 and 212 (attribute information of the called terminal 14) of the subscriber data 21a, the band value of the band value information table 214, the terrain code of the path information table 215, and the call number information (identifier) of the address list table 216, which functions as the attribute information setting device, the band value setting device, the path information setting device, and the identifier setting device of the maintenance terminal input system.

The operation of the maintenance terminal 23 and the ATM exchange 12 thus constructed will be described.

First, a maintenance operator inputs a command to rewrite the subscriber data 21a through the interface 231 of the maintenance terminal 23, and the command analyzing section 232 analyzes the instruction content of the command, and then the comunication section 233 converts the instruction content into an appropriate format, which is transmitted to the ATM exchange 12.

In the ATM exchange 12, the foregoing instruction content is received by the partition section 122 through the comunication section 121, and the partition section 122 acknowledges that the received instruction is to rewrite the subscriber data 21a, and calls (starts) the scenario rewritng section 123 for rewriting the subscriber data 21a. The scenario rewritng section 123 decides to rewrite which field of which subscriber data 21a in accordance with the received instruction, and gives an instruction to rewrite to the access routine section 124.

Then, the access routine section 124 accesses the main memory 21, and rewrites the corresponding subscriber data 21a in accordance with the foregoing rewriting instruction. Thereby, the flags 211, 212 of the subscriber data 21a, the band value of the band value information table 214, the terrain code of the path information table 215, and the call number information of the address list table 216, etc., are rewritten.

The access routine section 124 completes to rewrite the subscriber data 21a, and transmits the completion information to the maintenance terminal 23 through the scenario rewritng section 123 and the comunication section 121. The maintenance terminal 23 receives the information by the comunication section 233, and causes the interface 231 to display the "completion of rewriting", thus informing the maintenance operator.

Thus, the foregoing ATM exchange 12 is able to appropriately set and/or modify the various information of the subscriber data 21a on the basis of the information inputted from the maintenance terminal 23. Therefore, it is possible to modify the setting of this ATM exchange 12 after a service operation as needed, thereby building up a switched network capable of performing the call-back control very flexibly.

Further, the information of the subscriber data 21a such as the flags 211, 212 (attribute information of the called terminal 14), the band value of the band information table 214, the path information (terrain code: NI+DPC) of the path information table 215, and the call number information (identifier of the calling terminal 13) of the address list table 216, etc., can be set and/or modified appropriately from a subscriber terminal 14.

Figure 55:
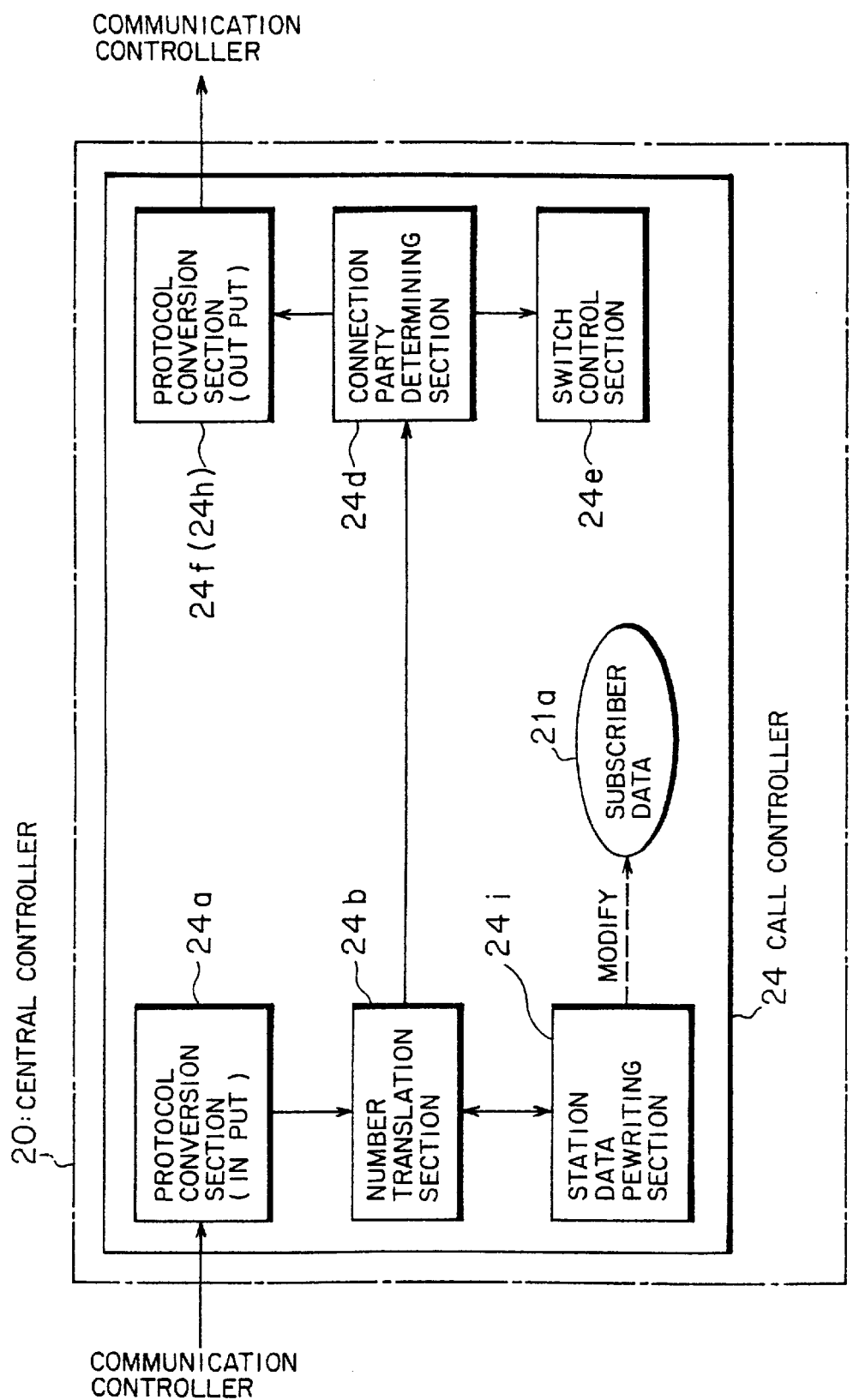
FIG. 55 is a block diagram illustrating a construction of the ATM exchange, which focuses on the setting and/or modifying function of the subscriber data in the embodiment.

FIG. 55 is a block diagram illustrating a construction of a call controller 24 of the ATM exchange 12, which focuses on the function to set and/or modify such subscriber data 21a. The call controller 24 shown in FIG. 55 comprises a station data rewriter 24i in addition to the protocol conversion section 24a, 24f (or, 24h), call number translation section 24b, connection party determining section 24d, and switch control section 24e, which are already mentioned.

The station data rewriter 24i accesses the main memory 21 by receiving a specific number for instructing a service modification (rewriting of the subscriber data 21a) from a subscriber terminal 14, and in accordance with the instruction, rewrites the foregoing various information set in the subscriber data 21a. Further in this case, the station data rewriter 24i is made to rewrite, when the call number translation section 24b translates the foregoing specific number, the field of the subscriber data 21a corresponding to the specific number.

That is, station data rewriter 24i sets, on the basis of the information inputted from the subscriber terminal 14, the flags 211, 212 of the subscriber data 21a, the band value of the band value information table 214, the path information (terrain code: NI+DPC) of the path information table 215, and the call number information of the address list table 216, which functions as the attribute information setting section, the band value setting section, the path information setting section and the identifier setting section of the subscriber terminal input system.

Figure 56:
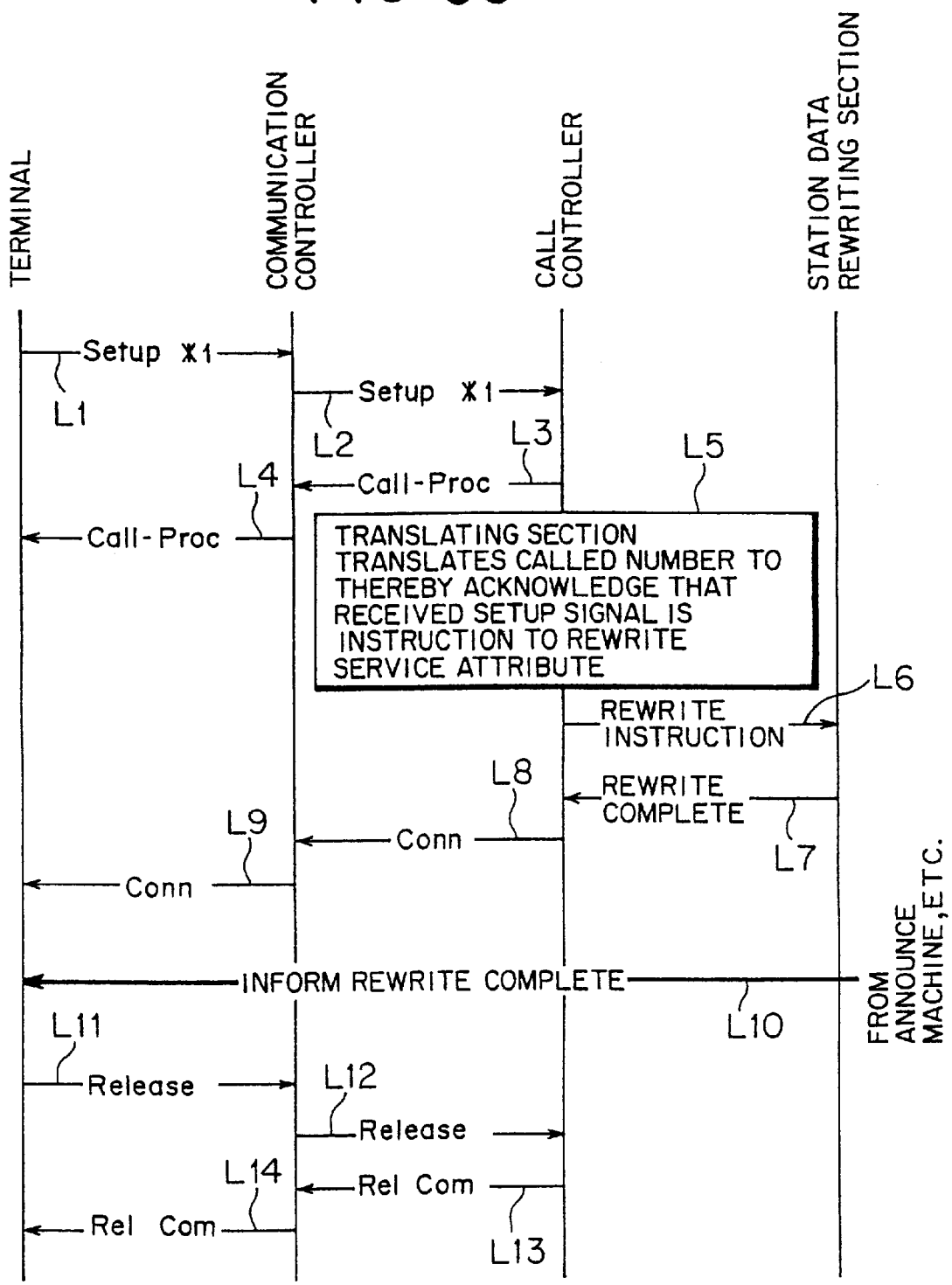
FIG. 56 is a signal sequence chart for explaining the setting and/or modifying process of the subscriber data in the embodiment.

The operation of the ATM exchange 12 thus constructed will be described with reference to the signal sequence chart (steps L1 to L14) shown in FIG. 56.

First, the subscriber terminal 14 transmits a Setup signal wherein the specific number for instructing to rewrite the subscriber data 21a is set in the information element 27 (step L1). This Setup signal is received through the communication control section 19 by the call controller 24 in the central controller 20 of the ATM exchange 12 (step L2).

The call controller 24 returns an information that the call according to the received Setup signal is being set (steps L3 and L4), and the call number translation section 24b analyzes the information element 27 of the received Setup signal. The call number translation section 24b translates the specific number set in the information element 27 to thereby acknowledge that the received Setup signal is an instruction to rewrite the service attribute (subscriber data 21a) (step L5), and gives the rewriting instruction to the station data rewriter 24i (step L6).

Then, the station data rewriter 24i rewrites the field of the subscriber data 21a in accordance with the type of the foregoing specific number. Thereby, the flags 211, 212 of the subscriber data 21a, the band value of the band value information table 214, the path information (terrain code: NI+DPC) of the path information table 215, and the call number information of the address list table 216, etc., are rewritten.

Figure 57:
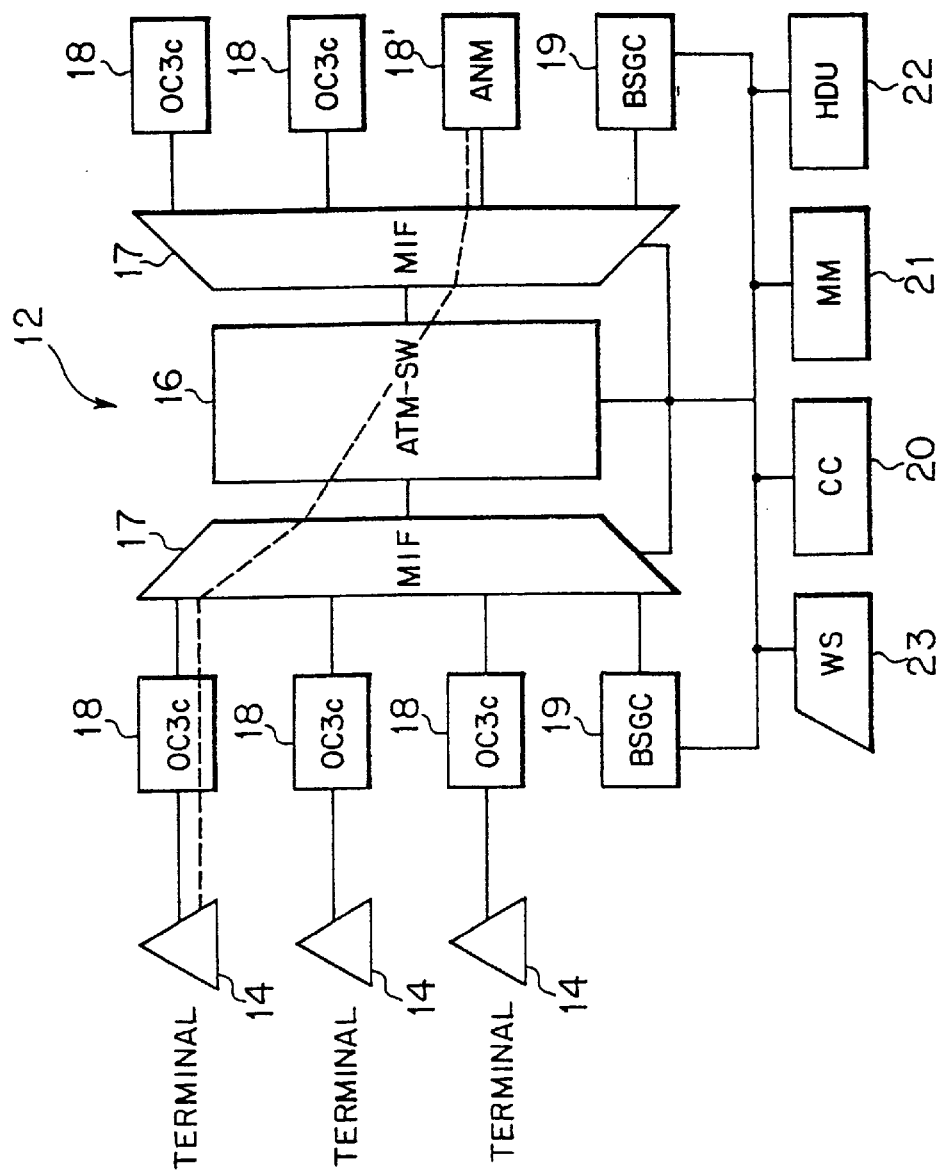
FIG. 57 is a signal sequence chart for explaining the setting and/or modifying process of the subscriber data in the embodiment.
Figure 58A:
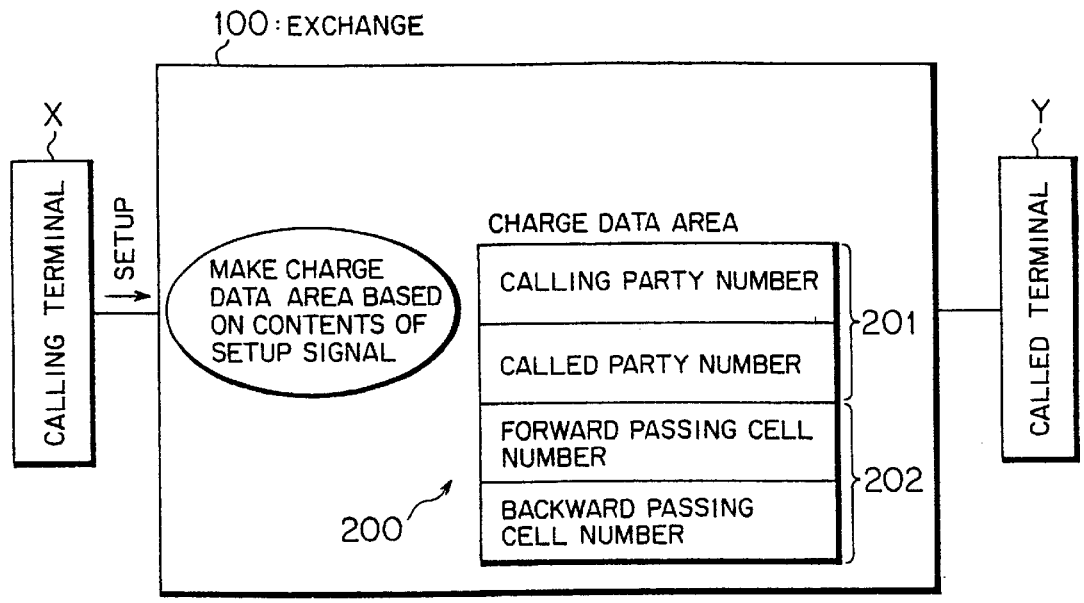
FIG. 58(a) and 58(b) are charts for explaining the call rate charging process in the conventional exchange.
Figure 58B:
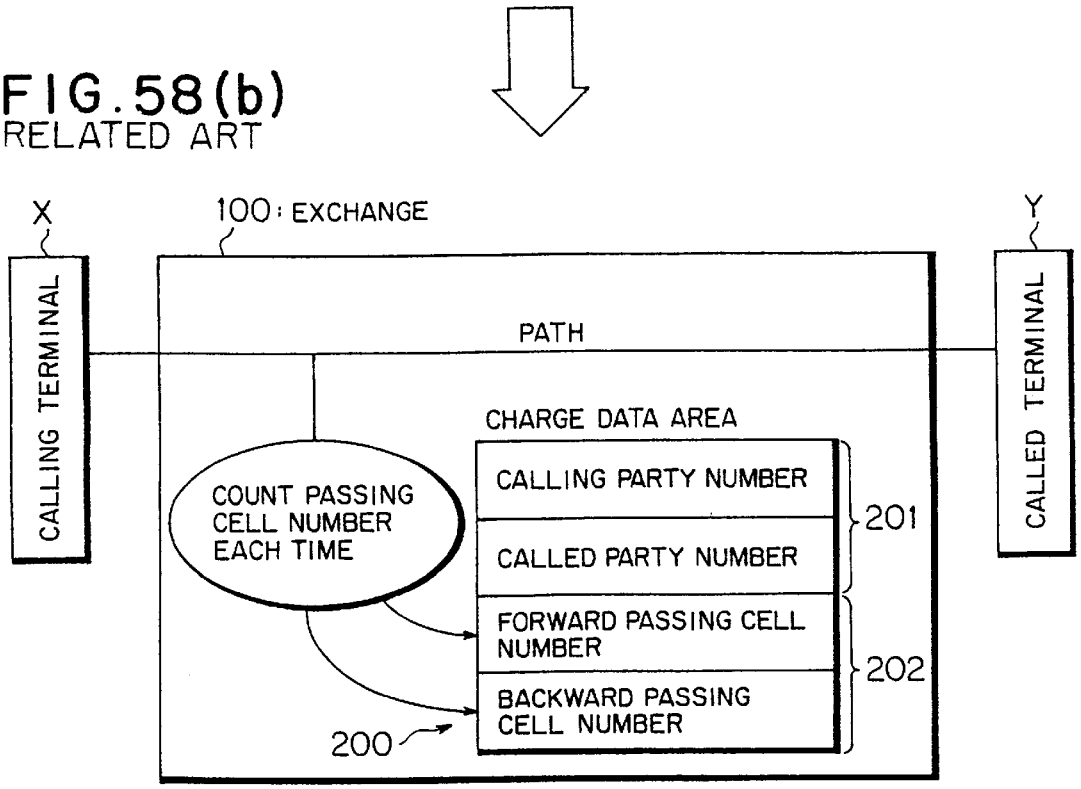

The station data rewriter 24i completes to rewrite the subscriber data 21a, and outputs the completion information to the connection party determining section 24d through the call number translation section 24b (step L7). The connection party determining section 24d receives the information, requests the switch control section 24e to set a path between an announcing machine (ANM) 18' and the subscriber terminal 14, as shown in FIG. 57, and transmits the Connect signal to the subscriber terminal 14 (steps L8 and L9).

Thereby, the announcing machine 18' informs the completion of rewriting the subscriber data 21a to the subscriber terminal 14 through the path thus set (step L10). Thereafter, the subscriber terminal 14 transmits the Release signal (disconnection request) to the ATM exchange 12 (steps L11, L12), and the call controller 24 disconnects the foregoing path and transmits the disconnection complete (Release complete) signal to the subscriber terminal 14 (steps L13 and L14).

Thus, the foregoing ATM exchange 12 is able to appropriately set and/or modify the various information of the subscriber data 21a on the basis of the information inputted from the subscriber terminal 14. Therefore, the subscriber can set and/or modify the execution/nonexecution of the call-back service at any time as needed, which greatly serves to improve the serviceability for the subscribers.

Further, the foregoing embodiment and the modified examples are described on the assumption that the ATM network is formed by the two ATM exchanges 11 and 12. However, in the network containing more than three ATM exchanges, the same effects and functions as the foregoing embodiment and the modified examples can be obtained if the system is organized such that at least one called exchange is served as the exchange having the foregoing call-back controller 25. Further, the invention is applied to the ATM exchange 12 in the ATM network in the foregoing embodiment and the modified examples, however, the invention is not limited to this, but it can be allied to an exchange of the other types.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A call-back controllable exchange accommodating a plurality of subscriber terminals, comprising:
    a call controller for controlling, upon receiving a call setting request signal from a subscriber terminal as a calling terminal to another subscriber terminal as a called terminal, to set a call connection from the calling terminal to the called terminal, on the basis of an identifier of the calling terminal and an identifier of the called terminal that are contained in the call setting request signal, according to a predetermined call setting sequence;
    a call-back controller for executing a call-back control, the call-back controller executing an additional sequence, including at least a process for generating a reverse direction call setting request signal and a process for transmitting the reverse direction call setting signal, to exchange relationship between the calling terminal and the called terminal, during execution of said predetermined call setting sequence;
    an attribute information table that stores an attribute information as to whether or not the subscriber terminal is a terminal allowed the call-back control, for each subscriber terminal; and
    the call-back controller comprises a called terminal determining unit to determine whether or not the called terminal is a terminal allowed the call-back control on the basis of the attribute information of the attribute information table, and carries out the call-back control; when the called terminal determining unit determines that the called terminal is a terminal allowed the call-back control;
    a band information table that stores a band value used in setting a call between subscriber terminals; and
    the call-back controller comprises a band information determining unit to determine whether or not a specific band value is set in the call setting request signal from the calling terminal, and carries out the call-back control by applying the band value stored on the band information table as a band value used between the calling terminal and the called terminal, when the called terminal determining unit determines that the called terminal is a terminal allowed the call-back control and the band information determining unit determines that the specific band value is set in the call setting request signal.

2. A call-back controllable exchange as claimed in claim 1,
    wherein the call-back controllable exchange comprises an attribute information setting unit of a maintenance terminal input type that sets the attribute information of the attribute information table on the basis of an information inputted from a maintenance terminal for the exchange.

3. A call-back controllable exchange as claimed in claim 1,
    wherein the call-back controllable exchange comprises an attribute information setting unit of a subscriber terminal input type that sets the attribute information of the attribute information table on the basis of an information inputted from the subscriber terminal.

4. A call-back controllable exchange as claimed in claim 1,
    wherein the call-back controllable exchange comprises a band value setting unit of a maintenance terminal input type that sets the band value of the band information table on the basis of an information inputted from a maintenance terminal for the exchange.

5. A call-back controllable exchange as claimed in claim 1,
    wherein the call-back controllable exchange comprises a band value setting unit of a subscriber terminal input type that sets the band value of the band information table on the basis of an information inputted from the subscriber terminal.

6. A call-back controllable exchange as claimed in claim 1,
    wherein the specific band value is zero.

7. A call-back controllable exchange accommodating a plurality of subscriber terminals, comprising:
    a call controller for controlling, upon receiving a call setting request signal from a subscriber terminal as a calling terminal to another subscriber terminal as a called terminal, to set a call connection from the calling terminal to the called terminal, on the basis of an identifier of the calling terminal and an identifier of the called terminal that are contained in the call setting request signal, according to a predetermined call setting sequence;
    a call-back controller for executing a call-back control, the call-back controller executing an additional sequence, including at least a process for generating a reverse direction call setting request signal and a process for transmitting the reverse direction call setting signal, to exchange relationship between the calling terminal and the called terminal, during execution of said predetermined call setting sequence;
    an attribute information table that stores an attribute information as to whether or not the subscriber terminal is a terminal allowed the call-back control, for each subscriber terminal; and
    the call-back controller comprises a called terminal determining unit to determine whether or not the called terminal is a terminal allowed the call-back control on the basis of the attribute information of the attribute information table, and carries out the call-back control, when the called terminal determining unit determines that the called terminal is a terminal allowed the call-back control; wherein
    the call-back band controller comprises a band information determining unit for determining whether or not a specific band value is set in the call setting request signal from the calling terminal, and a band value receiver for receiving a band value to be used between the calling terminal and the called terminal from the called terminal; and
    the call-back controller carries out the call-back control by applying the band value received by the band value receiver as a band value used between the calling terminal and the called terminal, when the called terminal determining unit determines that the called terminal is a terminal allowed the call-back control and the band information determining unit determines that the specific band value is set in the call setting request signal.

8. A call-back controllable exchange as claimed in claim 7,
wherein the call-back controllable exchange comprises an attribute information setting unit of a maintenance terminal input type that sets the attribute information of the attribute information table on the basis of an information inputted from a maintenance terminal for the exchange.

9. A call-back controllable exchange as claimed in claim 7,
wherein the call-back controllable exchange comprises an attribute information setting unit of a subscriber terminal input type that sets the attribute information of the attribute information table on the basis of an information inputted from the subscriber terminal.

10. A call-back controllable exchange as claimed in claim 7,
wherein the specific band value is zero.

11. A call-back controllable exchange as claimed in claim 7,
wherein the band value received by the band value receiver is contained in a response signal transmitted from the called terminal when the called terminal responds to the call setting request signal.

12. A call-back controllable exchange accommodating a plurality of subscriber terminals, comprising:
a call controller for controlling, upon receiving a call setting request signal from a subscriber terminal as a calling terminal to another subscriber terminal as a called terminal, to set a call connection from the calling terminal to the called terminal, on the basis of an identifier of the calling terminal and an identifier of the called terminal that are contained in the call setting request signal, according to a predetermined call setting sequence;
a call-back controller for executing a call-back control, the call-back controller executing an additional sequence, including at least a process for generating a reverse direction call setting request signal and a process for transmitting the reverse direction call setting signal, to exchange relationship between the calling terminal and the called terminal, during execution of said predetermined call setting sequence;
an attribute information table that stores an attribute information as to whether or not the subscriber terminal is a terminal allowed the call-back control for each subscriber terminal, and a calling terminal information table that stores an identifier of the calling terminal allowed the call-back control for each subscriber terminal; and
the call-back controller comprises a called terminal determining unit for determining whether or not the called terminal is a terminal allowed the call-back control on the basis of the attribute information of the attribute information table, and a calling terminal determining unit for determining whether or not the calling terminal is a terminal allowed the call-back control on the basis of the identifier of the calling terminal information table, and the call-back controller carries out the call-back control, when the called terminal determining unit determines that the called terminal is a terminal allowed the call-back control and the calling terminal determining unit determines that the calling terminal is terminal allowed the call-back control;
a band information table that stores a band value used in setting a call between subscriber terminals; and
the call-back controller comprises a band information determining unit for determining whether or not a specific band value is set in the call setting request signal from the calling terminal, and carries out the call-back control by applying the band value stored on the band information table as a band value used between the calling terminal and the called terminal, when the called terminal determining unit determines that the called terminal is a terminal allowed the call-back control, the calling terminal determining unit determines that the calling terminal is a terminal allowed the call-back control, and the band information determining unit determines that the specific band value is set in the call setting request signal.

13. A call-back controllable exchange as claimed in claim 12,
wherein the call-back controllable exchange comprises an attribute information setting unit of a maintenance terminal input type that sets the attribute information of the attribute information table on the basis of an information inputted from a maintenance terminal for the exchange.

14. A call-back controllable exchange as claimed in claim 13,
wherein the call-back controllable exchange comprises an attribute information setting unit of a subscriber terminal input type that sets the attribute information of the attribute information table on the basis of an information inputted from the subscriber terminal.

15. A call-back controllable exchange as claimed in claim 12,
wherein the call-back controllable exchange comprises a band value setting unit of a maintenance terminal input type that sets the band value of the band information table on the basis of an information inputted from a maintenance terminal for the exchange.

16. A call-back controllable exchange as claimed in claim 12,
wherein the call-back controllable exchange comprises a band value setting unit of a subscriber terminal input type that sets the band value of the band information table on the basis of an information inputted from the subscriber terminal.

17. A call-back controllable exchange as claimed in claim 12,
wherein the call-back controllable exchange comprises an identifier setting unit of a subscriber terminal input type that sets the identifier of the calling terminal information table on the basis of an information inputted from the subscriber terminal.

18. A call-back controllable exchange as claimed in claim 12,
wherein the specific band value is zero.

19. A call-back controllable exchange as claimed in claim 12,
wherein the call-back controllable exchange comprises an identifier setting unit of a maintenance terminal input type that sets the identifier of the calling terminal information table on the basis of an information inputted from a maintenance terminal for the exchange.

20. A call-back controllable exchange accommodating a plurality of subscriber terminals, comprising:

a call controller for controlling, upon receiving a call setting request signal from a subscriber terminal as a calling terminal to another subscriber terminal as a called terminal, to set a call connection from the calling terminal to the called terminal, on the basis of an identifier of the calling terminal and an identifier of the called terminal that are contained in the call setting request signal, according to a predetermined call setting sequence; and a call-back controller for executing a call-back control, the call-back controller executing an additional sequence, including at least a process for generating a reverse direction call setting request signal and a process for transmitting the reverse direction call setting signal, to exchange relationship between the calling terminal and the called terminal, during execution of said predetermined call setting sequence;

an attribute information table that stores an attribute information as to whether or not the subscriber terminal is a terminal allowed the call-back control for each subscriber terminal, and a calling terminal information table that stores an identifier of the calling terminal allowed the call-back control for each subscriber terminal; and the call-back controller comprises a called terminal determining unit for determining whether or not the called terminal is a terminal allowed the call-back control on the basis of the attribute information of the attribute information table, and a calling terminal determining unit for determining whether or not the calling terminal is a terminal allowed the call-back control on the basis of the identifier of the calling terminal information table, and the call-back controller carries out the call-back control, when the called terminal determining unit determines that the called terminal is a terminal allowed the call-back control and the calling terminal determining unit determines that the calling terminal is terminal allowed the call-back control;

wherein the call-back controller:

comprises a band information determining unit for determining whether or not a specific band value is set in the call setting request signal from the calling terminal, and a band value receiver for receiving a band value to be used between the calling terminal and the called terminal from the called terminal; and carries out the call-back control by applying the band value received by the band value receiver as a band value used between the calling terminal and the called terminal, when the called terminal determining unit determines that the calling terminal is a terminal allowed the call-back control, the calling terminal determining unit determines that the calling terminal is a terminal allowed the call-back control, and the band information determining unit determines that the specific band value is set in the call setting request signal.

21. A call-back controllable exchange as claimed in claim 20, wherein the call-back controllable exchange comprises an attribute information setting unit of a maintenance terminal input type that sets the attribute information of the attribute information table on the basis of an information inputted from a maintenance terminal for the exchange.

22. A call-back controllable exchange as claimed in claim 20, wherein the call-back controllable exchange comprises an attribute information setting unit of a subscriber terminal input type that sets the attribute information of the attribute information table on the basis of an information inputted from the subscriber terminal.

23. A call-back controllable exchange as claimed in claim 20, wherein the call-back controllable exchange comprises an identifier setting unit of a subscriber terminal input type that sets the identifier of the calling terminal information table on the basis of an information inputted from the subscriber terminal.

24. A call-back controllable exchange as claimed in claim 20, wherein the specific band value is zero.

25. A call-back controllable exchange as claimed in claim 20, wherein the band value received by the band value receiver is contained in a response signal transmitted from the called terminal when the called terminal responds to the call setting request signal.

26. A call-back controllable exchange as claimed in claim 20, wherein the call-back controllable exchange comprises an identifier setting unit of a maintenance terminal input type that sets the identifier of the calling terminal information table on the basis of an information inputted from a maintenance terminal for the exchange.

* * * * *